United States Patent [19]
Iizuka

[11] Patent Number: 5,737,112
[45] Date of Patent: Apr. 7, 1998

[54] SCANNING OPTICAL SYSTEMS

[75] Inventor: Takashi Iizuka, Tokyo, Japan

[73] Assignee: Asahi Kogaku Kogyo Kabushiki Kaisha, Tokyo, Japan

[21] Appl. No.: 499,730

[22] Filed: Jul. 7, 1995

[30] Foreign Application Priority Data

| Jul. 7, 1994 | [JP] | Japan | 6-156219 |
| Jul. 7, 1994 | [JP] | Japan | 6-156220 |
| Jul. 15, 1994 | [JP] | Japan | 6-163697 |
| Jul. 15, 1994 | [JP] | Japan | 6-163698 |
| Nov. 17, 1994 | [JP] | Japan | 6-283812 |
| May 30, 1995 | [JP] | Japan | 7-132456 |

[51] Int. Cl.[6] .................................... G02B 26/08
[52] U.S. Cl. ................ 359/205; 359/207; 359/216; 359/217
[58] Field of Search ................ 359/205–207, 359/216–219, 662, 711, 708, 716–718; 347/258–261

[56] References Cited

U.S. PATENT DOCUMENTS

| 5,005,928 | 4/1991 | Suzuki et al. | 359/206 |
| 5,189,546 | 2/1993 | Iizuka | 359/217 |
| 5,418,639 | 5/1995 | Yamazaki | 359/205 |
| 5,453,870 | 9/1995 | Iima | 359/205 |

FOREIGN PATENT DOCUMENTS 164612 4/1989 Japan.

Primary Examiner—James Phan
Attorney, Agent, or Firm—Greenblum & Bernstein, P.L.C.

[57] ABSTRACT

A scanning optical system that includes a light source for emitting a beam of light, a light deflector for deflecting the beam of light in the main scanning direction, and a scanning lens system which receives a beam of light deflected by the light deflector for focusing the deflected beam of light onto a scanning surface. At least one surface of a lens in the scanning lens system is formed in such a manner so as to have the cross-sectional shape of a non-circular arc in any sub-scanning plane so as to correct the spherical aberration of the scanning lens system in sub-scanning planes each extending parallel to the sub-scanning direction.

23 Claims, 50 Drawing Sheets fθ characteristic curvature of field

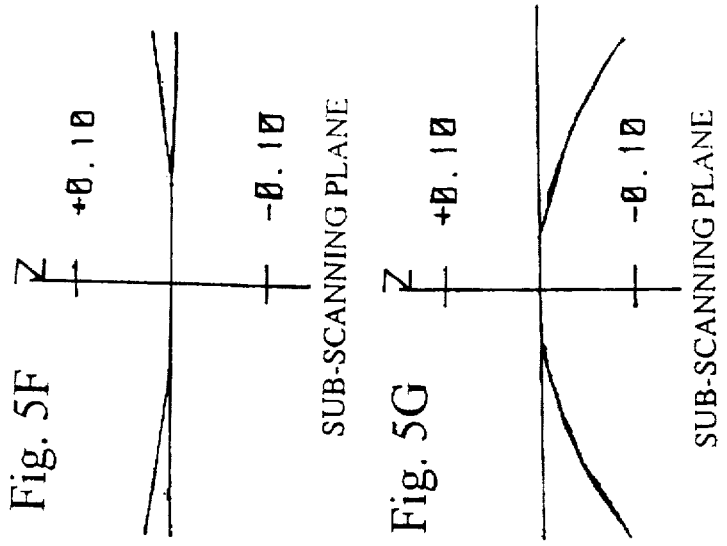
Fig. 5A  Y= 108.081
Fig. 5B  Y= 53.989
Fig. 5C  Y= -0.012
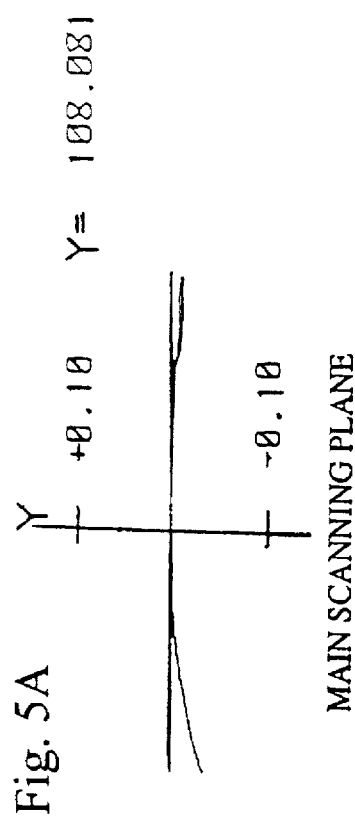
Fig. 5F  SUB-SCANNING PLANE
Fig. 5G  SUB-SCANNING PLANE
Fig. 5H  SUB-SCANNING PLANE

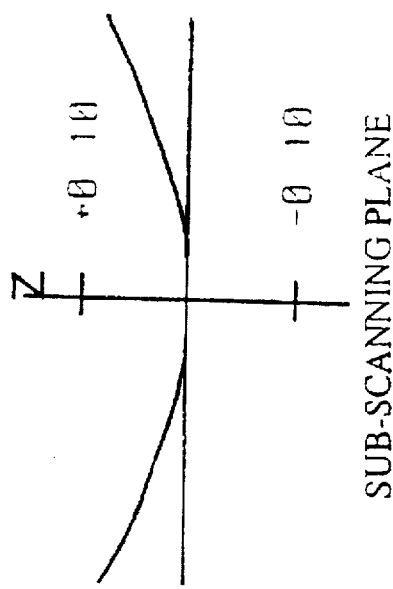
Fig. 5D  Y = -53.970
MAIN SCANNING PLANE
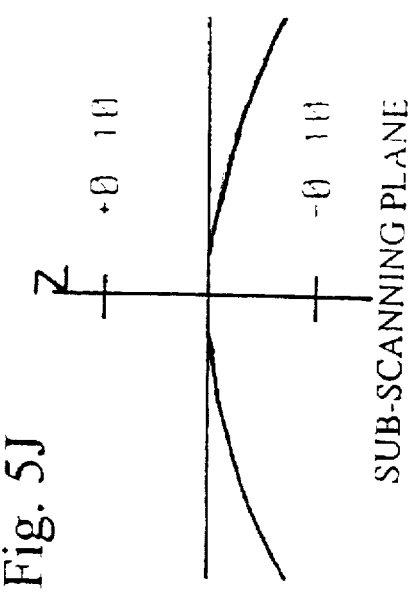
Fig. 5I
SUB-SCANNING PLANE
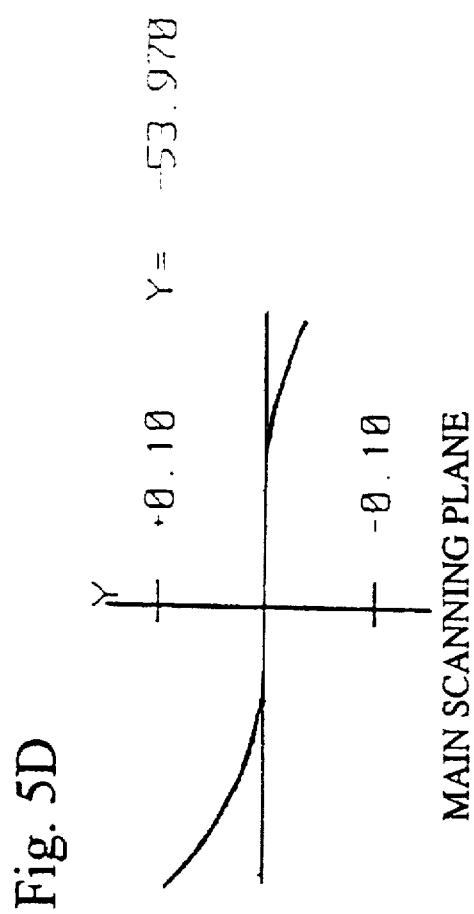
Fig. 5E  Y = -107.899
MAIN SCANNING PLANE
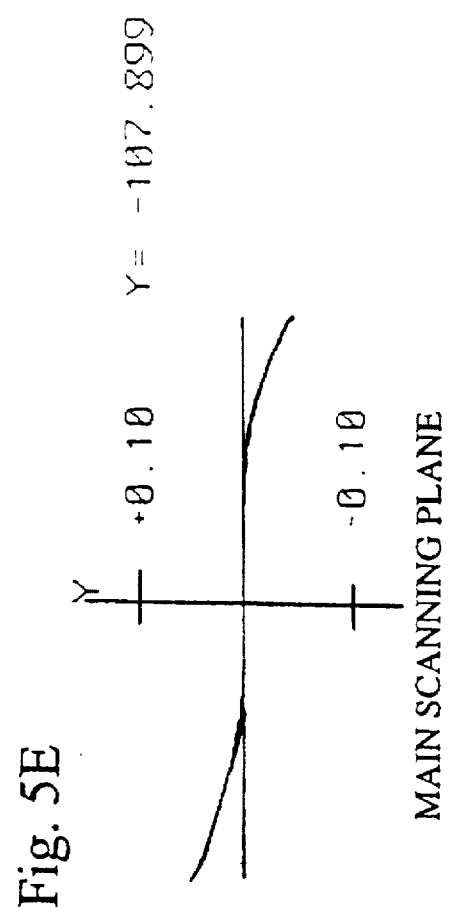
Fig. 5J
SUB-SCANNING PLANE

Y = 108.081
Z = 0.000

MAIN SCANNING PLANE

Y = 53.989
Z = 0.000

MAIN SCANNING PLANE

Y = -0.012
Z = 0.000

MAIN SCANNING PLANE

SUB-SCANNING PLANE

SUB-SCANNING PLANE

SUB-SCANNING PLANE fθ characteristic

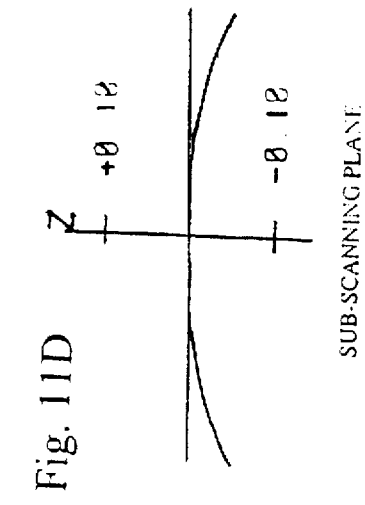
Fig. 11A  Y= 107.847
MAIN SCANNING PLANE
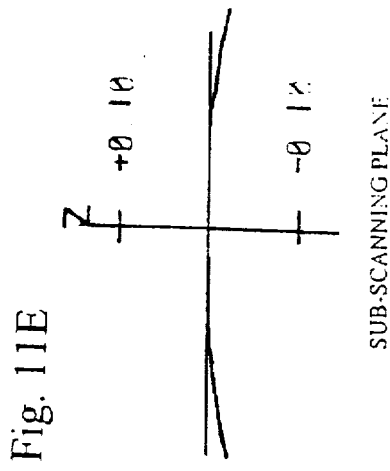
Fig. 11B  Y= 0.038
MAIN SCANNING PLANE
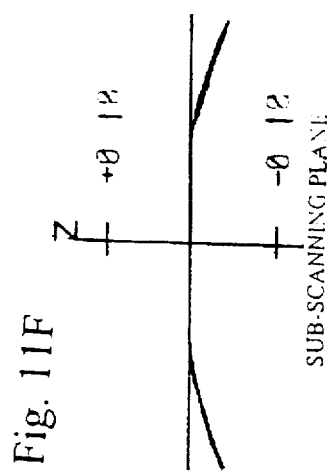
Fig. 11C  Y= -108.132
MAIN SCANNING PLANE
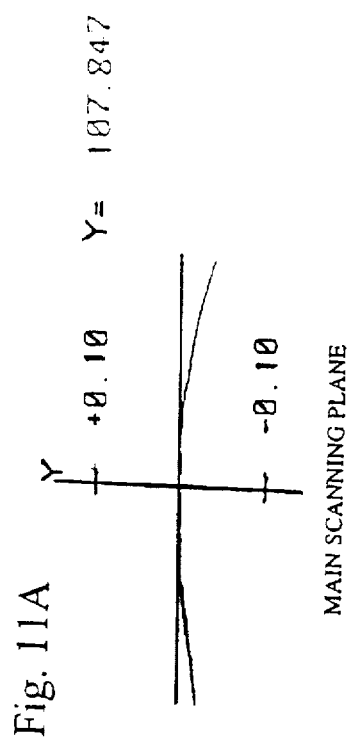
Fig. 11D
SUB-SCANNING PLANE
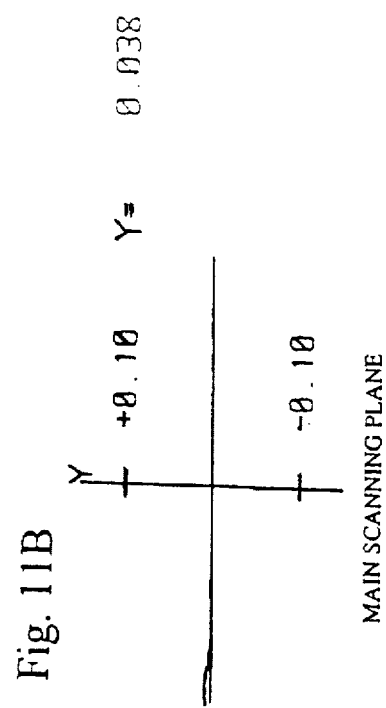
Fig. 11E
SUB-SCANNING PLANE
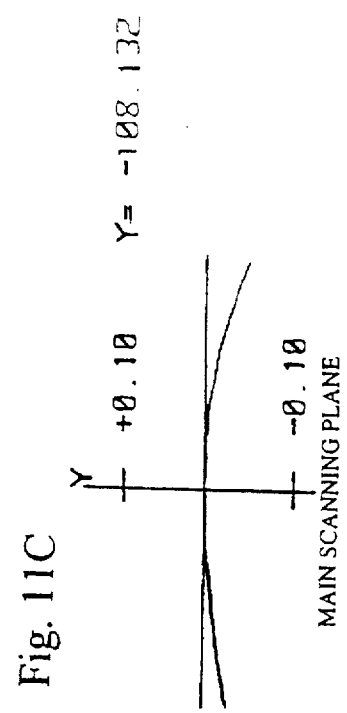
Fig. 11F
SUB-SCANNING PLANE

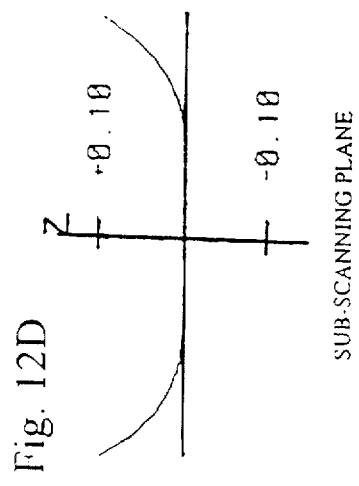
Fig. 12A  Y= 107.847
MAIN SCANNING PLANE
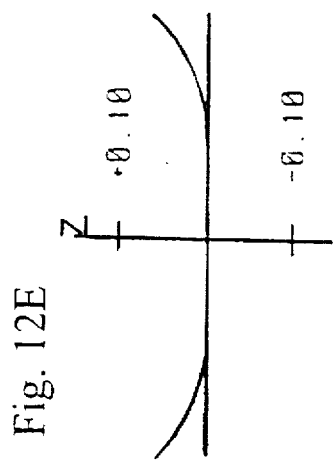
Fig. 12B  Y= 0.038
Z= 0.000
MAIN SCANNING PLANE
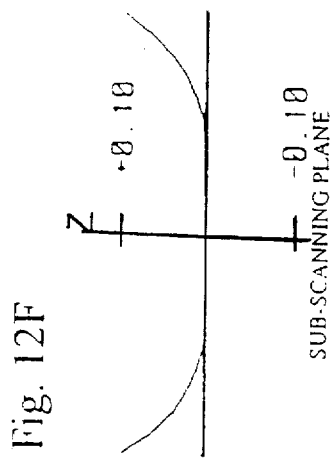
Fig. 12C  Y= -108.132
Z= 0.000
MAIN SCANNING PLANE
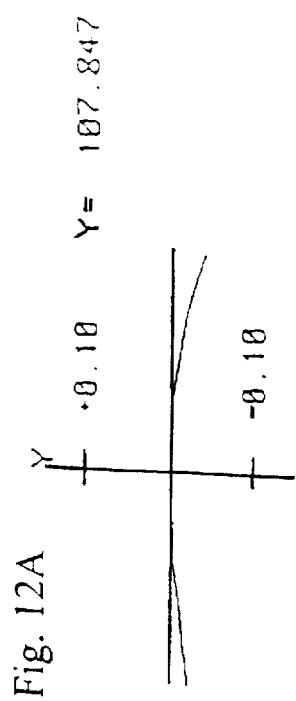
Fig. 12D
SUB-SCANNING PLANE
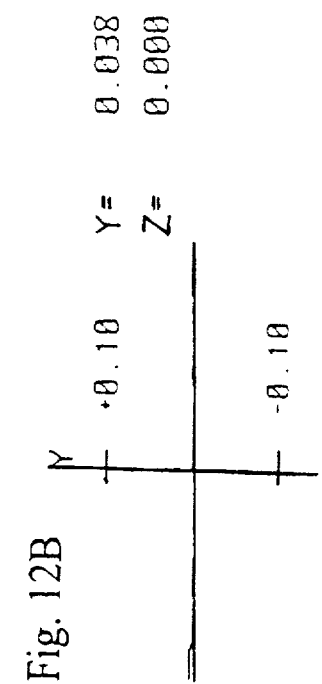
Fig. 12E
SUB-SCANNING PLANE
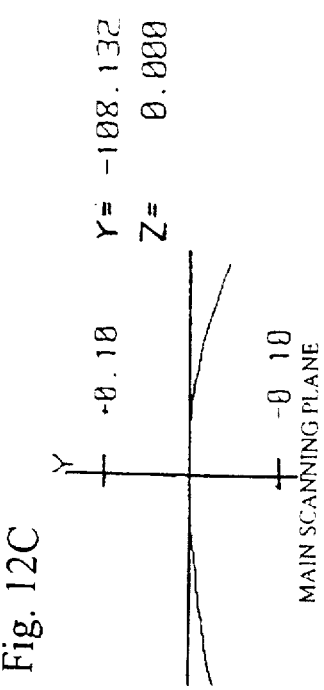
Fig. 12F
SUB-SCANNING PLANE fθ characteristic curvature of field

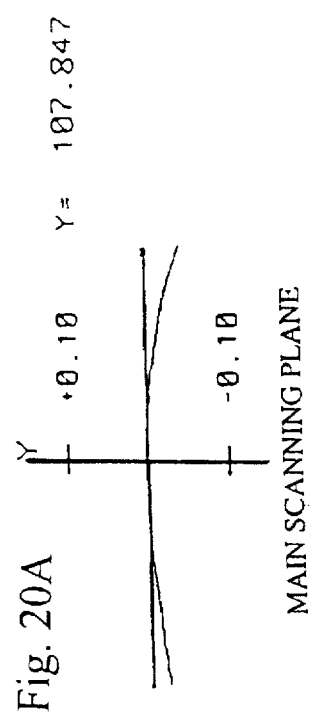
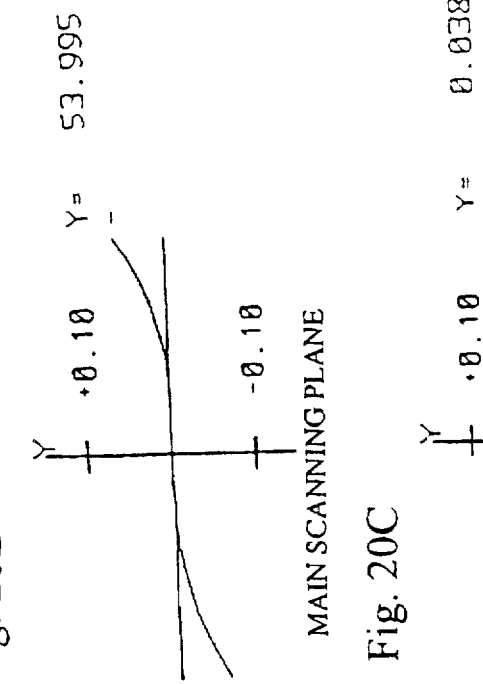
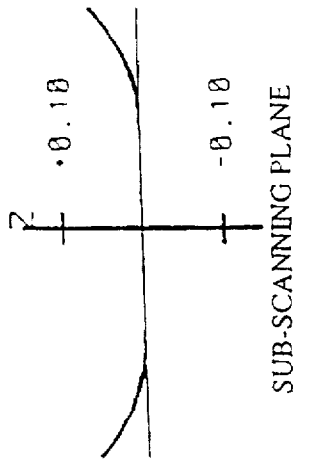
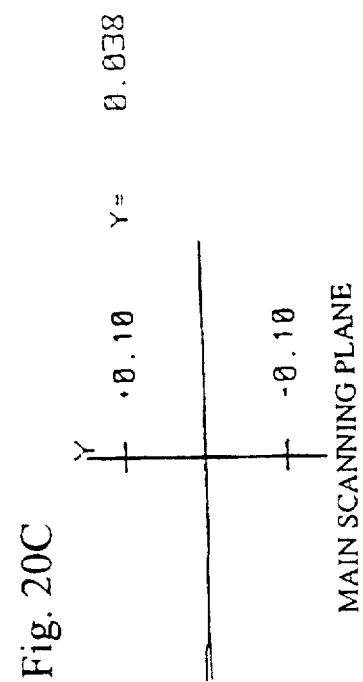
Fig. 20A  Fig. 20B  Fig. 20C  Fig. 20F  Fig. 20G  Fig. 20H fθ characteristic curvature of field

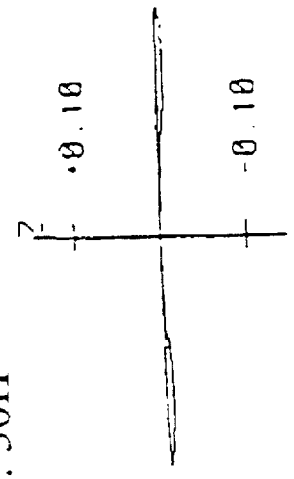
Fig. 30A
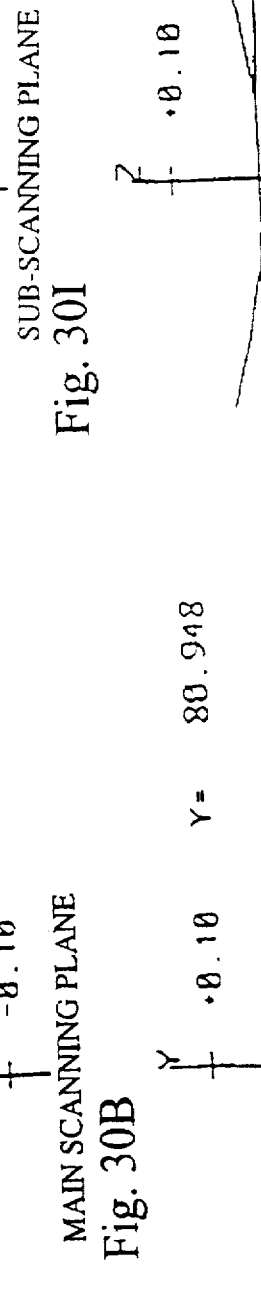
Fig. 30B  MAIN SCANNING PLANE
Fig. 30C  MAIN SCANNING PLANE
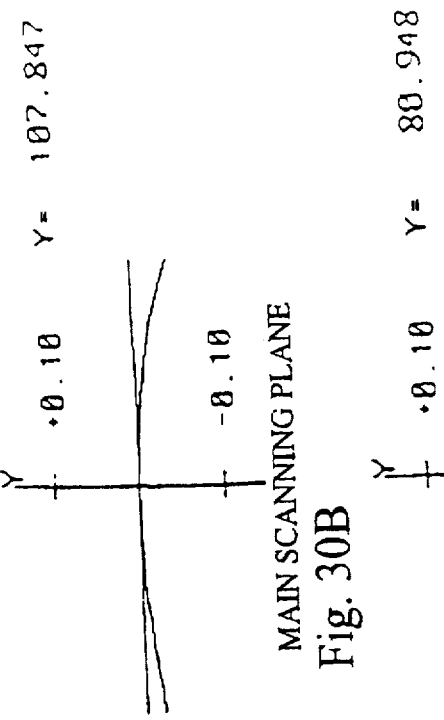
Fig. 30H
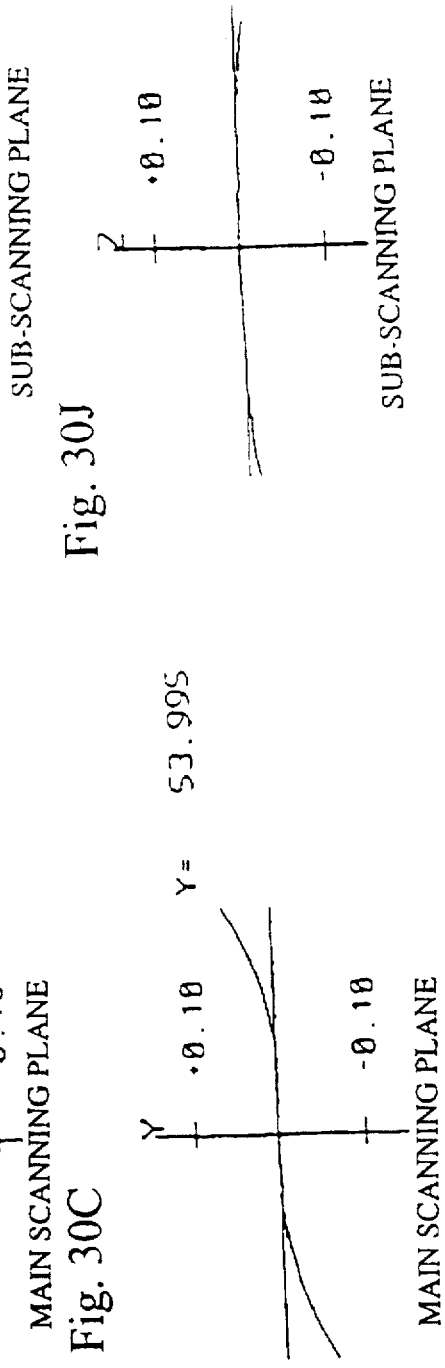
Fig. 30I  SUB-SCANNING PLANE
Fig. 30J  SUB-SCANNING PLANE

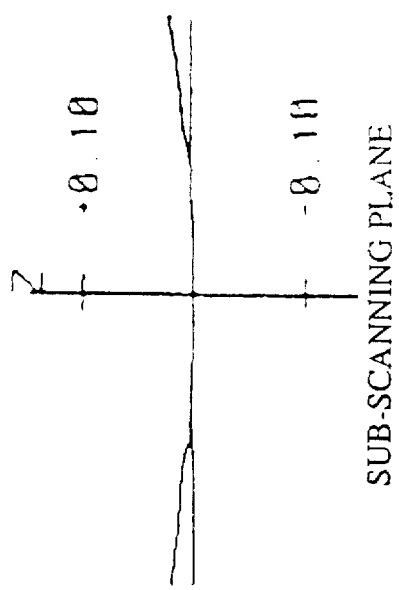
Fig. 30M
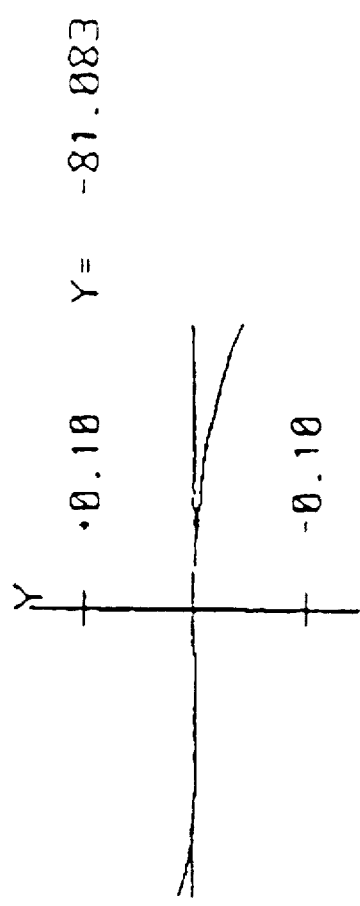
Fig. 30F
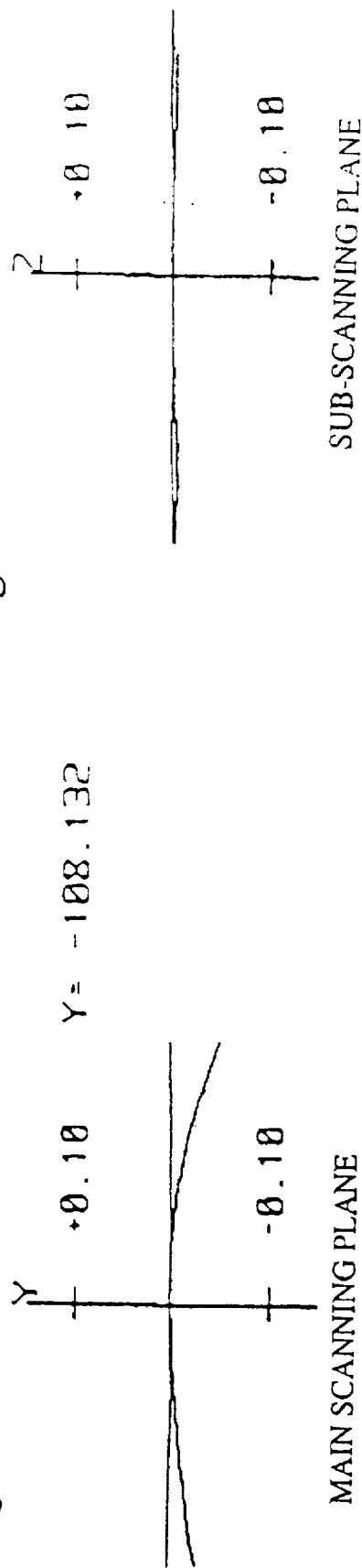
Fig. 30N
Fig. 30G

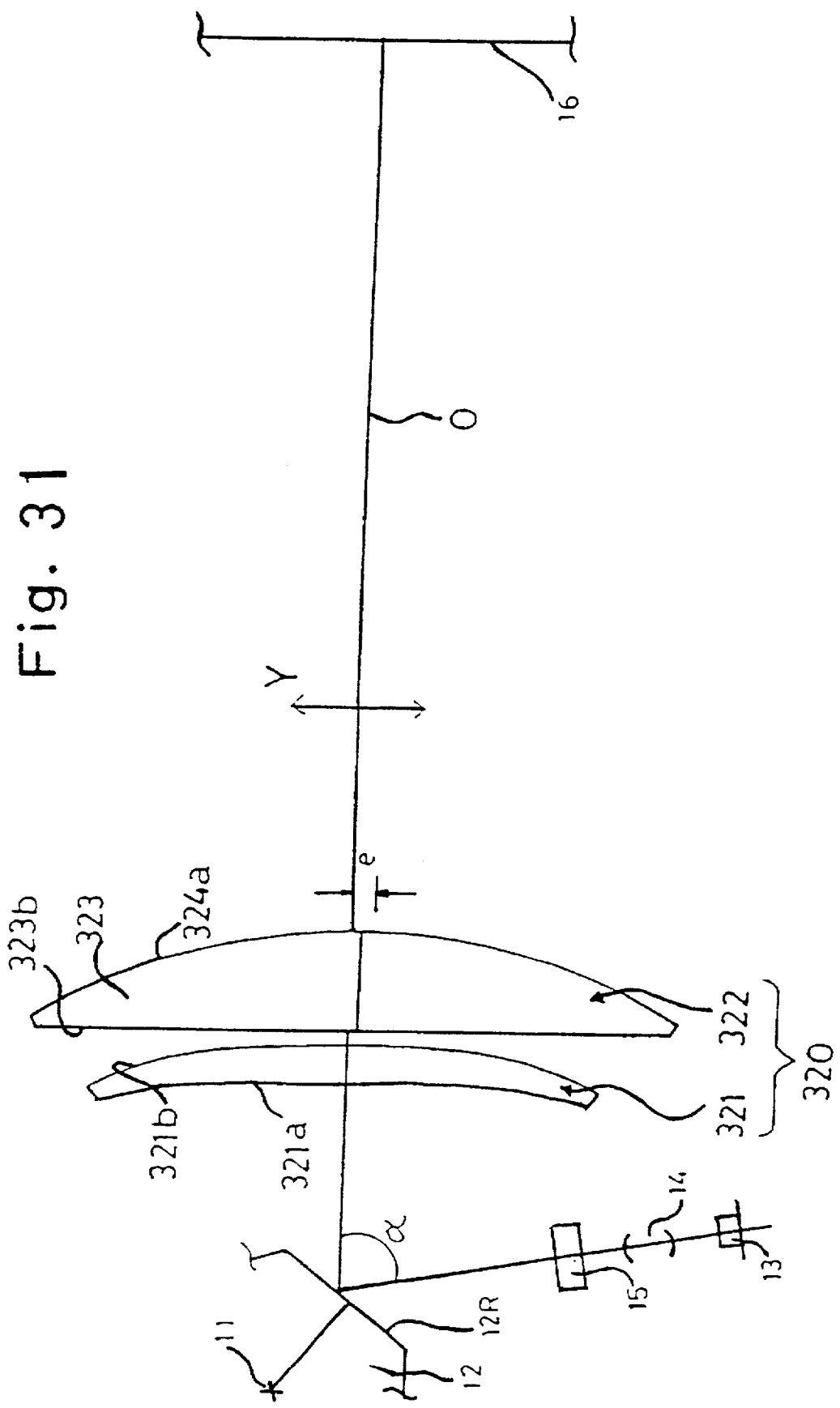

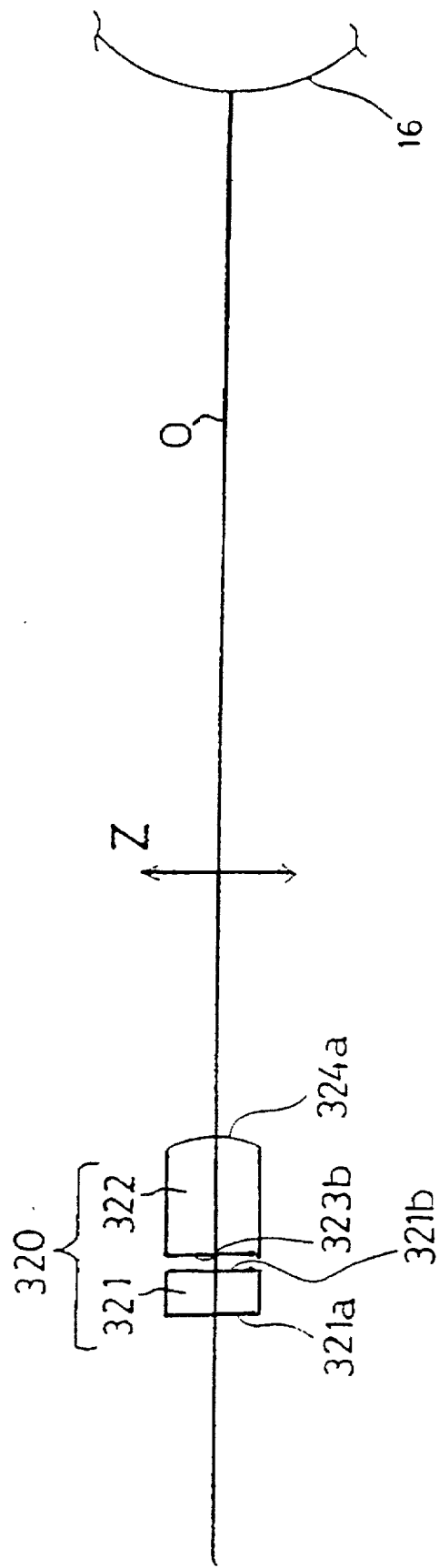

fθ characteristic

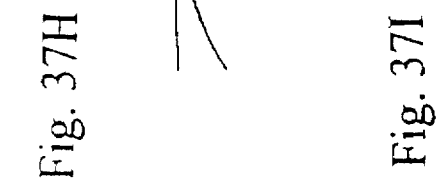
Fig. 37A  Y = 187.847
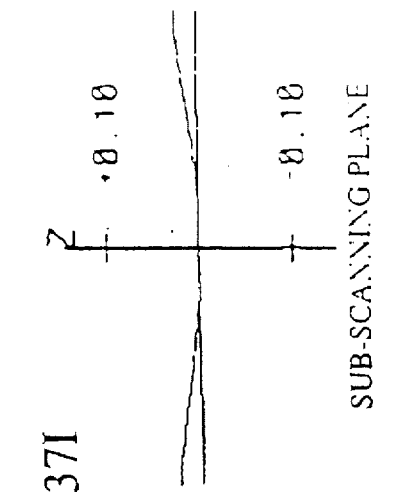
Fig. 37B  Y = 88.948
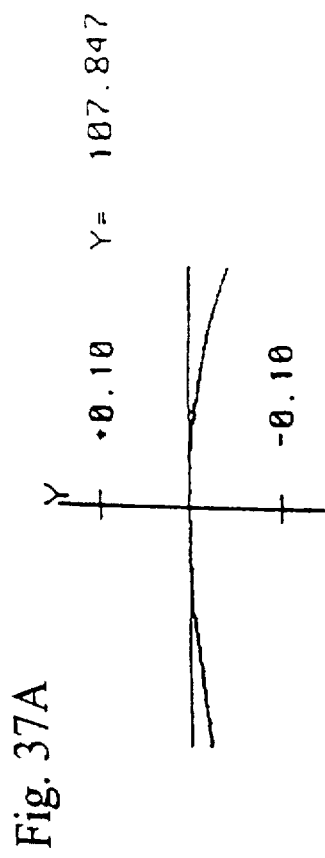
Fig. 37C  Y = 53.995
MAIN SCANNING PLANE
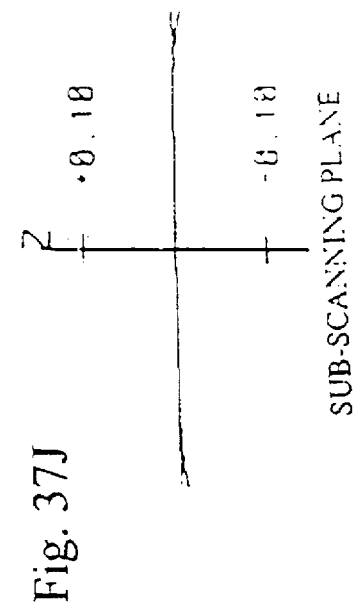
Fig. 37H
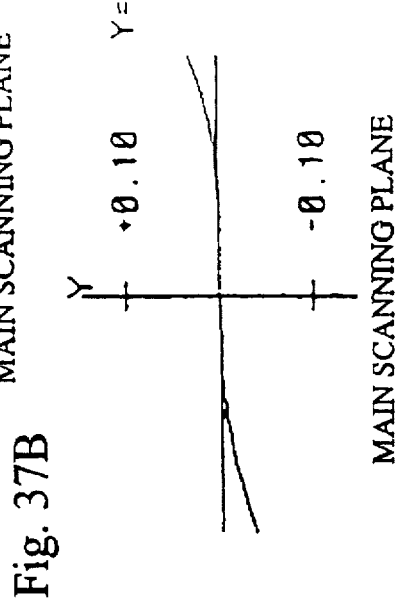
Fig. 37I
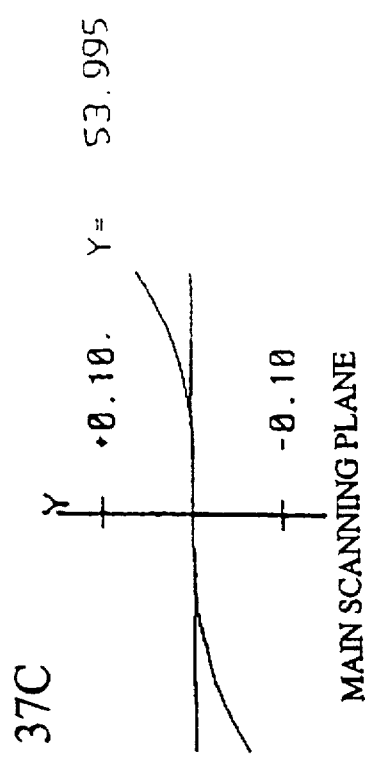
Fig. 37J
SUB-SCANNING PLANE

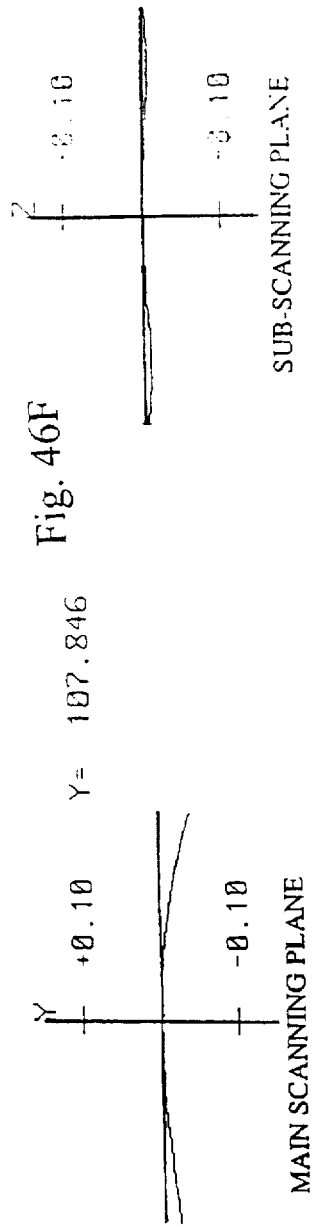
Fig. 46A
Fig. 46B
Fig. 46C
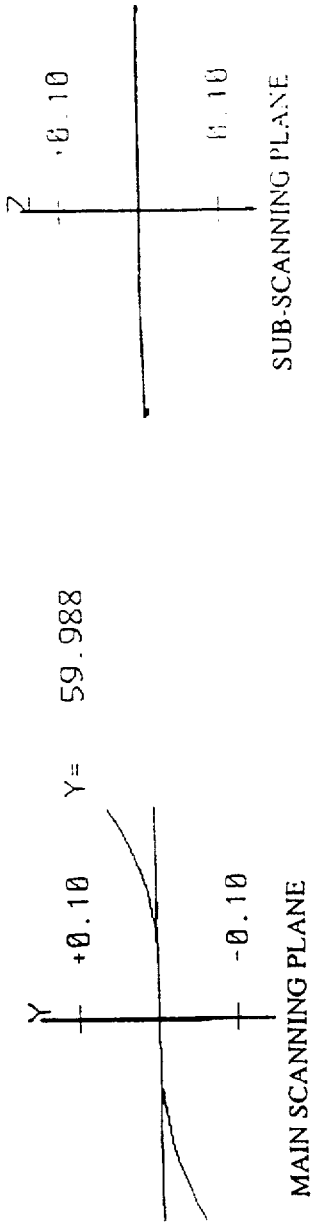
Fig. 46F
Fig. 46G
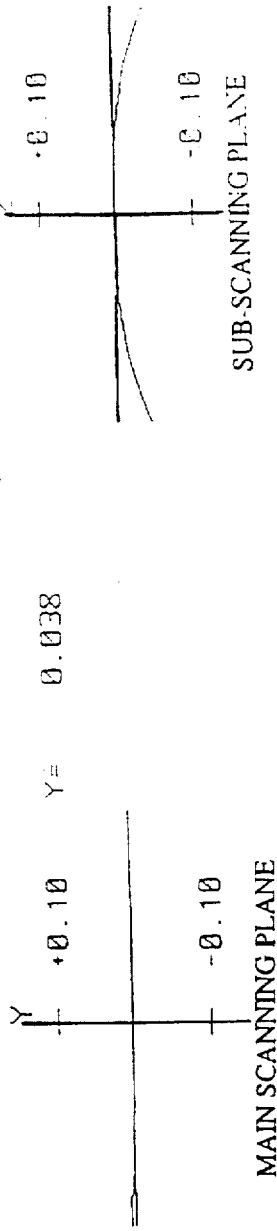
Fig. 46H

SCANNING OPTICAL SYSTEMS

BACKGROUND OF THE INVENTION

1. Field of the Invention

The present invention relates to a scanning optical system.

2. Description of Related Art

A scanning optical system is essential to the operation of a laser printer, a laser scanner, a bar code reader or the like. In a typical scanning optical system, a polygonal mirror, a hologram disk or the like is used as a light deflector. A laser beam emitted from a semiconductor laser is incident upon, and deflected by, the light deflector. The laser beam subsequently passes through a scanning lens system such as an fθ lens system, to scan a predetermined area on a scanning surface (i.e., the main scanning is executed). The scanning surface could be, for example, a sensitive paper or plate. While the main scanning is being executed, the scanning surface is moved in a direction perpendicular to the direction of the main scanning (i.e., the sub-scanning is executed). Thereby, the scanning surface is two-dimensionally scanned.

In order to achieve a high precision or resolution scanning optical system, it is necessary to effect an arrangement so that the fθ lens system converges a bundle of rays of a laser beam in such an manner so as to make the diameter of the beam spot on the scanning surface small. In general, the laser beam emitted from a semiconductor laser is converged into an oblong shape extending along the main scanning direction in the vicinity of the light deflector. Moreover, the fθ lens system generally has a larger magnification in the sub-scanning direction than in the main-scanning direction due to its function of making the above oblonged-shaped laser beam into a beam spot and focusing it onto the scanning surface. Furthermore, it has been recently confirmed that the magnitude of the spherical aberration in a sub-scanning plane (i.e., a plane extending along the sub-scanning direction) reaches a level that cannot be disregarded when making the diameter of the laser beam incident on the fθ lens system large in providing a high precision or resolution scanning optical system.

SUMMARY OF THE INVENTION

The object of the present invention is to provide a scanning optical system in which a spherical aberration in a sub-scanning plane is properly corrected.

To achieve the object mentioned above, according to the first aspect of the present invention, there is provided a scanning optical system that includes a light source for emitting a beam of light, a light deflector for deflecting the beam of light in a main scanning direction, and a scanning lens system which receives a beam of light deflected by the light deflector for focusing the deflected beam of light onto a scanning surface. At least one surface of a lens in the scanning lens system is formed as a sub-scanning-plane aspherical surface so as to correct a spherical aberration in a sub-scanning plane extending in a sub-scanning direction perpendicular to the main scanning direction.

The above-noted "a sub-scanning-plane aspherical surface" is a surface unique to the present invention which has the cross-sectional shape of a non-circular arc in any sub-scanning plane.

The lens in the scanning lens system is preferably a plastic lens since the lens can be easily produced from plastic rather than glass.

Preferably, the above at least one surface has a center of curvature in a main scanning plane extending in the main scanning direction, the center of curvature being located on the side of the light deflector.

Preferably, a distance between the sub-scanning-plane aspherical surface and a reference surface in a first direction parallel to an optical axis of the lens in the scanning lens system increases in a second direction away from the optical axis in the sub-scanning plane so that a thickness of the lens in the first direction increases in the second direction away from the optical axis. The above reference surface is a circular arc surface defined by the paraxial radius of curvature of the lens.

Preferably, the above at least one surface has a rotational axis which is substantially parallel to the sub-scanning direction.

The scanning lens system may consist of a first plastic lens, a glass toric lens, and a second plastic lens, in respective order from the light deflector, the sub-scanning-plane aspherical surface being formed on the second plastic lens.

The one surface of the glass toric lens which faces in the direction of the scanning plane may be formed as a convex toric surface, the convex toric surface having a rotational axis substantially parallel to the sub-scanning direction, and the other surface of the glass toric lens which faces in the direction of the light deflector may be formed as a flat surface.

The above at least one surface of the first plastic lens may be formed as a rotationally-symmetrical aspherical surface which has an axis parallel to an optical axis of the scanning lens system as a rotational center.

The one surface of the second plastic lens which faces in the direction of the light deflector may be formed as a toric surface having a rotational axis substantially parallel to the main scanning direction, and the other surface of the second plastic lens which faces in the direction of the scanning plane may be formed as the sub-scanning-plane aspherical surface.

The sub-scanning-plane aspherical surface may be formed as a non-circular arc surface which has a rotational axis extending in a direction substantially parallel to the sub-scanning direction.

The second plastic lens may be offset from an optical axis of the scanning lens system by a predetermined distance.

The scanning lens system may consist of a plastic lens and a glass toric lens, in respective order from the light deflector, the sub-scanning-plane aspherical surface being formed on the glass toric lens.

The one surface of the plastic lens which faces in the direction of the light deflector and the other surface of the plastic lens which faces in the direction of the scanning surface each may be formed as a toric surface which has a rotational axis extending in the main scanning direction and is formed as an aspherical surface in a main scanning plane extending along the main scanning direction.

The one surface of the glass toric lens which faces in the direction of the light deflector may be formed as a cylindrical surface having a curvature in the sub-scanning direction, and the other surface of the glass toric lens which faces in the direction of the scanning plane may be formed as the sub-scanning-plane aspherical surface.

The sub-scanning-plane aspherical surface to which the first aspect of the present invention is applied is not an aspherical surface which is rotationally-symmetrical about the optical axis. Even if the sub-scanning-plane aspherical surface is formed so as to have a shape which counteracts a spherical aberration, no negative effects will be given to the curvature of field in the sub-scanning direction and fθ characteristic of the scanning lens system. When the radius of curvature of a lens surface in a sub-scanning plane is made small for the purpose of reduce the curvature of field in the sub-scanning direction, a large spherical aberration tends to occur. However, the spherical aberration can be counteracted by making the lens surface a sub-scanning-plane aspherical surface of the present invention.

In order to correct the spherical aberration in any sub-scanning planes, it is preferable that the sub-scanning-plane aspherical surface be formed in such a manner that the aspherical amounts in all sub-scanning planes located at different points in the main scanning direction are different from one another. However, this manner is not suitable for a mass-production. Therefore, practically, it is preferable that the sub-scanning-plane aspherical surface be formed in such a manner so as to have a rotational axis extending in a direction substantially parallel to the sub-scanning direction.

The first aspect of the present invention does not prevent a lens surface from being formed as an aspherical surface in a main scanning plane for correcting the fθ characteristic and curvature of field in the main scanning direction.

According to the second aspect of the present invention, there is provided a scanning optical system that includes a light source for emitting a beam of light, a first optical system which receives the beam of light for changing a cross-sectional shape of the beam of light into an oblong shape extending along a main scanning direction; a light deflector for deflecting the oblong-shaped beam of light in the main scanning direction, and a second optical system which receives a beam of light deflected by the light deflector for focusing the deflected beam of light onto a scanning surface. The at least one surface of a lens in the first optical system is formed as a sub-scanning-plane aspherical surface so as to correct a spherical aberration in a sub-scanning plane extending in the sub-scanning direction, the spherical aberration being caused by the second optical system.

Preferably, the first optical system includes a cylindrical lens, one surface of the cylindrical lens being formed as the sub-scanning-plane aspherical surface.

The above one surface of the cylindrical lens may be either one of the surfaces of the cylindrical lens.

The second optical system may consist of a plastic lens and a glass toric lens in respective order from the light deflector.

The glass toric lens may be offset from an optical axis of the second optical system by a predetermined distance.

Preferably, a distance between the sub-scanning-plane aspherical surface and a reference surface in a first direction of an optical axis of the lens in the first optical system increases in a second direction away from the optical axis in the sub-scanning plane so that a thickness of the lens in the first direction increases in the second direction away from the optical axis. The above reference surface is a circular arc surface defined by the paraxial radius of curvature of the lens.

The first optical system, which changes a cross-sectional shape of the beam of light emitted from a light source into an oblong shape extending along a main scanning direction, is generally smaller than the second optical system, .which receives the oblong-shaped beam of light for projecting it onto a scanning surface as a spot image. Therefore, according to the second aspect of the present invention, the sub-scanning-plane aspherical surface of the present invention can be produced at a low cost, and the spherical aberration in the scanning optical system can be corrected uniformly at any image height.

The second aspect of the present invention does not prevent a surface of a lens in the second optical system from being formed as an aspherical surface in a main scanning plane for correcting the fθ characteristic and curvature of field in the main scanning direction.

According to the third aspect of the present invention, the lens in the scanning lens system is a hybrid lens which is comprised of a glass lens and a plastic layer attached to the glass lens. The sub-scanning-plane aspherical surface is formed on a surface of the plastic layer.

Preferably, the glass lens is a cylindrical lens including a cylindrical surface, the plastic layer being attached to the cylindrical surface.

Preferably, the glass lens is a cylindrical lens including a cylindrical surface facing in the direction of the light source and a flat surface facing in the direction of the polygonal mirror, the plastic layer being attached to the flat surface.

Preferably, a thickness of the plastic layer in a direction of an optical axis of the hybrid lens increases in a direction away from the optical axis in a sub-scanning plane.

The second optical system may consist of a plastic lens and a glass toric lens, in respective order from the light deflector.

The glass toric lens is deviated from an optical axis of the second optical system by a predetermined distance.

Preferably, a paraxial radius of curvature of the sub-scanning-plane aspherical surface of the hybrid lens is arranged to be substantially the same as a radius of curvature of the cylindrical surface.

The first optical system is Generally smaller than the second optical system. Therefore, according to the third aspect of the present invention, a hybrid lens on which the sub-scanning-plane aspherical surface of the present invention is formed can be produced at a low cost, and the spherical aberration in the scanning optical system can be corrected uniformly at any image height.

The third aspect of the present invention does not prevent a lens surface, specifically a lens surface in the second optical system, from being formed as an aspherical surface in a main scanning plane for correcting the fθ characteristic and curvature of field in the main scanning direction.

According to the fourth aspect of the present invention, the lens in the scanning lens system is a hybrid lens which comprises a glass lens and a plastic layer attached to the glass lens. The sub-scanning-plane aspherical surface is formed on a surface of the plastic layer.

Preferably, the plastic layer is made of a thermosetting epoxy resin or ultraviolet-setting resin.

The scanning lens system may consist of a plastic lens and the hybrid lens, in respective order from the light deflector.

The hybrid lens may be offset from an optical axis of the scanning lens system by a predetermined distance.

Preferably, the glass lens has a toric surface facing in the direction of the light source and a cylindrical surface facing in the direction of the light deflector, the plastic layer being attached to the toric surface. The plastic layer may be attached to the cylindrical surface.

Preferably, the surface of the plastic layer and the surface of the glass lens each have a center of curvature in a main scanning plane extending in the main scanning direction, the center of curvature being located on the side of the light deflector.

Preferably, a thickness of the plastic layer in a direction of an optical axis of the hybrid lens increases in a direction away from the optical axis in a sub-scanning plane.

Preferably, the sub-scanning-plane aspherical surface has a rotational axis which is substantially parallel to the sub-scanning direction.

Preferably, the surface of the glass lens is a toric surface which has a rotational axis extending in the sub-scanning direction.

Preferably, a paraxial radius of curvature of the sub-scanning-plane aspherical surface of the hybrid lens is arranged to be substantially the same as a radius of curvature of the toric surface.

The sub-scanning-plane aspherical surface formed by the plastic layer is not an aspherical surface which is rotationally-symmetrical about the optical axis. Even if the sub-scanning-plane aspherical surface of the plastic layer is formed so as to have a shape which counteracts a spherical aberration, no negative effects will be given to the curvature of field in the sub-scanning direction and fθ characteristic of the scanning lens system. When the radius of curvature of a lens surface in a sub-scanning plane is made small for the purpose of reduce the curvature of field in the sub-scanning direction, a large spherical aberration tends to occur. However, the spherical aberration can be counteracted by the sub-scanning-plane aspherical surface of the present invention that is formed by the plastic layer.

The fourth aspect of the present invention does not prevent a lens surface in the scanning optical system from being formed as an aspherical surface in a main scanning plane for correcting the fθ characteristic and curvature of field in the main scanning direction.

According to the fifth aspect of the present invention, there is provided a scanning optical system that includes a light source for emitting a beam of light a first optical system which receives the beam of light for changing a cross-sectional shape of the beam of light into an oblong shape extending along a main scanning direction, a light deflector for deflecting the oblong-shaped beam of light in the main scanning direction, and a second optical system which receives a beam of light deflected by the light deflector for focusing the deflected beam of light onto a scanning surface. The first optical system includes a lens which has a first surface on one side of the lens and a second surface on the other side of the lens. The first surface is a toric surface which has a rotational axis extending in a sub-scanning direction perpendicular to the main scanning direction, and the second surface is a curved surface which has a curvature at least in the main scanning direction. Further, the at least one of the first and second surfaces is also formed as a sub-scanning-plane aspherical surface, the sub-scanning-plane aspherical surface having a rotational axis extending in the sub-scanning direction.

The second optical system may consist of a plastic lens and a glass toric lens, in respective order from the light deflector.

The glass toric lens may be offset from an optical axis of the second optical system by a predetermined distance.

Preferably, a focal point of the toric surface in a main scanning plane extending in the main scanning direction is substantially coincident with that of the curved surface so that the lens may have substantially no magnification in the main scanning direction.

The lens of the first optical system may be a glass lens. Preferably, the lens of the first optical system is a hybrid lens which is comprised of a glass lens and a plastic layer attached to the glass lens.

Preferably, the glass lens has a toric surface, and the plastic layer is attached to the toric surface so as to form the aspherical surface on a surface of the plastic layer.

Preferably, a distance between said sub-scanning-plane aspherical surface and a reference curved surface in a first direction of an optical axis of the lens increases in a second direction away from the optical axis in the sub-scanning-plane so that a thickness of the lens in the first direction increases in the second direction away from the optical axis. The above reference surface is a circular arc surface defined by the paraxial radius of curvature of the lens.

Preferably, the plastic layer is made of a thermosetting epoxy resin or ultraviolet-setting resin.

The fifth aspect of the present invention does not prevent a lens surface in the scanning optical system from being formed as an aspherical surface in a main scanning plane for correcting the fθ characteristic and curvature of field in the main scanning direction.

The present disclosure relates to subject matter contained in Japanese patent applications Nos. 6-156219 (filed on Jul. 7, 1994), 6-156220 (filed on Jul. 7, 1994), 6-163697 (filed on Jul. 15, 1994), 6-163698 (filed on Jul. 15, 1994), 6-283812 (filed on Nov. 17, 1994), and 7-132456 (filed on May 30, 1995) which are expressly incorporated herein by reference in their entireties.

BRIEF DESCRIPTION OF THE DRAWINGS

The invention will be described below in detail with reference to the accompanying drawings, in which;

FIGS. 5A–5J are graphs showing the spherical aberration (i.e., wavefront aberration) in main and sub-scanning planes of the scanning optical system illustrated in FIGS. 1 and 2, in the case where one surface of a lens in a scanning lens system is formed in such a manner so as to have the cross-sectional shape of a non-circular arc in any sub-scanning plane in accordance with the first embodiment of the present invention;

FIGS. 11A–11F are graphs showing the spherical aberration (i.e., wavefront aberration) in main and sub-scanning planes of the scanning optical system illustrated in FIGS. 7 and 8, in the case where one surface of a lens in a scanning lens system is formed in such a manner so as to have the cross-sectional shape of a non-circular arc in any sub-scanning plane in accordance with the second embodiment of the present invention;

FIGS. 12A–12F are graphs showing the spherical aberration (i.e., wavefront aberration) in main and sub-scanning planes of the scanning optical system illustrated in FIGS. 7 and 8, in the case where none of the lens surfaces in a scanning lens system has the cross-sectional shape of a non-circular arc in any sub-scanning plane;

FIGS. 20A–20J are graphs showing the spherical aberration (i.e., wavefront aberration) in main and sub-scanning planes of the scanning optical system illustrated in FIGS. 15 and 16, in the case where a cylindrical surface of the cylindrical lens does not have the cross-sectional shape of a non-circular arc in any sub-scanning plane;

FIG. 31 is a plan view of a scanning optical system according to the fifth embodiment of the present invention;

FIG. 32 is a front view of the scanning optical system shown in FIG. 31;

FIGS. 46A–47J are graphs showing the spherical aberration (i.e., wavefront aberration) in main and sub-scanning planes of the scanning optical system illustrated in FIGS. 38 and 39, in the case where the beam-shape changing lens shown in FIG. 40 or 42 is used;

FIG. 47 is a perspective view of the beam-shape changing lens shown in FIG. 40 or 42, illustrating the general shape of the beam-shape changing lens;

DESCRIPTION OF THE PREFERRED EMBODIMENTS

Generally, in a scanning optical system, a semiconductor laser emits a beam of light which scans a scanning surface along a predetermined scanning direction. While being scanning along the predetermined scanning direction, the scanning surface is moved in a direction perpendicular to the predetermined scanning direction, relative to the position where beam of light scans. Therefore, the scanning surface is two-dimensionally scanned. In the following description, the predetermined scanning direction is referred to as a main scanning direction, and the direction of the relative movement of the scanning surface is referred to as a sub-scanning direction. Furthermore, a plane extending along the main scanning direction is referred to as a main scanning plane, and likewise, a plane extending along the sub-scanning direction is referred to as a sub-scanning plane.

[First Embodiment]

Figure 1:
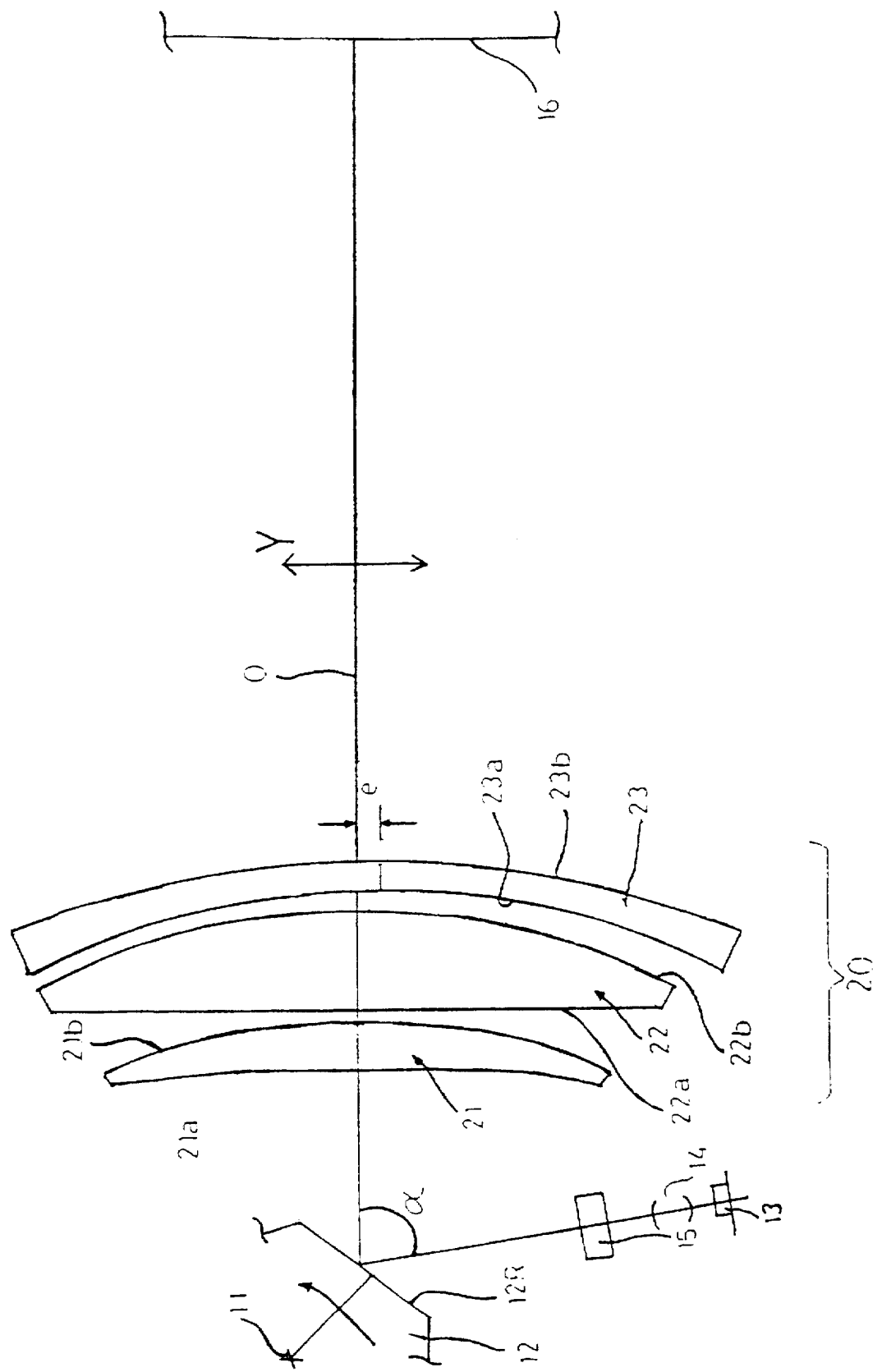
FIG. 1 is a plan view of a scanning optical system according to the first embodiment of the present invention.
Figure 2:
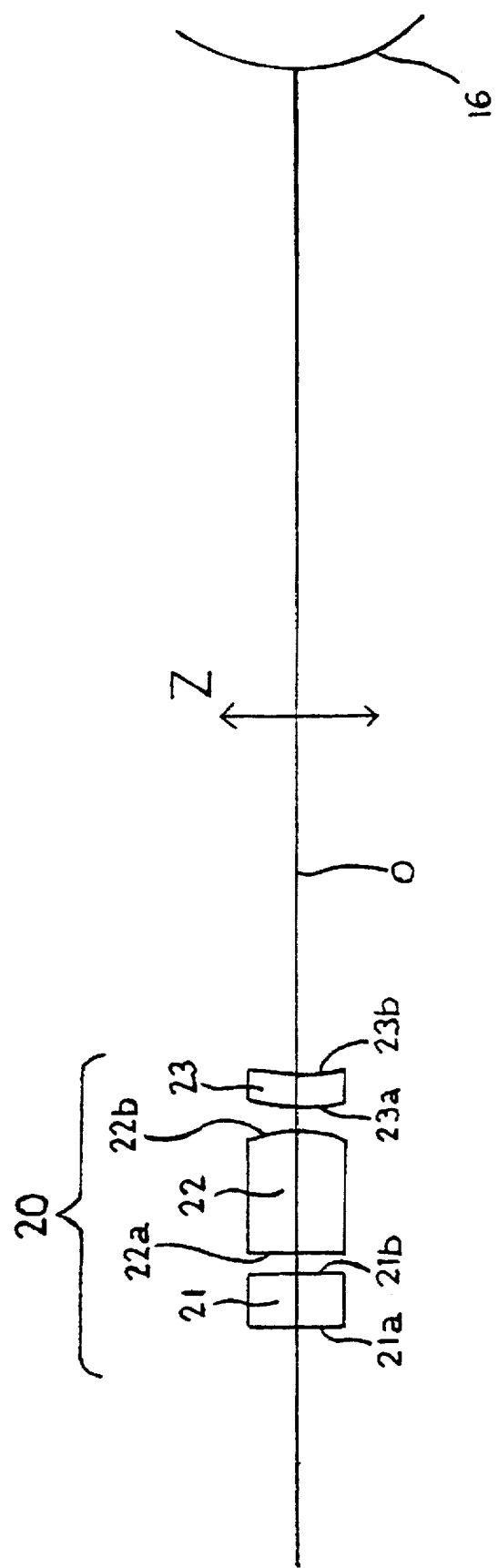
FIG. 2 is a front view of the scanning optical system shown in FIG. 1.

FIGS. 1 and 2 show the configuration of the scanning optical system according to a first embodiment to which the first aspect of the present invention is applied. In FIG. 1, a polygonal mirror 12 (i.e., a light deflector) is shown which is rotatable about a rotational axis 11. A laser beam emitted from a semiconductor laser 13 passes through a collimator lens 14 and a cylindrical lens 15, and is incident upon the polygonal mirror 12. The laser beam is deflected by each reflection surface 12R. Subsequently, the light beam passes through a scanning lens system 20 to scan a scanning surface 16. In the case of a laser printer, the scanning surface 16 is a photosensitive drum. The collimator lens 14 collimates the beam passing therethrough. The cylindrical lens 15 changes a cross-sectional shape of the collimated laser beam passing therethrough into an oblong shape extending along the main scanning direction.

The scanning lens system 20 in the first embodiment consists of three lenses, i.e., a first plastic lens 21, a glass toric lens 22, and a second plastic lens 23, in respective order from the polygonal mirror 12.

The glass toric lens 22 produces most of the magnification of the scanning lens system 20 both in the main and sub-scanning directions Y and Z. The surface 22b facing towards the scanning surface 16 is formed as a toric surface which has a rotational axis substantially parallel to the sub-scanning direction Z (i.e., the direction perpendicular to the optical axis O and perpendicular to the plane of the paper of FIG. 1) and whose convex surface faces in the direction according to a scanning surface 16. The surface 22a facing in the direction of the polygonal mirror 12 is formed as a flat surface.

The plastic lens 21 functions so as to correct the curvature of field and fθ characteristic in the main scanning direction Y (i.e., the direction perpendicular to an optical axis O and in the plane of the paper of FIG. 1) among the aberrations produced by the glass toric lens 22. At least one of the surfaces 21a and 21b of the plastic lens 21 is preferably formed as a rotationally-symmetrical aspherical surface which has an axis parallel to an optical axis 0 of the scanning lens system 20 as a rotational center.

Regarding the plastic lens 23, the surface 23a facing in the direction of the polygonal mirror 12 is formed as a toric surface having a rotational axis substantially parallel to the main scanning direction Y. The surface 23b facing in the direction of the scanning surface 16 is formed as a surface having the cross-sectional shape of a non-circular arc in any sub-scanning plane, the surface being unique to the present invention. In the following description, a lens surface having such a cross-sectional shape of a non-circular arc in any sub-scanning plane is referred to as a "sub-scanning-plane aspherical surface." Likewise, in the following description, a lens surface having a cross-sectional shape of a non-circular arc in any main scanning plane is referred to as a "main-scanning-plane aspherical surface."

Figure 13:
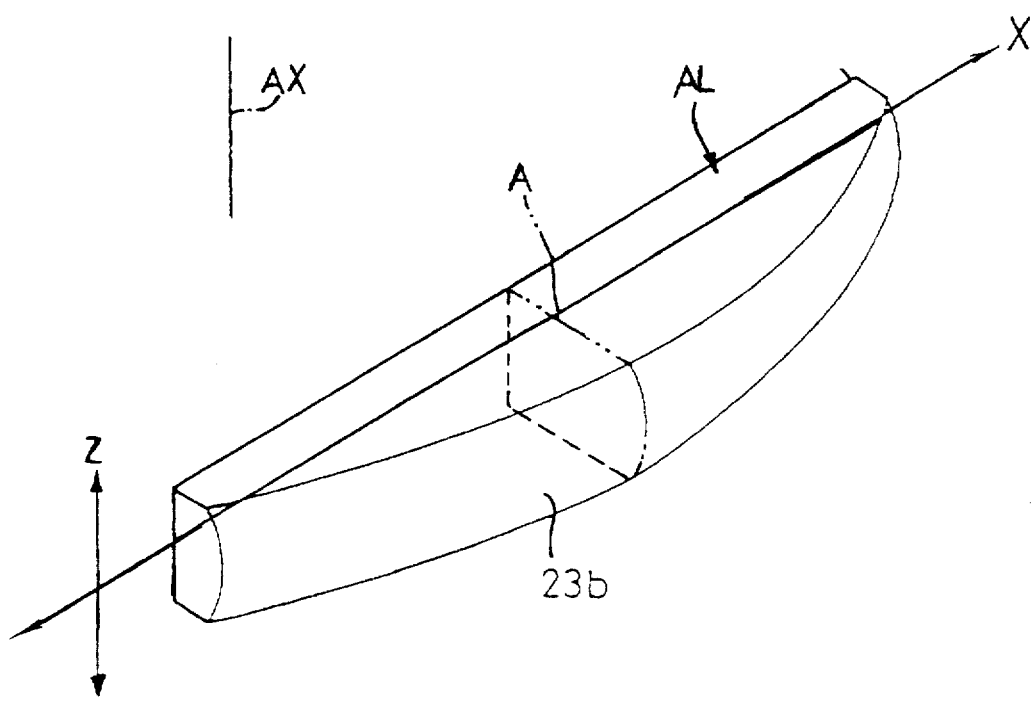
FIG. 13 is a perspective view of a lens illustrating about a lens surface having the cross-sectional shape of a non-circular arc in any sub-scanning plane, the lens surface being formed in accordance with the present invention.
Figure 14:
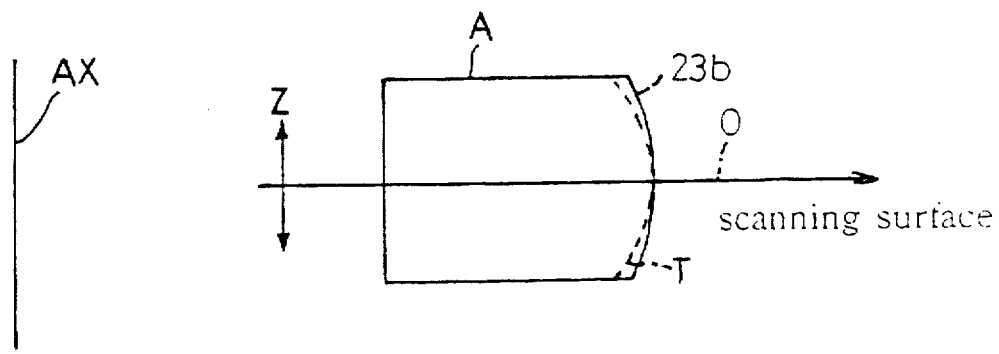
FIG. 14 is a cross-sectional view of the lens shown in FIG. 13, showing the relationship between the lens surface having the cross-sectional shape of a non-circular arc in any sub-scanning plane and an imaginary cylindrical surface T along a cross section A shown in FIG. 13.

FIGS. 13 and 14 are presented for the purpose of illustrating the sub-scanning-plane aspherical surface 23b. FIGS. 13 and 14 show an anamorphic lens AL having a different value of magnification in the main and sub-scanning directions Y and Z. For the purpose of illustration, let us assume that one surface of the anamorphic lens AL is equivalent to the sub-scanning-plane aspherical surface 23b. In FIG. 14, the dotted line T represents an imaginary toric surface (i.e., a reference surface) having a rotational axis AX substantially parallel to the sub-scanning direction Z, for the purpose of comparison with the sub-scanning-plane aspherical surface 23b. The shape of the toric surface T along a sub-scanning plane is a circular arc. As can be seen from FIG. 14, the sub-scanning-plane aspherical surface 23b is formed in such a manner so as to make the imaginary toric surface or circular arc surface T extend towards the scanning surface 16 with the extension increasing in a direction away from the optical axis O. The spherical aberration in sub-scanning planes can be corrected by such a surface as the sub-scanning-plane aspherical surface 23b.

In FIG. 14, the extension of the sub-scanning-plane aspherical surface 23b from the imaginary toric surface T towards the scanning surface 16 is exaggerated as compared with an actual extension for the purpose of illustration.

It is sometimes the case that a lens or a surface thereof is arranged to incline with respect to the optical axis of a scanning lens system so as to prevent a ghost-image from occurring due to the surface reflection of the lens. In this case, although the rotational axis of the lens is also slightly inclined towards the optical axis of the system, the present invention can also be applied to obtain a similar effect.

Regarding the sub-scanning-plane aspherical surface 23b, as noted above, the aspherical amounts in sub-scanning planes located at different points in the main scanning direction Y may be arranged to be different from one another so that the spherical aberration can be adequately corrected in any sub-scanning plane. In order to simplify the shape of the sub-scanning-plane aspherical surface 23b, it is preferable that the surface 23b be formed as a non-circular arc rotational surface having a rotational axis AX.

The magnification of the sub-scanning-plane aspherical surface 23b in the sub-scanning direction Z is constant at any point in the main scanning direction Y, and the variation of the magnification of the surface 23a directly appears on an image plane (i.e., the scanning surface 16). For this reason, the curvature of field in the sub-scanning direction Z, which tends to be large at the ends of the scanning lens system 20 in the main scanning direction Y, can be made small. In other words, the focal length may be extended by a large amount at the ends of the scanning lens system 20 in the main scanning direction Y as compared with the center of the scanning lens system in the main scanning direction Y, and thus the curvature of field can be made small.

In the case of an arrangement in which the radius of curvature in the center of the sub-scanning-plane aspherical surface 23b is the same as that in the center of the surface 23a, the plastic lens 23 would have no magnification in the center thereof in the sub-scanning direction Z, and thus, the curvature of field in the circumferential portion in the sub-scanning direction Z can be selectively corrected to be small. Furthermore, since the primary function of the plastic lens 23 is to make the curvature of field in the sub-scanning direction Z small, it is not necessary for the plastic lens 23 to have a large magnification. Therefore, the plastic lens 23 is hardly subject to the variation of temperature and/or humidity.

In the illustrated embodiment, the plastic lens 23 is formed as a meniscus in the main scanning direction and is convex towards the scanning surface 16 in the main scanning direction.

The plastic lens 23 is also formed as a meniscus in the sub-scanning direction. This arrangement of the plastic lens 23 formed as a meniscus in the sub-scanning direction makes it possible to make the magnification of the lens small and to effectively correct only the curvature of field in sub-scanning planes. Although the meniscus in the sub-scanning direction of the plastic lens 23 is convex towards the polygonal mirror 12 as shown in FIG. 2, it is possible to have an arrangement in which the meniscus in the sub-scanning direction is convex towards the scanning surface 16.

As shown in FIG. 1, the plastic lens 23 is arranged offset towards the semiconductor laser 13 from the optical axis O by a distance "e". This arrangement prevents the image plane in the sub-scanning direction Z from being asymmetrical with respect to the center of the image plane along the main scanning direction Y. In other words, the arrangement prevents the image plane in the sub-scanning direction Z from inclining towards the main scanning direction Y. The degree of the asymmetry becomes specifically large when an angle α made by an incident laser beam upon the reflection surface 12R and a laser beam reflected on the reflection surface 12R exceeds a specific angle.

Figure 3:
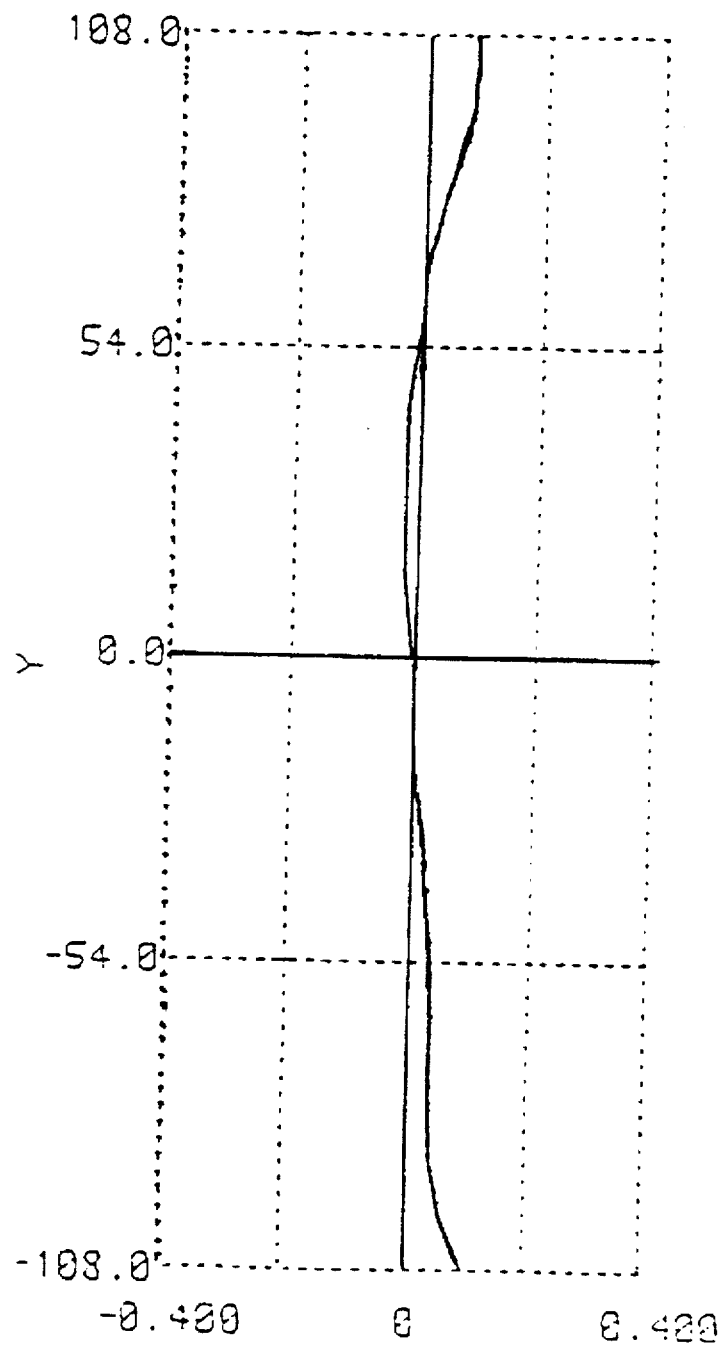
FIG. 3 is a graph showing the fθ characteristic of the scanning optical system illustrated in FIGS. 1 and 2.
Figure 4:
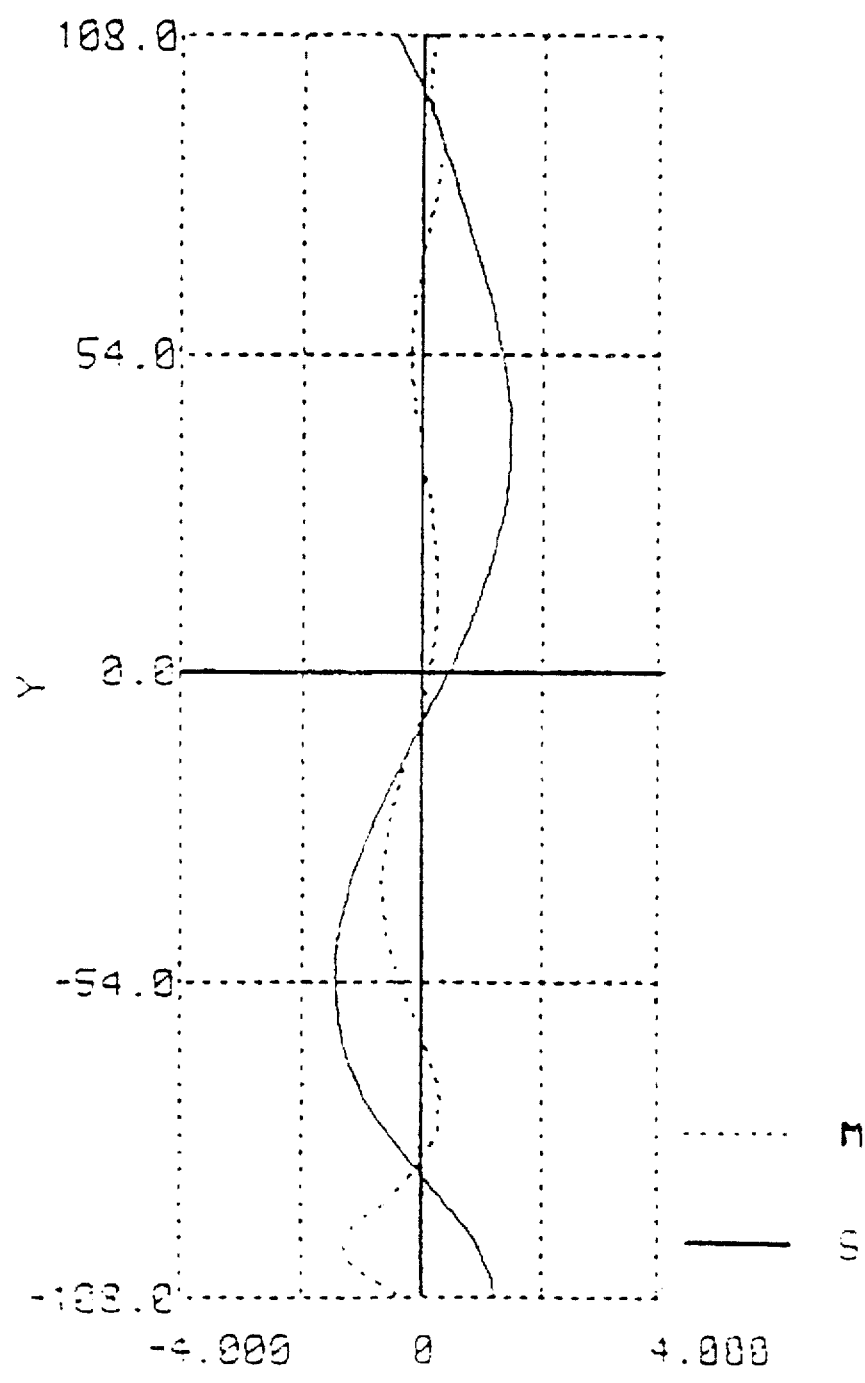
FIG. 4 is a graph showing the curvature of field in the scanning optical system illustrated in FIGS. 1 and 2.
Figure 6A:
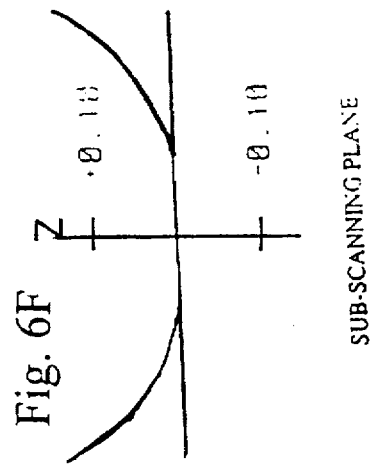
FIGS. 6A–6J are graphs showing the spherical aberration (i.e., wavefront aberration) in main and sub-scanning planes of the scanning optical system illustrated in FIGS. 1 and 2, in the case where none of the lens surfaces in a scanning lens system has the cross-sectional shape of a non-circular arc in any sub-scanning plane.
Figure 6B:
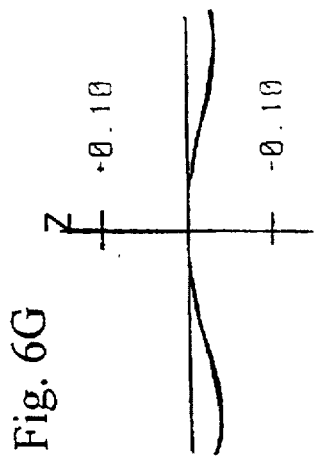
Figure 6C:
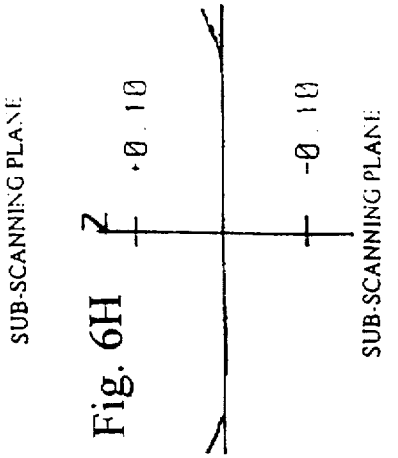
Figure 6F:
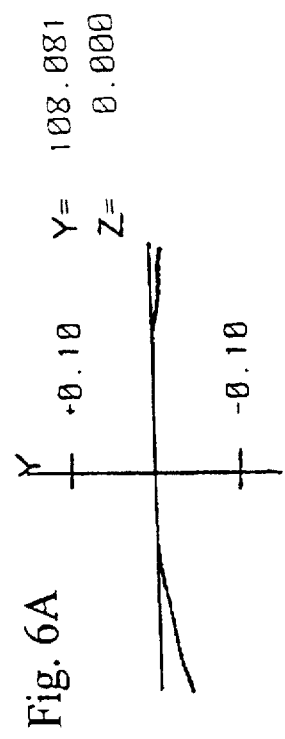
Figure 6G:
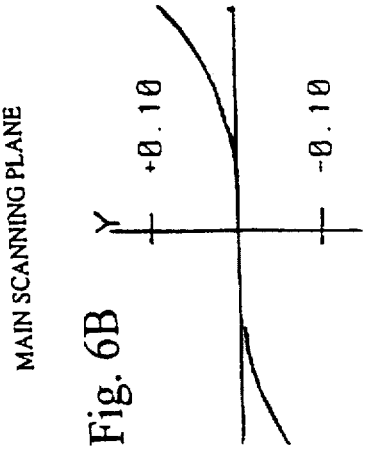
Figure 6H:
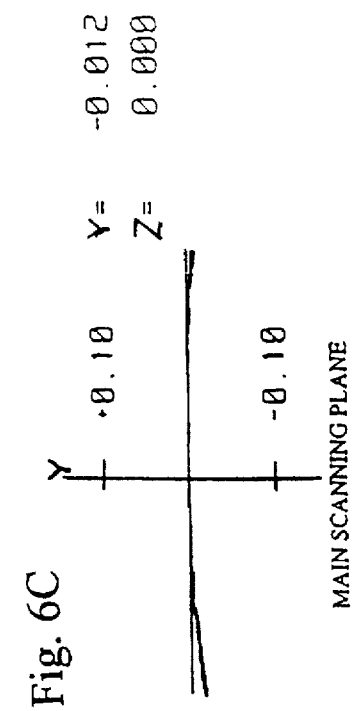
Figure 6D:
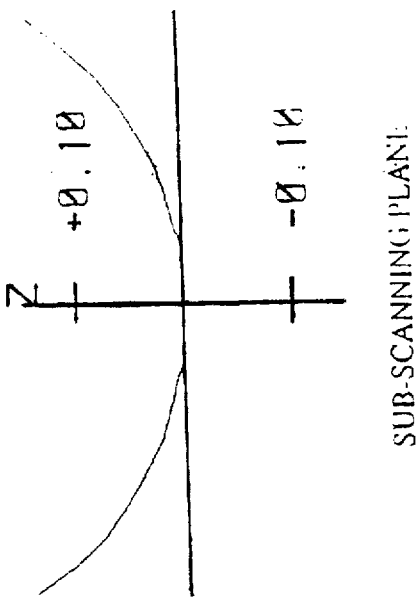
Figure 6E:
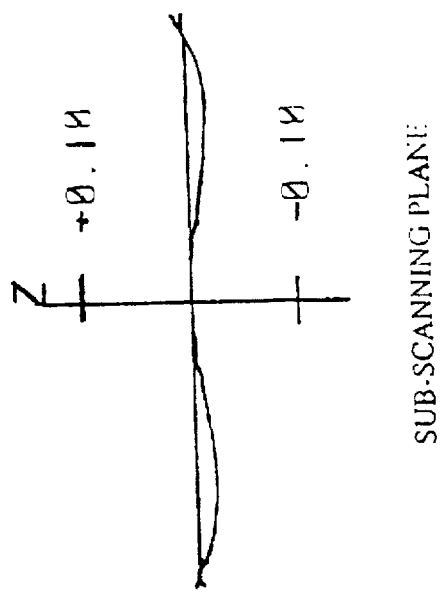
Figure 6I:
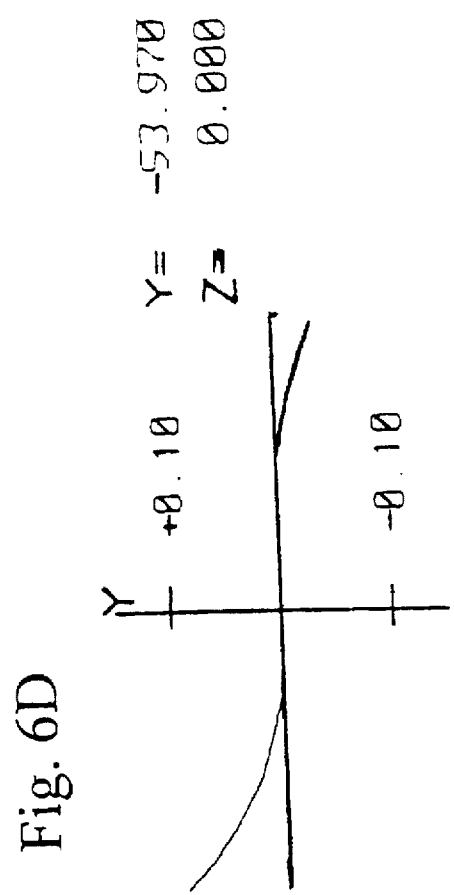
Figure 6J:
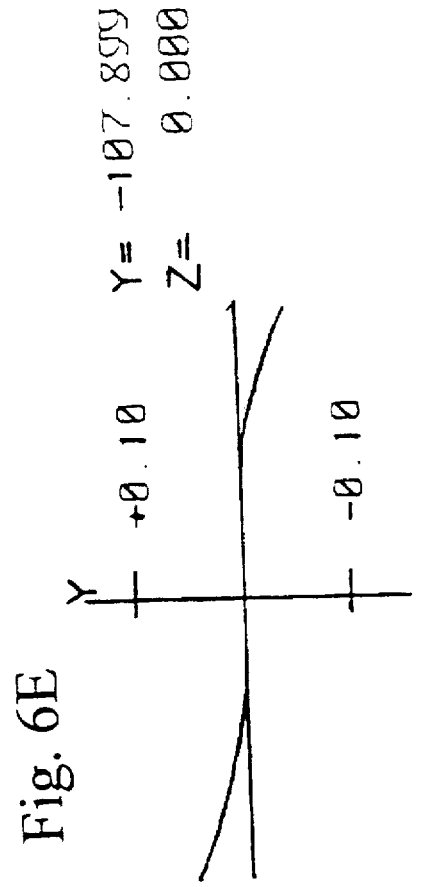

FIG. 3 is a graph showing the results of measuring the fθ characteristic of the scanning optical system 20 having the specific numerical values shown in Table 1. FIG. 4 shows a graph showing the results of measuring the curvature of field in the scanning optical system 20 in the meridional section M (i.e., main-scanning direction) and in the sagittal section S (i.e., sub-scanning direction). In FIGS. 3 and 4, the vertical line Y designates the position in the main-scanning direction. In FIG. 3, the horizontal line designates the displacement of the image height with respect to the ideal image height (mm). In FIG. 4, the horizontal line designates the displacement of the image plane with respect to the ideal image plane (mm).

In Tables 1 through 7 below, "f" represents focal length, "R" represents the radius of curvature of each lens surface along a main scanning plane "$R_z$" represents the radius of curvature of each lens surface along a sub-scanning plane, "D" represents the thickness of the lens or distance between the lens surfaces, and "N" represents the refractive index with respect to a wavelength of 780 nm.

TABLE 1 f = 135.37
scanning coefficient = 135.5

| Surface No. | R | Rz | D | N |
| --- | --- | --- | --- | --- |
| cylindrical 1 | ∞ | 17.88 | 4.00 | 1.51072(glass) |
| lens 2 | ∞ | R.S. | 32.00 | |
| polygonal mirror | | | 29.94 | |
| 1* | 1053.00 | R.S. | 6.73 | 1.48617(plastic) |
| 2* | −160.66 | R.S. | 2.29 | |
| 3 | ∞ | R.S. | 14.50 | 1.51072(glass) |
| 4 | −100.00 | −18.46 | 3.00 | |
| 5 | −110.00 | 26.10 | 4.00 | 1.48617(plastic) |
| 6** | −142.58 | 23.30 | 124.54 | |

*indicates an aspherical surface which is rotationally symmetrical about the optical axis.
**indicates a sub-scanning-plane aspherical surface.
"R.S." indicates the same value as "R" (i.e., the radius of curvature along a main scanning plane) since the surface is rotationally symmetrical about the optical axis.

The first surface 21a has the coefficients:

K=5.32

A4=−3.83×10⁻⁶

A6=2.10×10⁻⁹

A8=−4.29×10⁻¹³ as defined with regard to equation 1 below.
The second surface 21b has the coefficients:

K=10.56

A4=−2.25×10⁻⁶

A6=5.76×10⁻¹⁰

A8=1.18×10⁻¹³ as defined with regard to equation 1 below.
The deviation amount "e" of the plastic lens 23 (in the main scanning direction): −3.30
The deviation of the image plane (see FIG. 4): 0.45
The third surface 22a is a flat surface.
The fourth surface 22b is a toric surface having a rotational axis extending in the sub-scanning direction.
The fifth surface 23a is a toric surface having a rotational axis extending in the main scanning direction.
The sixth surface 23b is a toric surface having a rotational axis extending in the sub-scanning direction.

In the embodiments of the present invention, each aspherical surface is defined by the following equation 1, 2, or 3:
[Equation 1]

$$x = Ch^2/\{1 + |1-(1+K)C^2h^2|^{1/2}\} + A4h^4 + A6h^6 + A8h^8 + \ldots$$

Equation 1 is used in case of a rotationally symmetrical aspherical surface,
where "h" represents a height from the optical axis, "x" represents a distance from a tangent plane of an aspherical vertex, "C" represents a curvature of the aspherical vertex (1/r), "K" represents a conic constant, "A4" represents a fourth-order aspherical factor, "A6" represents a sixth-order aspherical factor, and "A8" represents an eighth-order aspherical factor.

[Equation 2]

$$x_y = C_y y^2 / \{1+[1-(1+K)C_y^2 y^2]^{1/2}\} + A4y^4 + A6y^6 + A8y^8 + \ldots$$

Equation 2 is used in case of a main-scanning plane aspherical surface,
where

"y" represents a height from the optical axis in the main scanning direction,

"$x_y$" represents a distance from a tangent plane of an aspherical vertex,

"$C_y$" represents a curvature of the aspherical vertex in a main scanning plane, "K" represents a conic constant, "A4" represents a fourth-order aspherical factor, "A6" represents a sixth-order aspherical factor, and "A8" represents an eighth-order aspherical factor.

[Equation 3]

$$x_z = C_z z^2 / \{1+[1-(1+K)C_z^2 z^2]^{1/2}\} + B4z^4 + B6z^6 + B8z^8 + \ldots$$

Equation 3 is used in case of a sub-scanning-plane aspherical surface,
where

"z" represents a height from the optical axis in the sub-scanning direction,

"$x_z$" represents a distance from a tangent plane of an aspherical vertex,

"$C_z$" represents a curvature of the aspherical vertex in a sub-scanning plane, "K" represents a conic constant, "B4" represents a fourth-order aspherical factor, "B6" represents a sixth-order aspherical factor, and "B8" represents an eighth-order aspherical factor.

In the first embodiment, the sixth surface is the sub-scanning-plane aspherical surface 23b, and the aspherical amount of the sub-scanning-plane aspherical surface 23b is given by equation 3 above under the following condition:

$$B4 = 4.0 \times 10^{-6}$$

FIGS. 5A–5J show the spherical aberration (i.e., wavefront aberration) of the scanning lens system 20 of the first embodiment in main and sub-scanning planes in the case where the sixth surface is formed as the sub-scanning-plane aspherical surface 23b. FIGS. 6A–6J show the spherical aberration (i.e., wavefront aberration) of the scanning lens system 20 of the first embodiment in main and sub-scanning planes in the case where the sixth surface is formed as a simple toric surface and not as the sub-scanning-plane aspherical surface 23b of the present invention. It can be understood that each spherical aberration of the system 20 in sub-scanning planes is adequately corrected by forming the sixth surface as the sub-scanning-plane aspherical surface 23b, by comparing FIG. 5 with FIG. 6.

[Second Embodiment]

Figure 7:
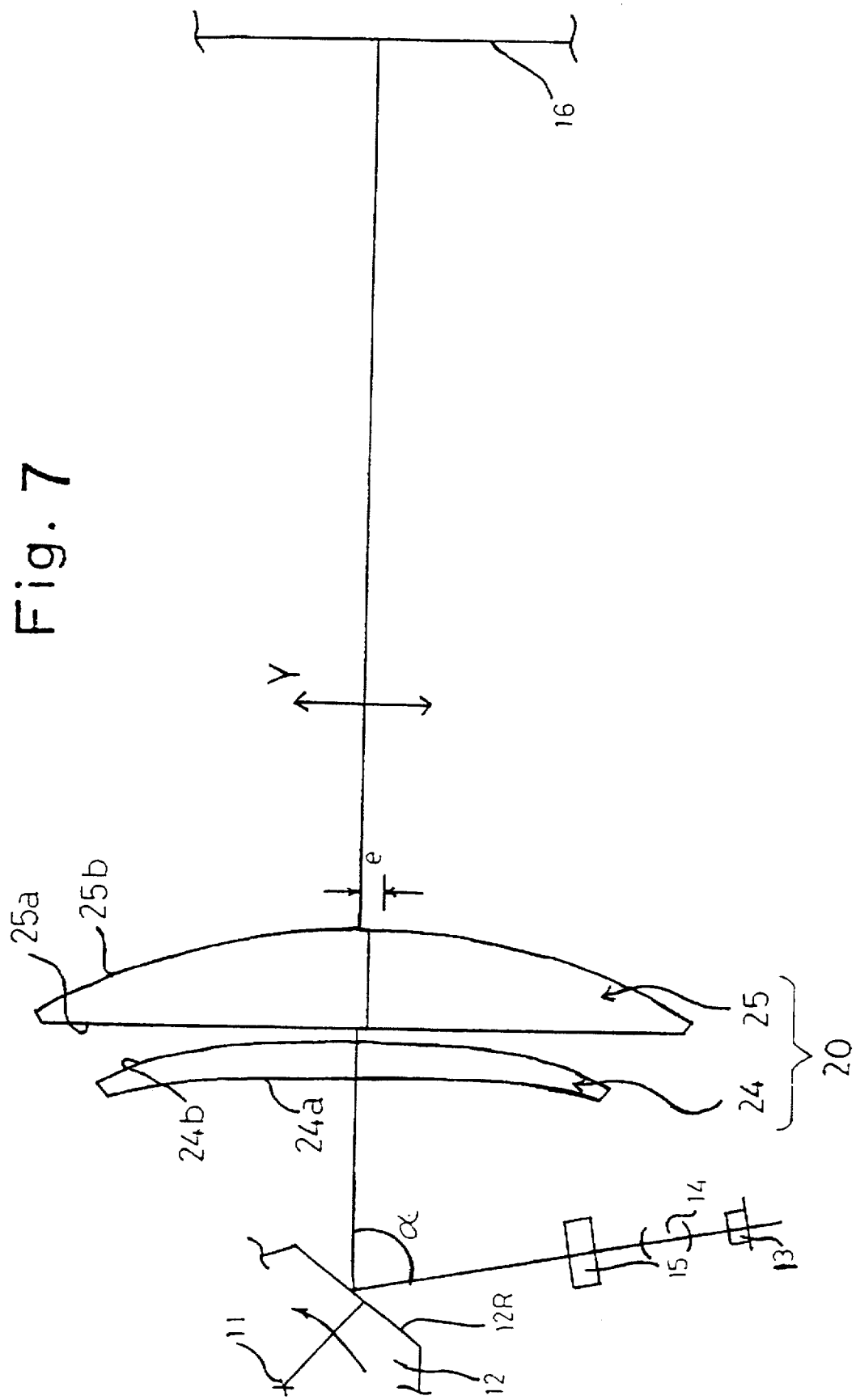
FIG. 7 is a plan view of a scanning optical system according to the second embodiment of the present invention.
Figure 8:
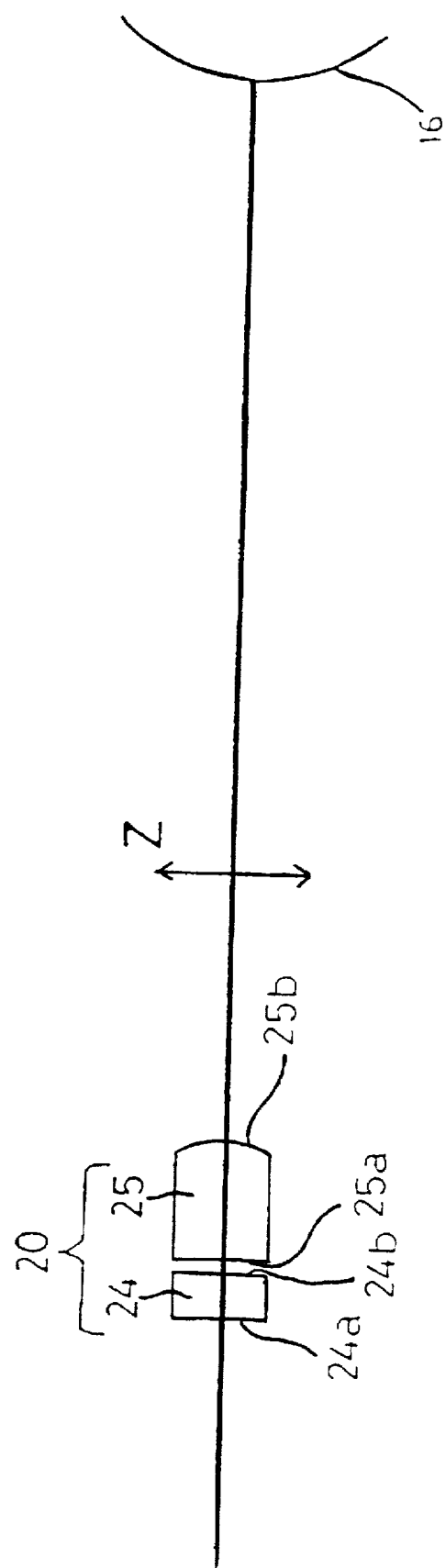
FIG. 8 is a front view of the scanning optical system shown in FIG. 7.

FIGS. 7 and 8 show the configuration of the scanning optical system of the second embodiment to which the first aspect of the present invention is applied. In this embodiment, the scanning lens system 20 consists of two lenses, i.e., a plastic lens 24 and a glass toric lens 25, in respective order from the side of the polygonal mirror 12.

Figure 9:
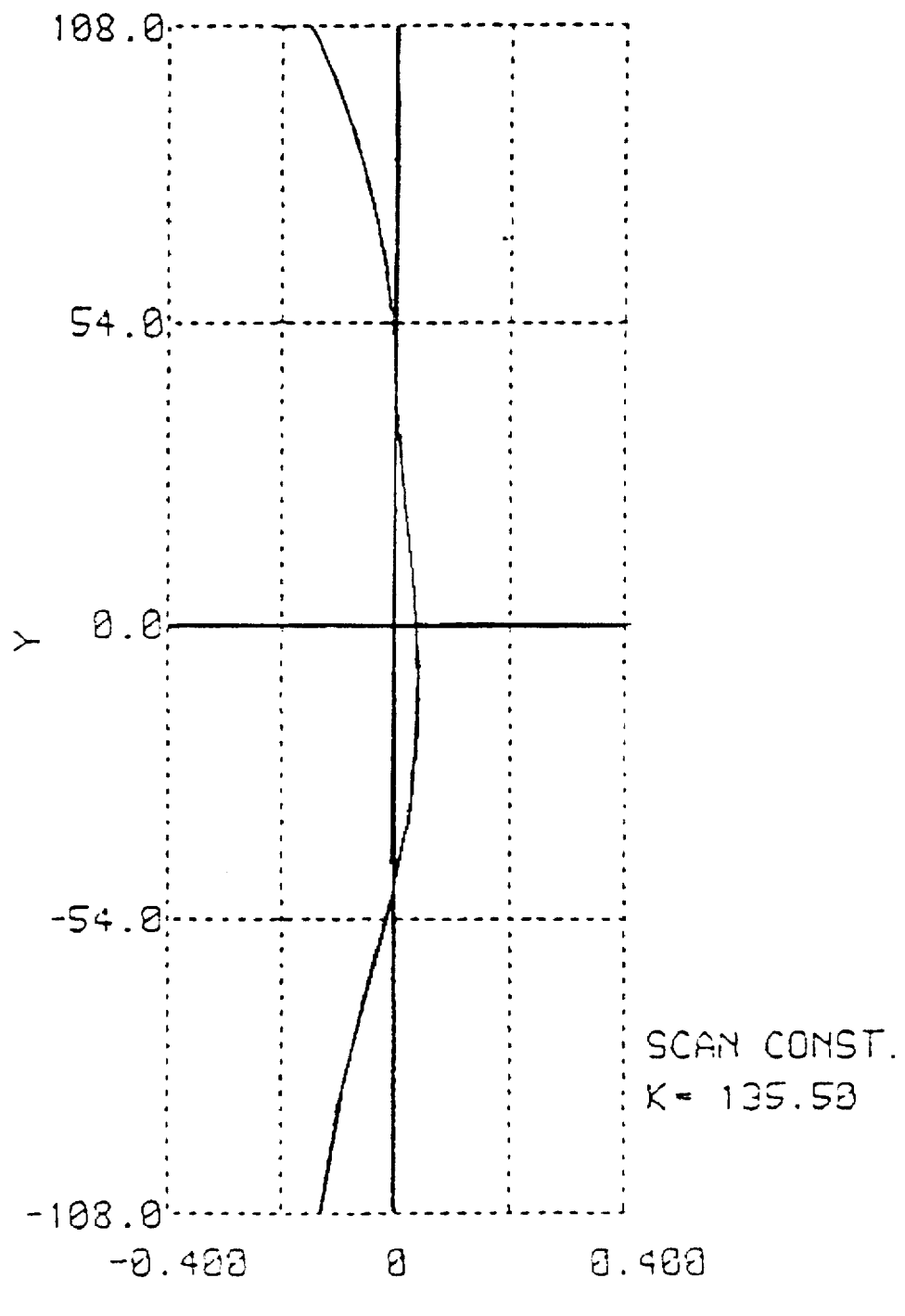
FIG. 9 is a graph showing the fθ characteristic of the scanning optical system illustrated in FIGS. 7 and 8.
Figure 10:
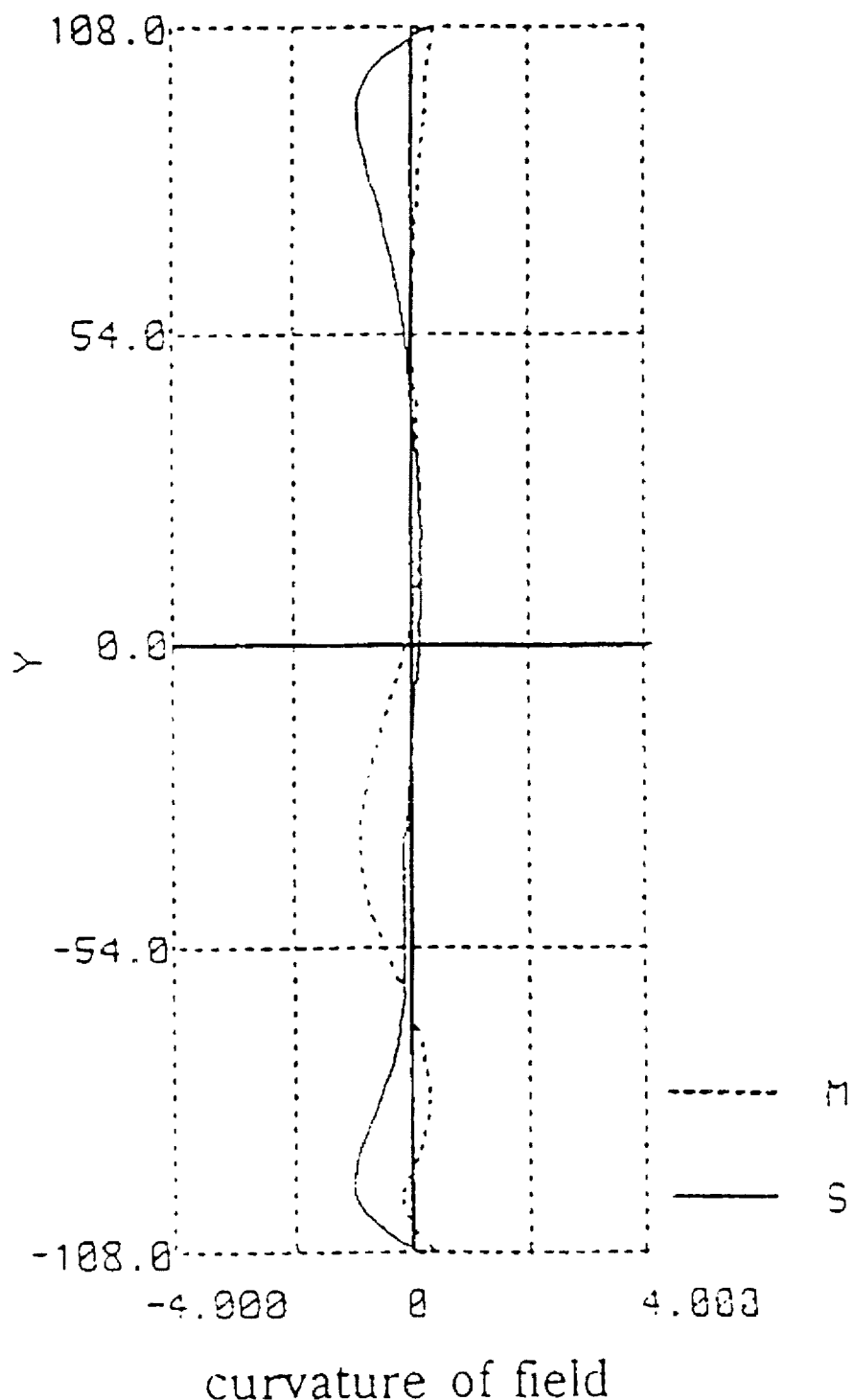
FIG. 10 is a graph showing the curvature of field in the scanning optical system illustrated in FIGS. 7 and 8.

FIG. 9 is a graph showing the results of measuring the fθ characteristic in the scanning optical system 20 of the second embodiment having the specific numerical values shown in Table 2. FIG. 10 is a graph showing the results of measuring the curvature of field in the scanning optical system 20 of the second embodiment in the meridional section M and in the sagittal section S.

The first and second surfaces 24a and 24b of the plastic lens 24 are each formed as a toric surface which has a rotational axis extending in the main scanning direction Y and formed as a main-scanning-plane aspherical surface. Regarding the glass toric lens 25, the first surface 25a is formed as a cylindrical surface having a curvature in the sub-scanning direction Z, and the second surface 25b is formed as a sub-scanning-plane aspherical surface formed in such a manner so as to make a toric surface have the cross-sectional shape of a non-circular arc in any sub-scanning plane, the toric surface having a rotational axis extending in the sub-scanning direction.

TABLE 2 f = 135.39
scanning coefficient = 135.5

| Surface No. | R | Rz | D | N |
|---|---|---|---|---|
| cylindrical 1 | ∞ | 17.88 | 4.00 | 1.51072(glass) |
| lens 2 | ∞ | R.S. | 33.50 | |
| polygonal mirror | | | 31.50 | |
| 1* | 536.10 | −50.00 | 5.46 | 1.48617(plastic) |
| 2* | −385.76 | 180.60 | 2.00 | |
| 3 | ∞ | −70.00 | 14.50 | 1.51072(glass) |
| 4** | −95.00 | −13.56 | 131.54 | |

*indicates a main-scanning-plane aspherical surface.
**indicates a sub-scanning-plane aspherical surface.
"R.S." indicates the same value as "R" (i.e., the radius of curvature along a main scanning plane) since the surface is rotationally symmetrical about the optical axis.

The first surface 24a has the coefficients:

$$K = 5.20$$

$$A4 = -4.540 \times 10^{-6}$$

$$A8 = 1.882 \times 10^{-9}$$

$$A8 = -2.910 \times 10^{-13}$$

as defined with regard to equation 2 above.
The second surface 24b has the coefficients:

$$K = 22.00$$

$$A4 = -3.250 \times 10^{-6}$$

$$A6 = 7.220 \times 10^{-10}$$

as defined with regard to equation 2 above.
The deviation amount "e" of the glass lens 25 (in the main scanning direction): −1.36
The deviation of the image plane (see FIG. 10): −1.00

In the second embodiment, the fourth surface is the sub-scanning-plane aspherical surface 25b, and the aspherical amount of the sub-scanning-plane aspherical surface 25b is given by equation 3 above under the following condition:

$$B4 = 4.0 \times 10^{-5}$$

FIGS. 11A–11F show the spherical aberration (i.e., wavefront aberration) of the scanning lens system 20 of the second embodiment in main and sub-scanning planes in the case where the fourth surface is formed as the sub-scanning-plane aspherical surface 25b. FIGS. 12A–12F show the spherical aberration (i.e., wavefront aberration) of the scanning lens system 20 of the second embodiment in main and sub-scanning planes in the case where the fourth surface is formed as a simple toric surface and not as the sub-scanning-plane aspherical surface 25b of the present invention. It can be understood that each spherical aberration of the system 20 in sub-scanning planes is adequately corrected by forming the fourth surface as the sub-scanning-plane aspherical surface 25b, by comparing FIG. 11 with FIG. 12.

As can be seen from the foregoing, according to the first aspect of the present invention, the spherical aberration in sub-scanning planes can be easily corrected without increasing the number of lenses in a scanning optical system.

[Third Embodiment]

Figure 15:
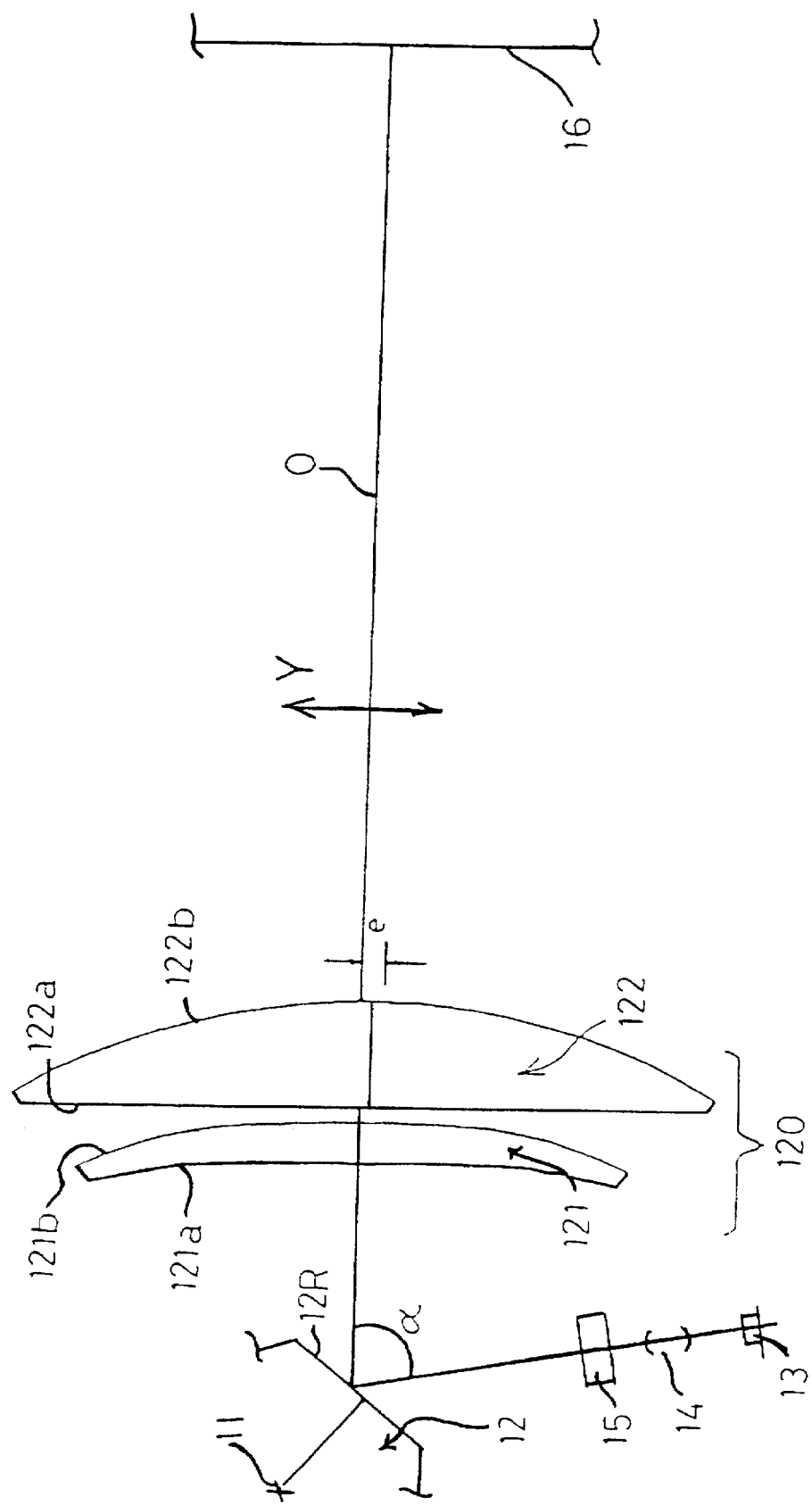
FIG. 15 is a plan view of a scanning optical system according to the third embodiment of the present invention.
Figure 16:
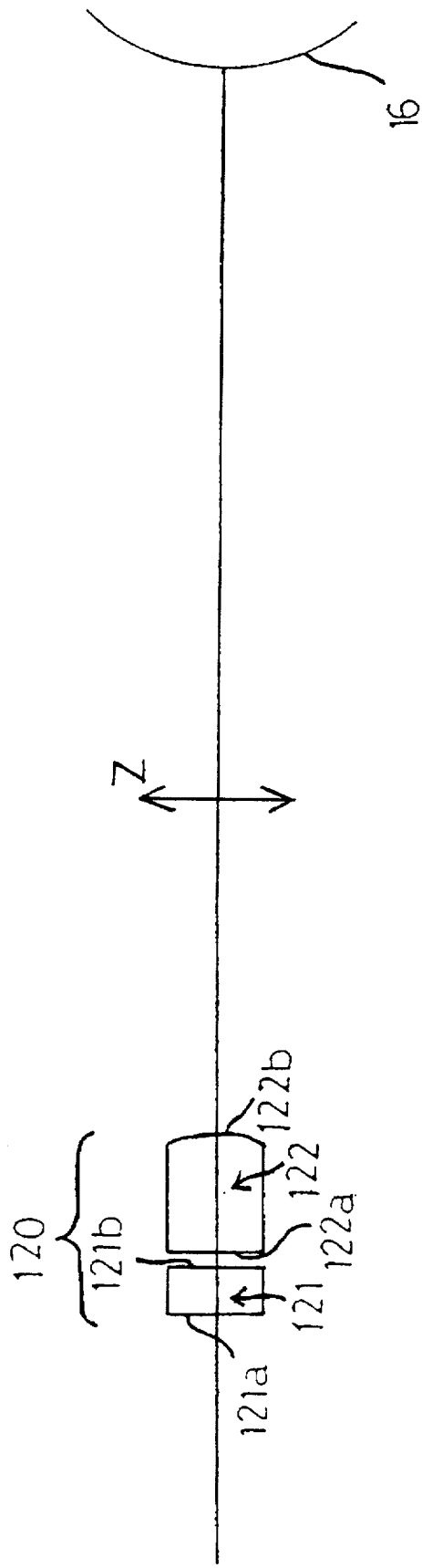
FIG. 16 is a front view of the scanning optical system shown in FIG. 15.

FIGS. 15 and 16 show the configuration of the scanning optical system according to a third embodiment to which the second aspect of the present invention is applied. A scanning lens system 120 (i.e., fθ lens system; second optical system) consists of a plastic lens 121 and a glass toric lens 122 in respective order from the polygonal mirror 12.

Figure 21:
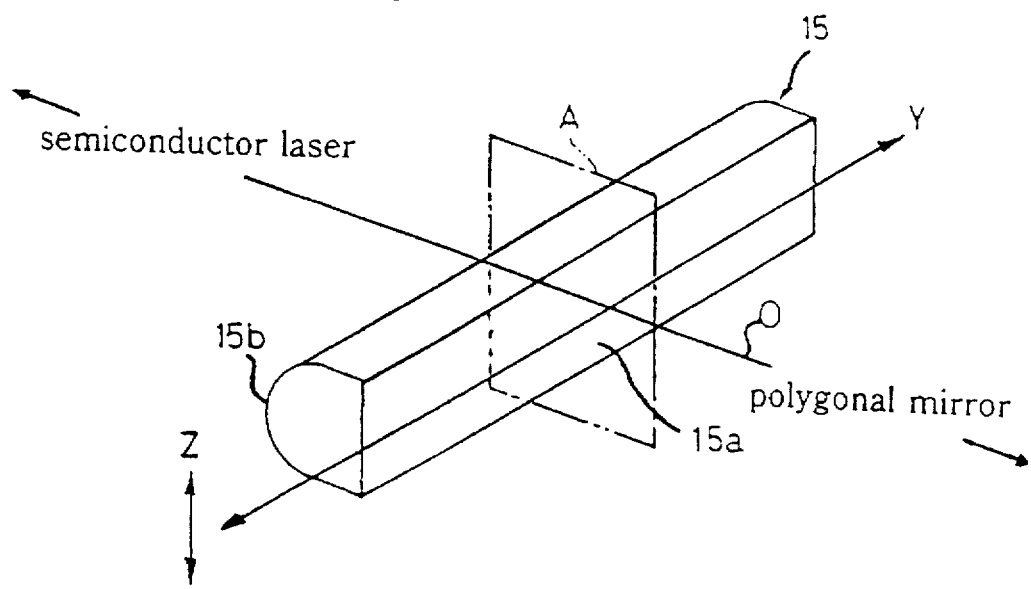
FIG. 21 is a perspective view of a cylindrical lens of the scanning optical system illustrated in FIGS. 15 and 16.
Figure 22:
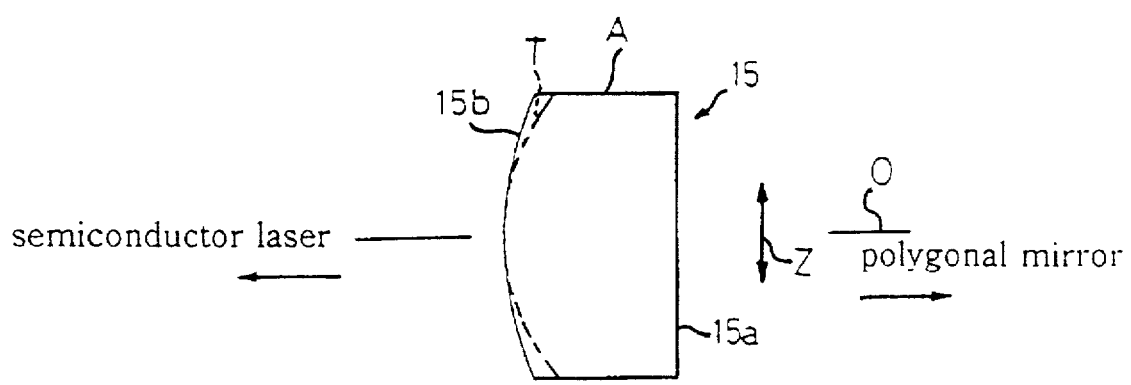
FIG. 22 is a cross-sectional view of the cylindrical lens shown in FIG. 21, showing the relationship between the lens surface having the cross-sectional shape of any non-circular arc in any sub-scanning plane and an imaginary cylindrical surface T along a cross section A shown in FIG. 21.

FIGS. 21 and 22 show the cylindrical lens 15 which has a sub-scanning-plane aspherical surface formed according to the second aspect of the present invention. The cylindrical lens 15 includes a flat surface 15a facing in the direction of the polygonal mirror 12 and a sub-scanning-plane aspherical surface 15b facing in the direction of the semiconductor laser 13. In FIG. 22, the dotted lines T represents an imaginary cylindrical surface, for the purpose of comparison with the sub-scanning-plane aspherical surface 15b. The shape of the cylindrical surface T along a sub-scanning plane is a circular arc. As can be seen from FIG. 22, the sub-scanning-plane aspherical surface 15b is formed in such a manner so as to make the cylindrical surface or circular arc surface T extend towards the semiconductor laser 13 with the extension increasing in a direction away from the optical axis O.

In FIG. 22, the extension of the sub-scanning-plane aspherical surface 15b from the imaginary toric surface T towards the semiconductor laser 13 is exaggerated as compared with the actual extension for the purpose of illustration.

The cylindrical lens 15 has no magnification in the main scanning direction Y but only has a magnification in the sub-scanning direction Z. The cylindrical lens 15 changes a cross-sectional shape of the collimated laser beam passing therethrough into an oblong shape extending along the main scanning direction Y. Thus, the oblong-shaped laser beam is then converged in the vicinity of the reflection surface 12R. Thereby, the sub-scanning-plane aspherical surface 15b is formed so as to generate a positive spherical aberration which counteracts the negative spherical aberration occurring in the scanning lens system 120. The combination of the collimator lens 14 together with the cylindrical lens 15 constitute a first optical system.

Figure 23:
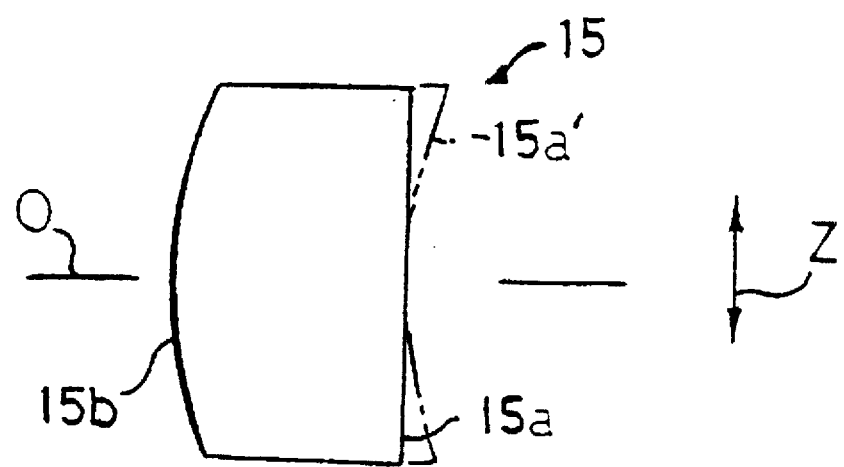
FIG. 23 is a cross-sectional view of the cylindrical lens shown in FIG. 21 in the case where a surface having the cross-sectional shape of a non-circular arc in any sub-scanning plane is formed on the flat surface of the cylindrical lens.

In the above embodiment shown in FIGS. 21 and 22, the surface 15b of the cylindrical lens 15 which faces in the direction of the semiconductor laser 13 (i.e., the surface having a magnification in a sub-scanning plane) is formed as a sub-scanning plane aspherical surface. As shown in FIG. 23, instead of forming the surface 15b of the cylindrical lens 15 as a sub-scanning-plane aspherical surface, the flat surface 15a, which is regarded as a spherical surface having no curvature, may be replaced with an sub-scanning-plane aspherical surface 15a' shown by the phantom lines in FIG. 23 to thereby obtain a similar effect. As can be seen from FIG. 23, the sub-scanning-plane aspherical surface 15a' is formed in such a manner so as to make the flat surface 15a extend towards the polygonal mirror 12 with the extension increasing in a direction away from the optical axis O.

Referring again to FIGS. 15 and 16, the first and second surfaces 121a and 121b of the plastic lens 121 are each formed as a toric surface which has a rotational axis extending in the main scanning direction Y and is formed as a main-scanning-plane aspherical surface. Regarding the glass toric lens 122, the first surface 122a is formed as a cylindrical surface having a curvature in the sub-scanning direction Z, and the second surface 122b is formed as a toric surface having a rotational axis extending in the sub-scanning direction Z.

The glass toric lens 122 produces most of the magnification of the scanning lens system 120 both in the main and sub-scanning directions Y and Z. The plastic lens 121 corrects the curvature of field and fθ characteristic in the main scanning direction Y among the aberrations created by the glass toric lens 122.

As shown in FIG. 15, the glass toric lens 122 is arranged so as to deviate towards the semiconductor laser 13 from the optical axis O by a distance "e". This arrangement prevents the image plane in the sub-scanning direction Z from being asymmetrical with respect to the center of the image plane along the main scanning direction Y. In other words, the arrangement prevents the image plane in the sub-scanning direction Z from inclining towards the main scanning direction Y. The degree of the asymmetry becomes specifically large when an angle α made by an incident laser beam upon the reflection surface 12R and a laser beam reflected on the reflection surface 12R exceeds a specific angle.

Figure 17:
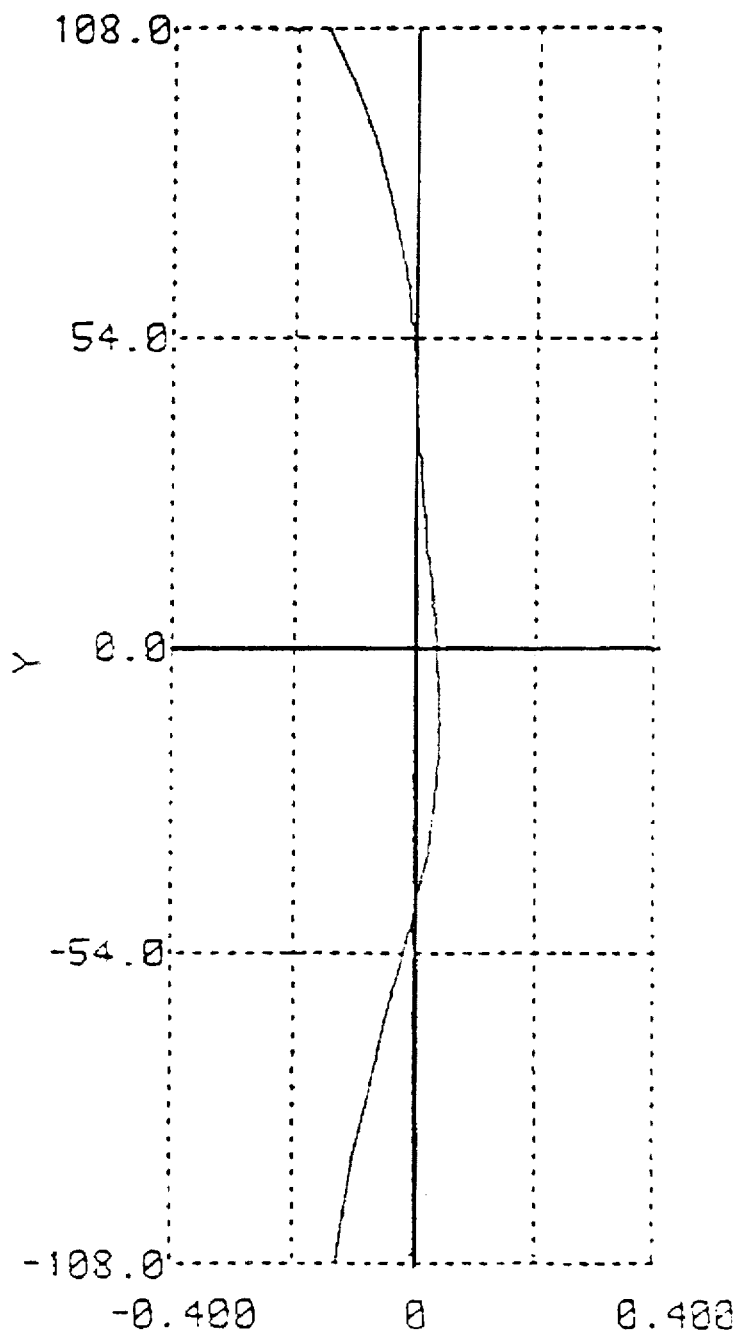
FIG. 17 is a graph showing the fθ characteristic of the scanning optical system illustrated in FIGS. 15 and 16.
Figure 18:
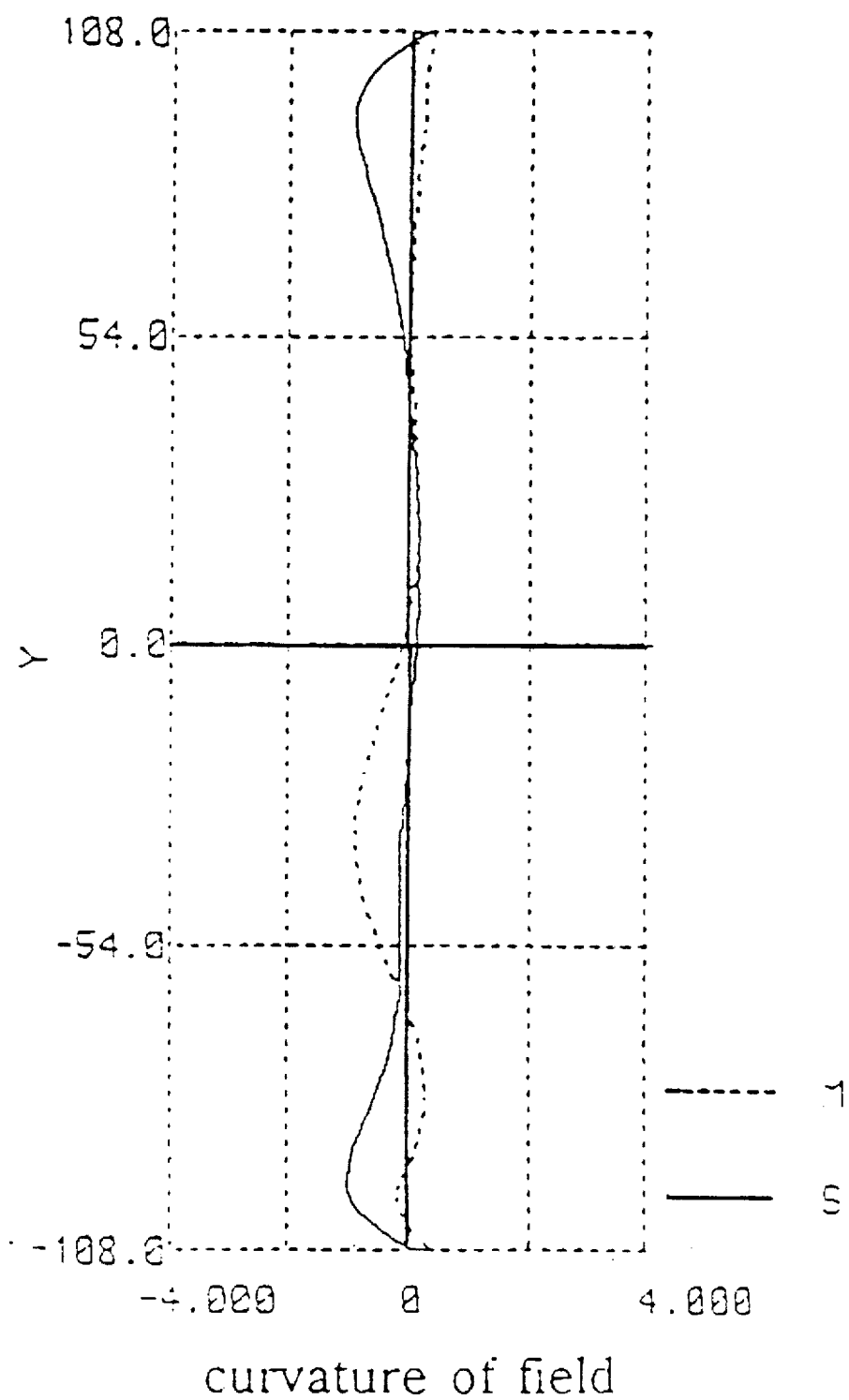
FIG. 18 is a graph showing the curvature of field in the scanning optical system illustrated in FIGS. 15 and 16.
Figure 19A:
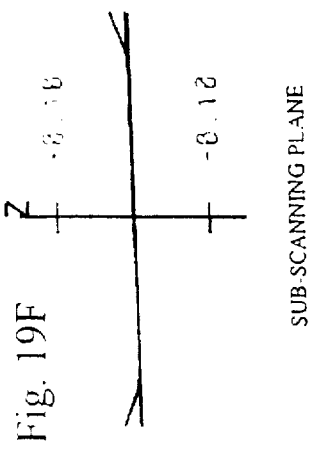
FIGS. 19A–19J are graphs showing the spherical aberration (i.e., wavefront aberration) in main and sub-scanning planes of the scanning optical system illustrated in FIGS. 15 and 16, in the case where a cylindrical surface of the cylindrical lens is formed in such a manner so as to have the cross-sectional shape of a non-circular arc in any sub-scanning plane in accordance with the third embodiment of the present invention.
Figure 19B:
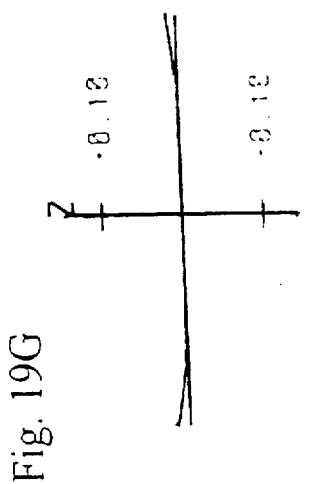
Figure 19C:
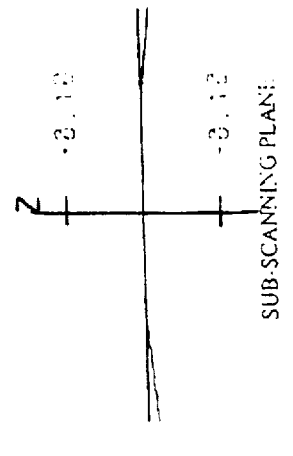
Figure 19F:
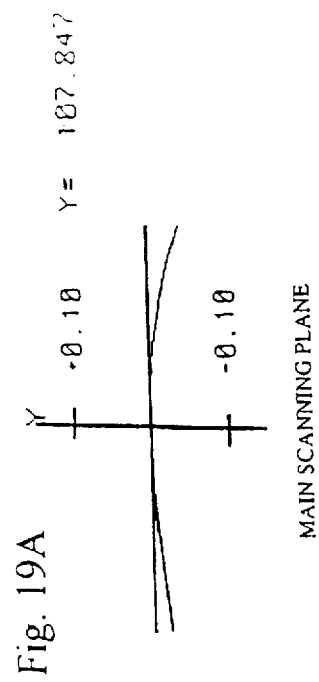
Figure 19G:
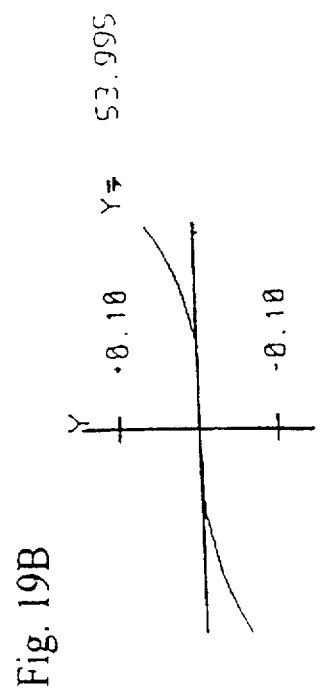
Figure 19H:
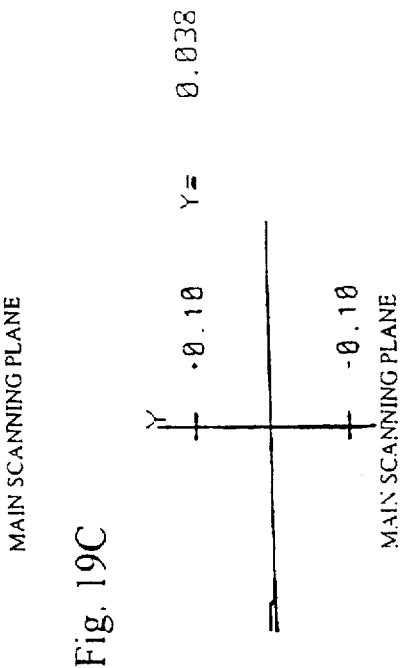
Figure 19D:
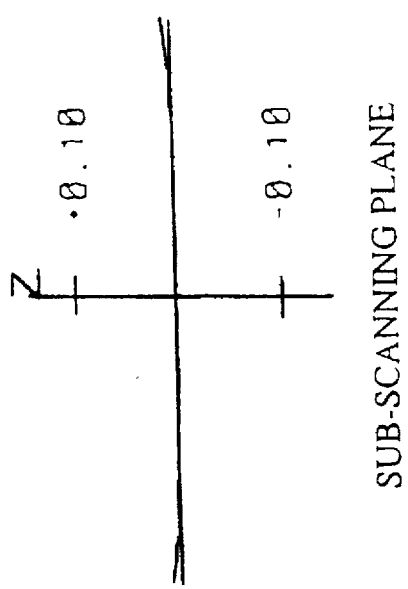
Figure 19E:
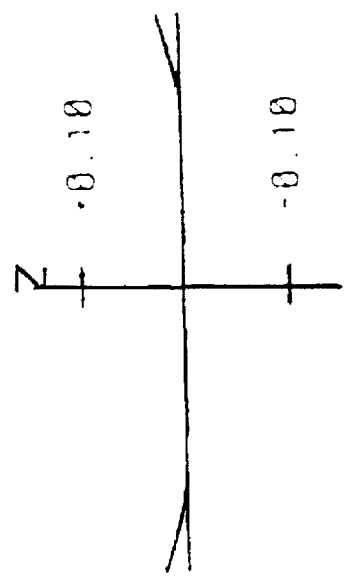
Figure 19I:
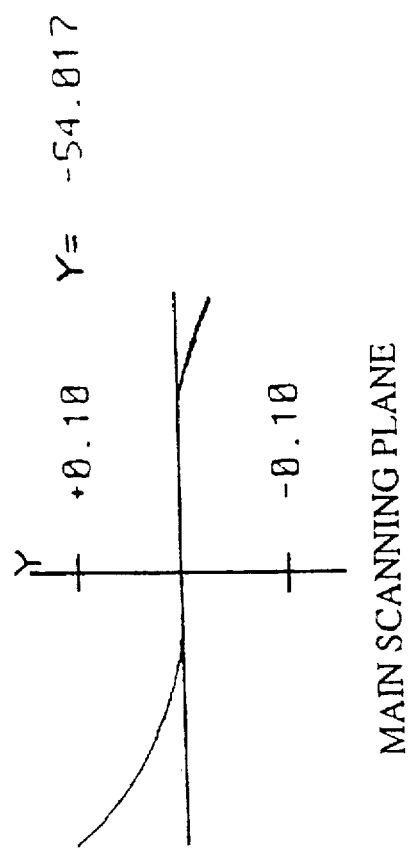
Figure 19J:
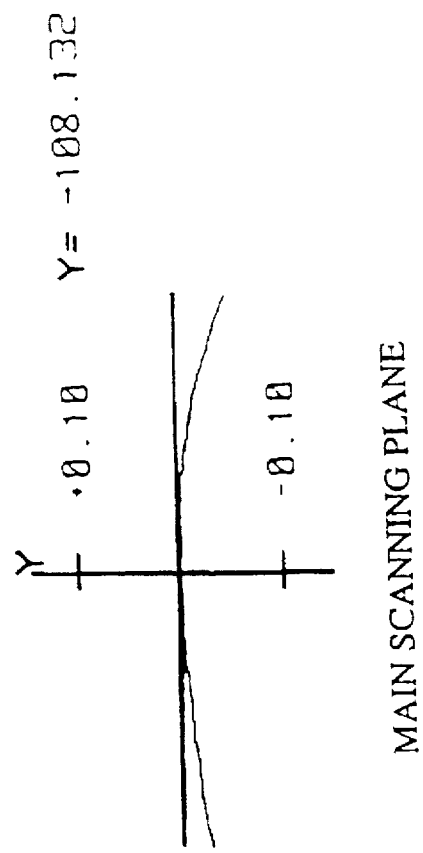
Figure 20D:
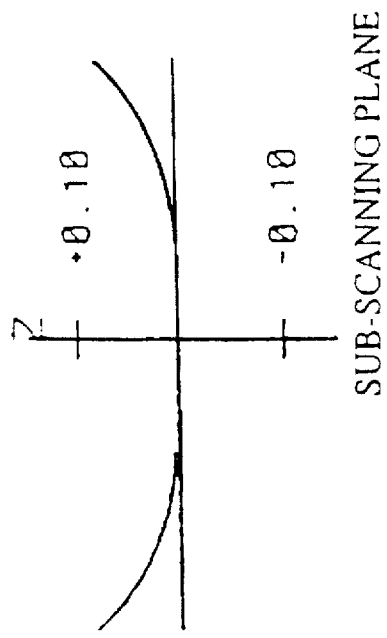
Figure 20I:
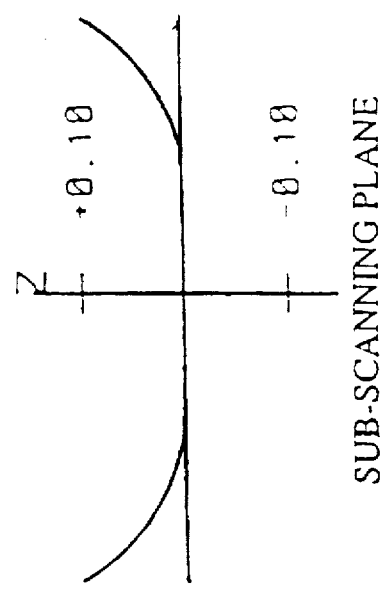
Figure 20E:
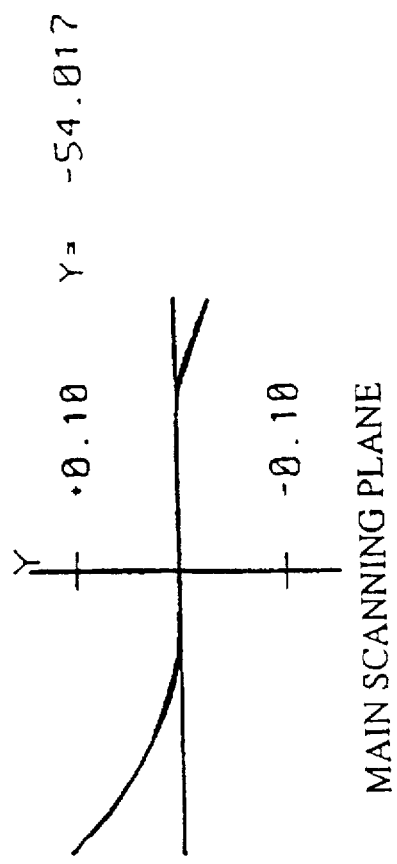
Figure 20J:
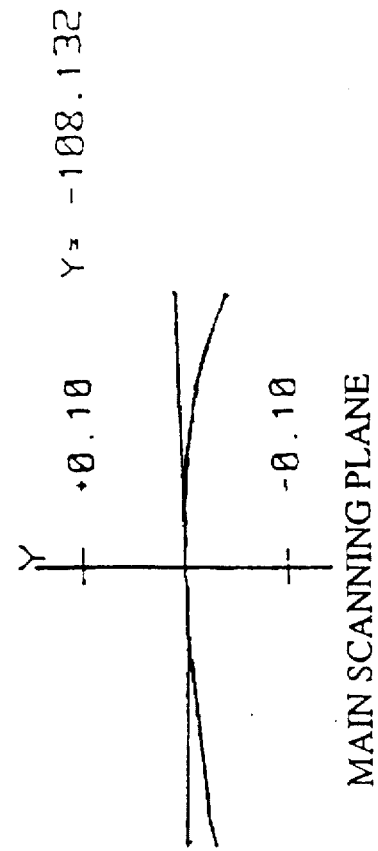

FIG. 17 is a graph showing the results of measuring the fθ characteristic of the scanning optical system 120 of the third embodiment having the specific numerical values shown in Table 3. FIG. 18 is a graph showing the results of measuring the curvature of field in the scanning optical system 120 in the meridional section M (i.e., main-scanning direction) and in the sagittal section S (i.e., sub-scanning direction). In FIGS. 17 and 18, the vertical line Y designates the position in the main-scanning direction. In FIG. 17, the horizontal line designates the displacement of the image height with respect to the ideal image height (mm). In FIG. 18, the horizontal line designates the displacement of the image plane with respect to the ideal image plane (mm).

TABLE 3 f = 135.39
scanning coefficient = 135.5

| Surface No. | R | Rz | D | N |
| --- | --- | --- | --- | --- |
| cylindrical 1** | ∞ | 17.88 | 4.00 | 1.51072(glass) |
| lens 15 2 | ∞ | R.S. | 33.50 | |
| polygonal mirror | | | 31.50 | |
| 1* | 536.10 | −50.00 | 5.46 | 1.48617(plastic) |
| 2* | −385.76 | 180.60 | 2.00 | |
| 3 | ∞ | −70.00 | 14.50 | 1.51072(glass) |
| 4 | −95.00 | −13.56 | 131.54 | |

*indicates a main-scanning-plane aspherical surface.
**indicates a sub-scanning-plane aspherical surface.
"R.S." indicates the same value as "R" (i.e., the radius of curvature along a main scanning plane) since the surface is rotationally symmetrical about the optical axis.

The deviation amount "e" of the glass lens 25 (in the main scanning direction): −1.36

The deviation of the image plane (see FIG. 18): −1.00
The first surface 121a has the coefficients:

$K=5.20$ $A4=-4.540\times10^{-6}$ $A6=1.882\times10^{-9}$ $A8=-2.910\times10^{-13}$ as defined with regard to equation 2 above.
The second surface 121b has the coefficients:

$K=22.00$ $A4=-3.250\times10^{-6}$ $A6=7.220\times10^{-10}$ as defined with regard to equation 2 above.

In the third embodiment, the first surface of the cylindrical lens 15 is the sub-scanning-plane aspherical surface 15b, and the aspherical amount of the sub-scanning plane aspherical surface 15b is given by equation 3 above under the following condition:

$B4=-2.5\times10^{-5}$

The first and second surfaces 121a and 121b of the plastic lens 121 are each formed as a toric surface which has a rotational axis extending in the main scanning direction and is formed as a main-scanning-direction aspherical surface.

The third surface 122a of the glass lens 122 is formed as a cylindrical surface having a curvature in the sub-scanning direction Z.

The fourth surface 122b of the glass lens 122 is formed as a toric surface having a rotational axis extending in the sub-scanning direction Z.

FIGS. 19A–19J show the spherical aberration (i.e., wavefront aberration) of the scanning lens system 120 of the third embodiment in main and sub-scanning planes in the case where the second surface of the cylindrical lens 15 is formed as the sub-scanning-plane aspherical surface 15b. FIGS. 20A–20J show the spherical aberration (i.e., wavefront aberration) of the scanning lens system 120 of the third embodiment in main and sub-scanning planes in the case where the second surface of the cylindrical lens 15 is formed as a simple cylindrical surface and not as the sub-scanning-plane aspherical surface 15b of the present invention. It can be understood that each spherical aberration of the system 120 in sub-scanning planes is adequately corrected by forming the second surface as the sub-scanning-plane aspherical surface 15b, by comparing FIG. 19 with FIG. 20.

In the second aspect of the present invention, the spherical aberration in sub-scanning planes that is caused by the second optical system provided between a light deflector (i.e., polygonal mirror) and a scanning surface is corrected by the first optical system provided between a light source and a light deflector. This correction is achieved by the arrangement of the second aspect of present invention in which at least one surface of a lens in a lens group which the first optical system consists of is formed as a sub-scanning-plane aspherical surface. Therefore, according to the second aspect of the present invention, the spherical aberration in sub-scanning planes can be corrected without increasing the number of lenses in a scanning optical system. Furthermore, it is not costly for the correction since it is accomplished by the small-sized first optical system.

[Fourth Embodiment]

Figure 24:
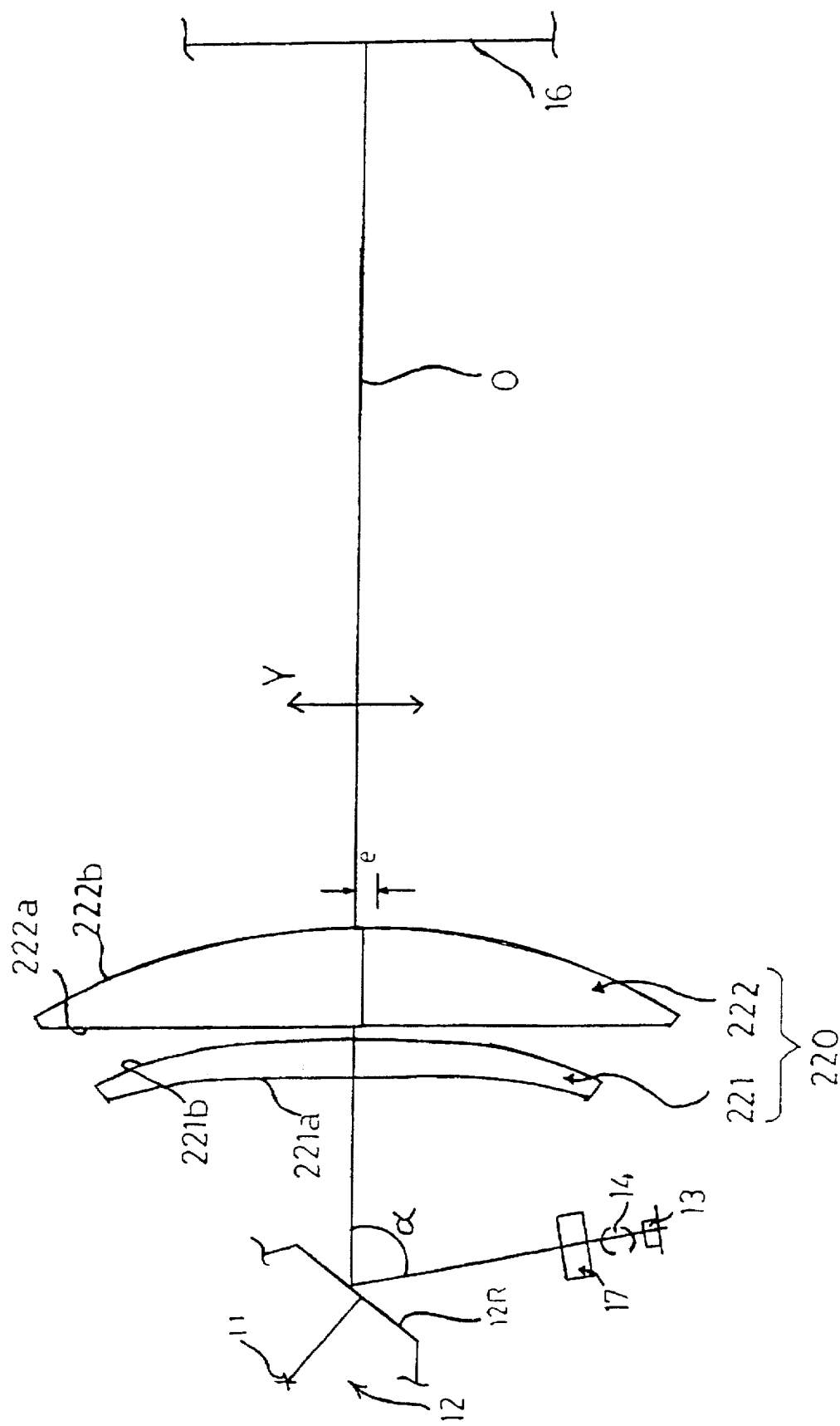
FIG. 24 is a plan view of a scanning optical system according to the fourth embodiment of the present invention.
Figure 25:
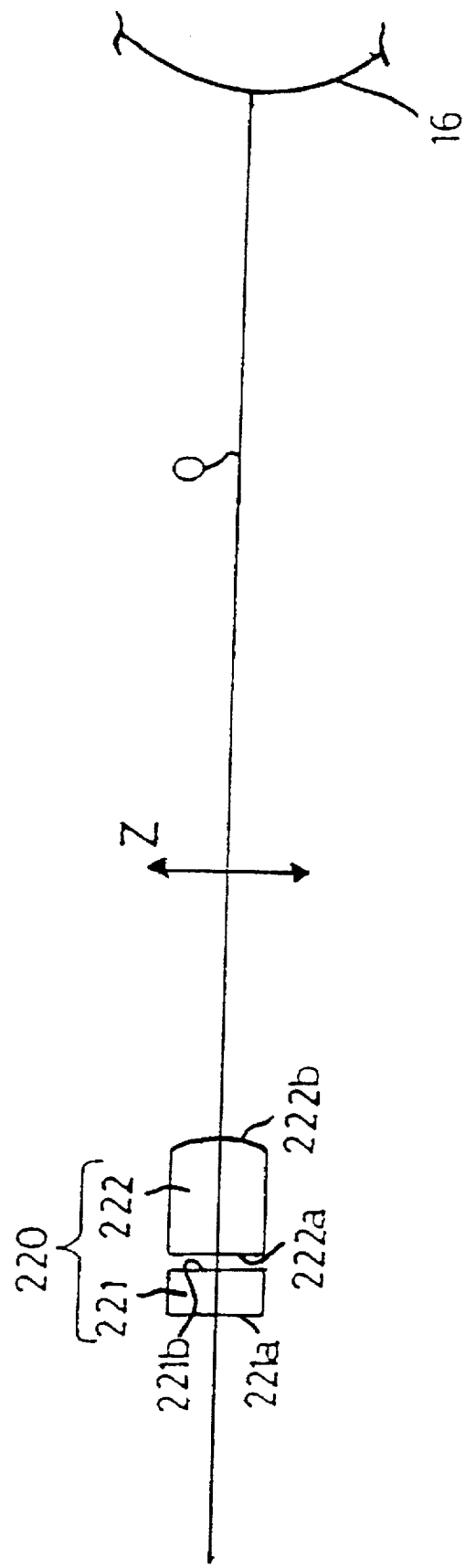
FIG. 25 is a front view of the scanning optical system shown in FIG. 24.

FIGS. 24 and 25 show the configuration of the scanning optical system according to a fourth embodiment to which the third aspect of the present invention is applied.

In this embodiment, a laser beam emitted from the semiconductor laser 13 passes through the collimator lens 14 and a hybrid lens 17 including the glass cylindrical lens 15, and is incident upon the polygonal mirror 12. The laser beam is deflected by each reflection surface 12R. Then, the laser beam passes through the scanning lens system 220 (fθ lens system; second optical system) to scan the scanning surface 16. The combination of the collimator lens 14 together with the hybrid lens 17 constitute a first optical system.

The scanning lens system 220 in the fourth embodiment consists of two lenses, i.e., a plastic lens 221 and a glass toric lens 222 in respective order from the polygonal mirror 12.

Figure 26:
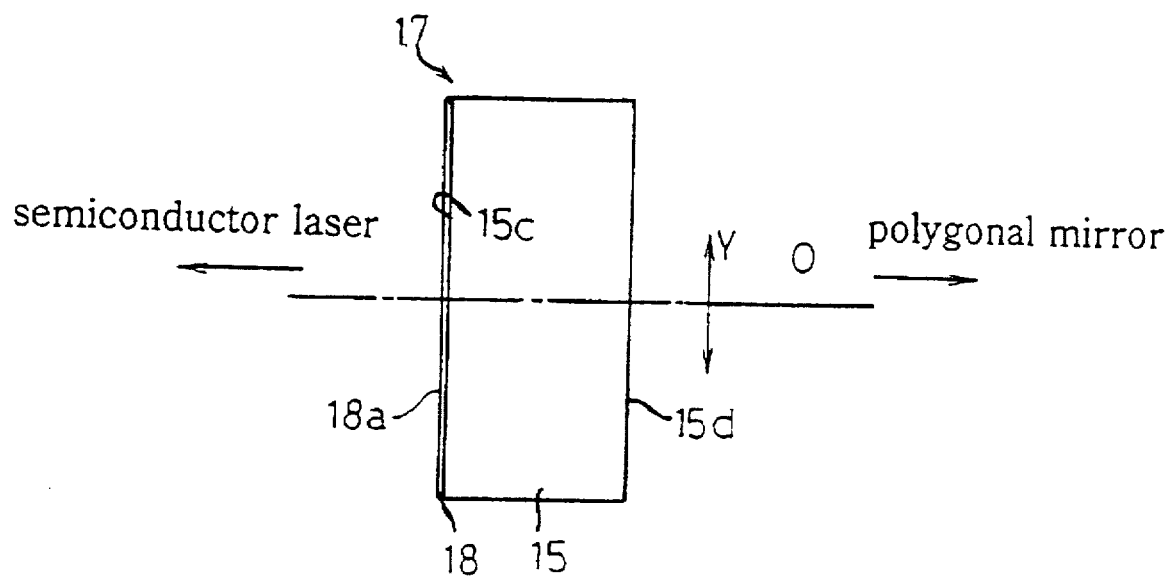
FIG. 26 is a cross-sectional view along a main scanning plane of a hybrid lens to which the present invention is applied.
Figure 27:
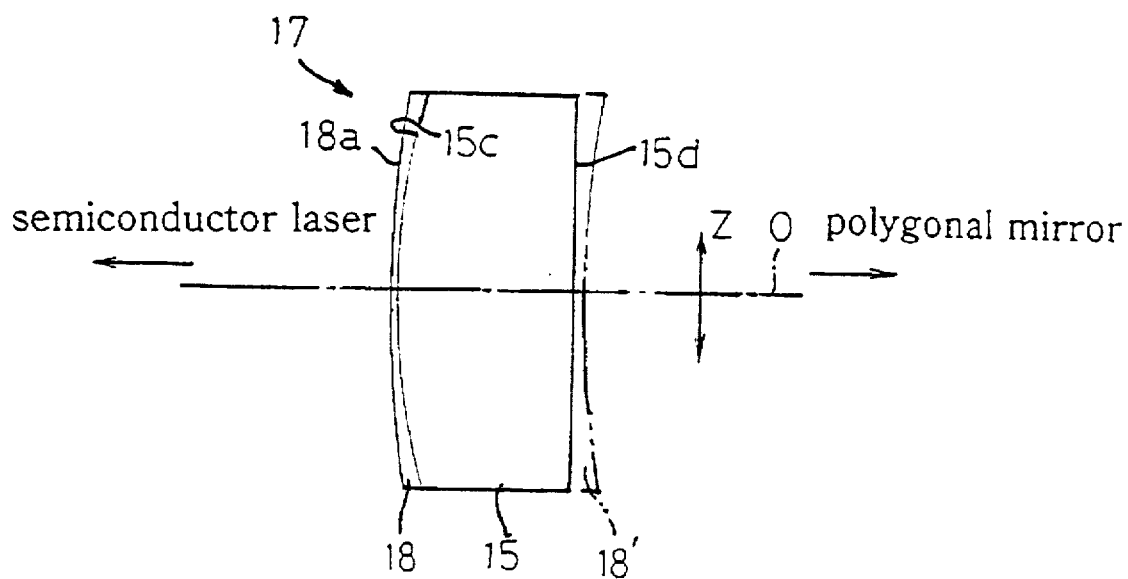
FIG. 27 is a cross-sectional view along a sub-scanning plane of the hybrid lens shown in FIG. 26.

FIGS. 26 and 27 show the hybrid lens 17 constructed in accordance with the third aspect of the present invention. The hybrid lens 17 consists of the cylindrical lens 15 and a plastic layer 18 attached to a cylindrical surface 15c of the cylindrical lens 15. The cylindrical lens 15 includes the cylindrical surface 15c facing in the direction of the semiconductor laser 13 and a flat surface 15d facing in the direction of the polygonal mirror 12. The surface 18a of the plastic layer 18 is formed as a sub-scanning-plane aspherical surface. As shown in FIG. 27, the thickness of the plastic layer 18 in the direction of the optical axis O increases in a direction away from the optical axis O. The paraxial radius of curvature of the sub-scanning-plane aspherical surface 18a of the plastic layer 18 is arranged to be substantially the same as that of the cylindrical surface 15c of the cylindrical lens 15. The plastic layer 18 has no magnification in the immediate vicinity of the optical axis O. The plastic layer 18 is hardly subject to the variation of temperature and/or humidity with the above arrangement in which the plastic layer. 18 has no magnification in the immediate vicinity of the optical axis O.

In other words, the sub-scanning-plane aspherical surface 18a of the plastic layer 18 is formed in such a manner that a positive spherical aberration which counteracts the negative spherical aberration occurring in the scanning lens system 220 may be generated in the first optical system. The cylindrical surface 15c of the cylindrical lens 15 supports the plastic layer 18.

In the above embodiment, the plastic layer 18 is attached to the cylindrical surface 15c for forming a sub-scanning-plane aspherical surface 18a. Additionally a plastic layer 18' may be attached to the flat surface 15d of the cylindrical lens 15 so as to form a sub-scanning-plane aspherical surface on the side of the flat surface 15d, as shown by the phantom lines in FIG. 27. In this case, as shown in FIG. 27, the thickness of the plastic layer 18' in the direction of the optical axis O increases in a direction away outward from the optical axis O.

The cylindrical lens 15 has no magnification in the main scanning direction Y but only has a magnification only in the sub-scanning direction Z. Thus, the hybrid lens 17, to which the plastic layer 18 is attached, also has a magnification only in the sub-scanning direction Z. The laser beam collimated by the collimator lens 14 is incident on the hybrid lens 17, then the hybrid lens 17 changes a cross-sectional shape of the collimated laser beam passing therethrough into an oblong shape extending along the main scanning direction Y and converges the oblong-shaped laser beam in the vicinity of the reflection surface 12R.

Referring again to FIGS. 24 and 25, the first and second surfaces 221a and 221b of the plastic lens 221 are each formed as a toric surface which has a rotational axis extending in the main scanning direction Y and is formed as a main-scanning-plane aspherical surface. Regarding the glass toric lens 222, the first surface 222a is formed as a cylindrical surface having a curvature in the sub-scanning direction Z, and the second surface 222b is formed as a toric surface having a rotational axis extending in the sub-scanning direction Z.

The glass toric lens 222 produces most of the magnification of the scanning lens system 220 both in the main and sub-scanning directions Y and Z. The plastic lens 221 primarily corrects the curvature of field and fθ characteristic in the main scanning direction Y among the aberrations caused by the glass toric lens 222.

As shown in FIG. 24, the glass toric lens 222 is offset towards the semiconductor laser 13 in the main scanning direction Y from the optical axis O by a distance "e". This arrangement prevents the image plane in the sub-scanning direction Z from being asymmetrical with respect to the center of the image plane along the main scanning direction Y. In other words, the arrangement prevents the image plane in the sub-scanning direction Z from inclining towards the main scanning direction Y. The degree of the asymmetry becomes specifically large when an angle α made by an incident laser beam upon the reflection surface 12R and a laser beam reflected on the reflection surface 12R exceeds a specific angle.

Figure 28:
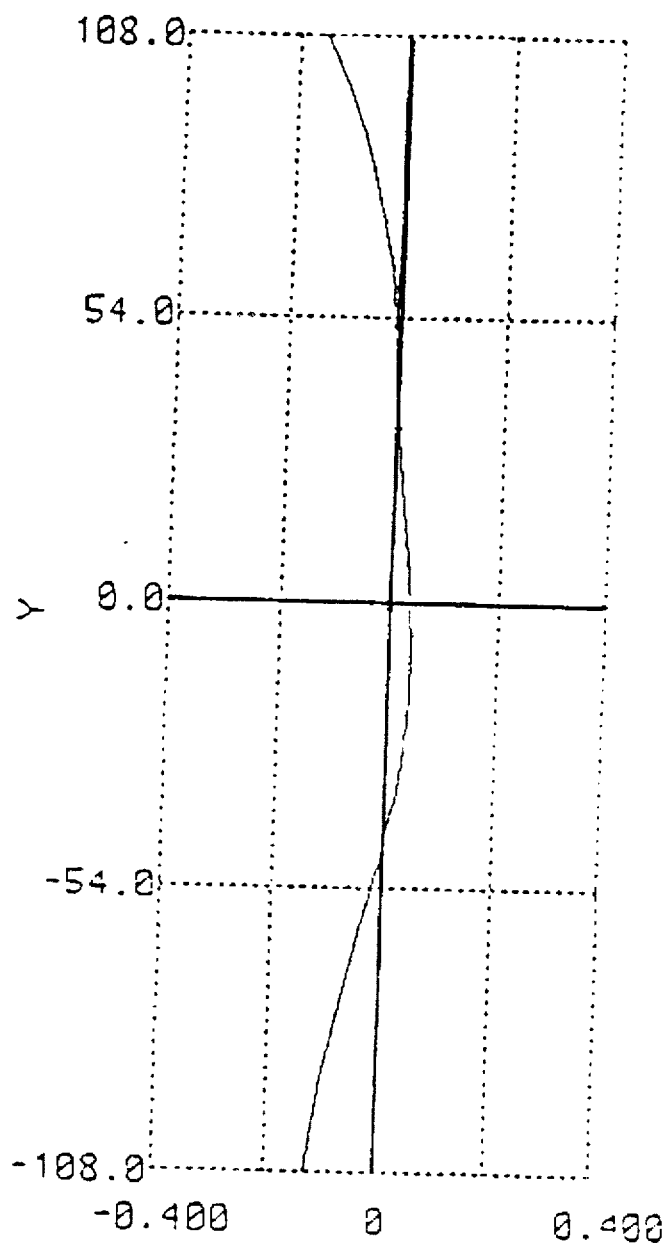
FIG. 28 is a graph showing the fθ characteristic of the scanning optical system illustrated in FIGS. 24 and 25.
Figure 29:
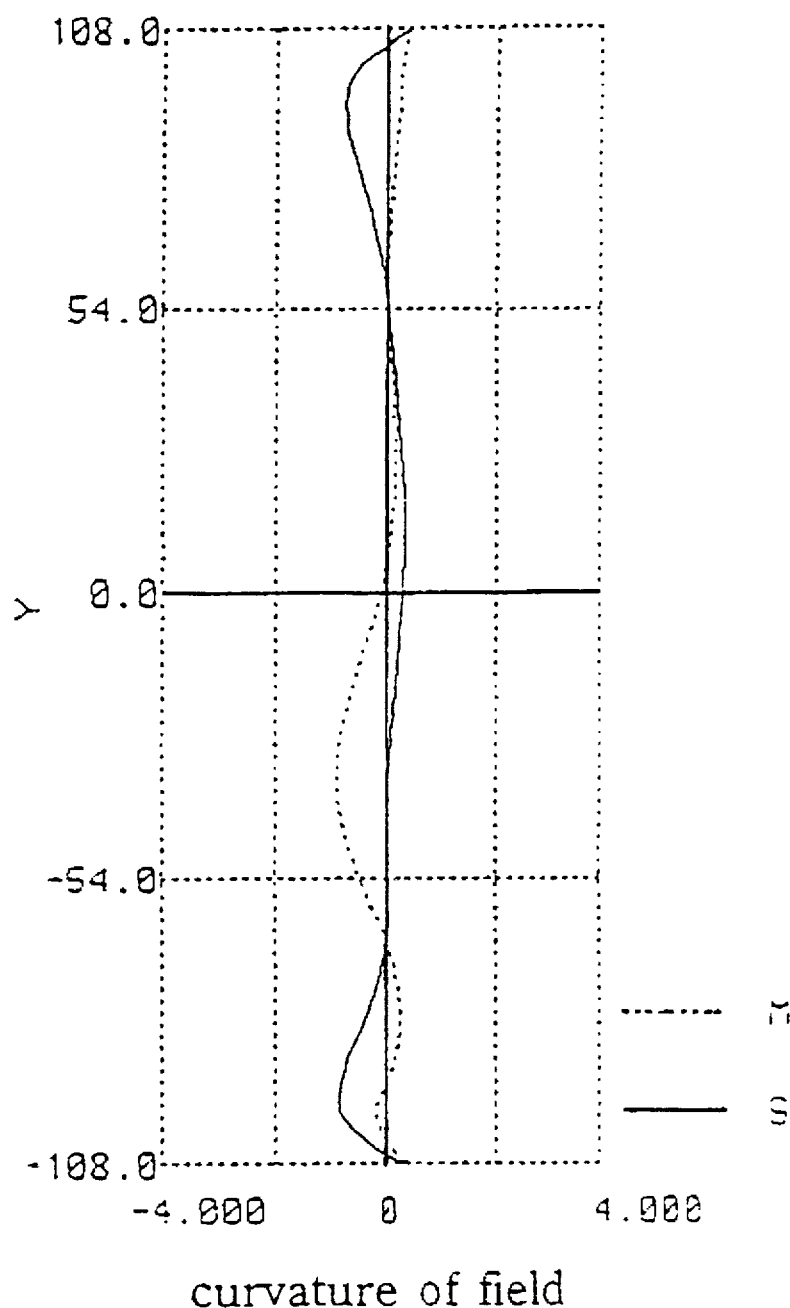
FIG. 29 is a graph showing the curvature of field in the scanning optical system illustrated in FIGS. 24 and 25.

FIG. 28 is a graph showing the results of measuring the fθ characteristic of the scanning optical system 220 of the fourth embodiment having the specific numerical values shown in Table 4. FIG. 29 is a graph showing the result of measuring the curvature of field in the scanning optical system 220 in the meridional section M (i.e., main-scanning direction) and in the sagittal section S (i.e., sub-scanning direction). In FIGS. 28 and 29, the vertical line Y designates the position in the main-scanning direction. In FIG. 28, the horizontal line designates the displacement of the image height with respect to the ideal image height (mm). In FIG. 29, the horizontal line designates the displacement of the image plane with respect to the ideal image plane (mm).

TABLE 4 f = 135.39
scanning coefficient = 135.5

| Surface No. | R | Rz | D | N |
|---|---|---|---|---|
| hybrid lens 17 | | | | |
| 1** | ∞ | 17.93 | 0.10 | 1.51350(plastic) |
| 2 | ∞ | 17.88 | 4.00 | 1.51072(glass) |
| 3 | ∞ | R.S. | 33.50 | |
| polygonal mirror | | | 31.50 | |
| 1* | 536.10 | −50.00 | 5.46 | 1.48617(plastic) |
| 2* | −385.76 | 180.60 | 2.00 | |
| 3 | ∞ | −70.00 | 14.50 | 1.51072(glass) |
| 4 | −95.00 | −13.56 | 131.54 | |

*indicates a main-scanning-plane aspherical surface.
**indicates a sub-scanning-plane aspherical surface.
"R.S." indicates the same value as "R" (i.e., the radius of curvature along a main scanning plane) since the surface is rotationally symmetrical about the optical axis.

The offset amount "e" of the glass lens 222 (in the main scanning direction): −1.36
The deviation of the image plane (see FIG. 29): −1.00
The first surface 221a has the coefficients:

$K=5.20$ $A4=-4.540\times10^{-6}$ $A6=1.882\times10^{-9}$ $A8=-2.910\times10^{-13}$ as defined with regard to equation 2 above.
The second surface 221b has the coefficients:

$K=22.00$ $A4=-3.250\times10^{-6}$ $A6=7.220\times10^{-10}$ as defined with regard to equation 2 above.

In the fourth embodiment, the first surface of the hybrid lens 17 is the sub-scanning-plane aspherical surface 18a, and the aspherical amount of the sub-scanning-plane aspherical surface 18a is given by equation 3 above under the following condition:

$B4=-3.0\times10^{-4}$

Figure 30D:
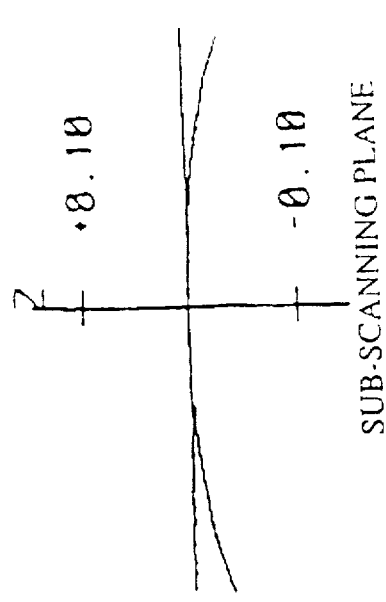
FIGS. 30A–30N are graphs showing the spherical aberration (i.e., wavefront aberration) in main and sub-scanning planes of the scanning optical system illustrated in FIGS. 24 and 25, in the case where the hybrid lens shown in FIGS. 26 and 27 is used.
Figure 30K:
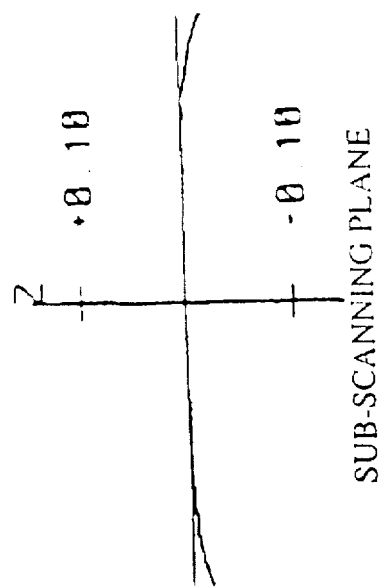
Figure 30E:
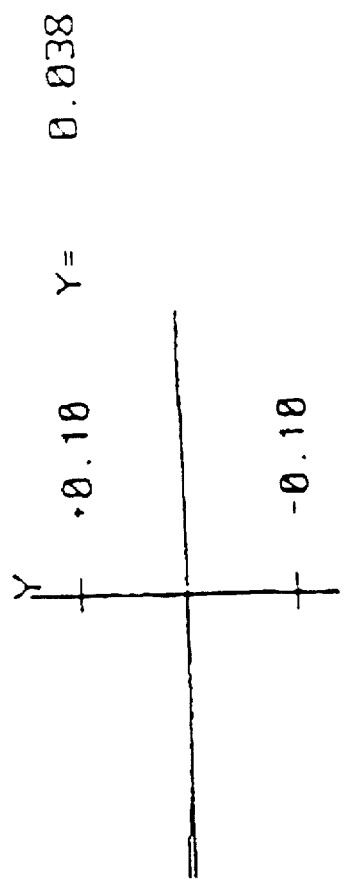
Figure 30L:
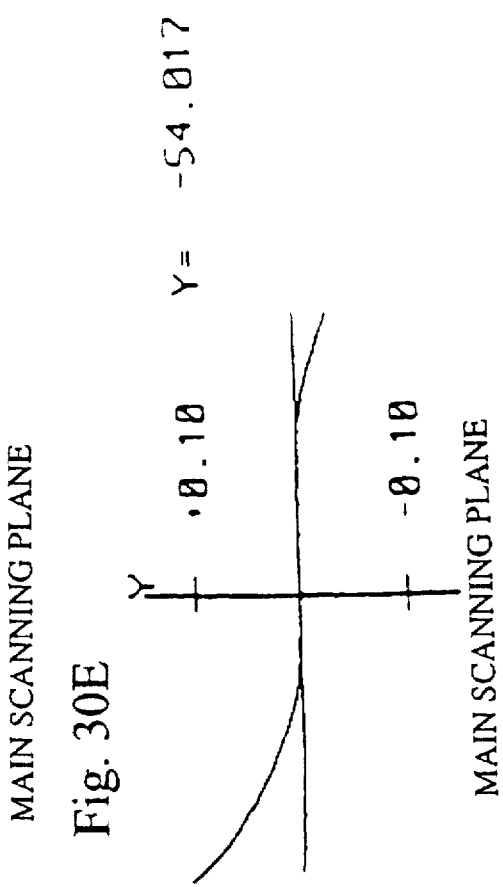

FIGS. 30A–30N show the spherical aberration (i.e., wave-front aberration) of the scanning lens system 220 of the fourth embodiment in main and sub-scanning planes in the case where the first surface is formed as the sub-scanning-plane aspherical surface 18a by attaching the plastic layer 18 to the cylindrical surface 15c of the cylindrical lens 15. It can be understood that each spherical aberration of the system 220 in sub-scanning planes is adequately corrected by forming the first surface of the hybrid lens 17 as the sub-scanning-plane aspherical surface 18a.

In the fourth embodiment, the present invention is applied to the particular case where the first optical system consists of the collimator lens 14 and the hybrid lens 17. The present invention is not limited to only this particular case but may also be applied to a case where the first lens system consists of more than two lenses. Furthermore, the above-discussed arrangement of the lenses of the scanning lens system 220 is only an example and may be any other arrangement.

In the third aspect of the present invention, similar to the second aspect of the present invention, the spherical aberration in sub-scanning planes that is caused by the second optical system provided between a light deflector (i.e., polygonal mirror) and a scanning surface is corrected by the first optical system provided between a light source and the above light deflector.

This correction is achieved by the arrangement of the third aspect of present invention in which at least one lens in the first optical system consists of a hybrid lens comprising a glass lens to which a plastic layer is attached and in which the surface of the plastic layer is formed as a sub-scanning-plane aspherical surface so as to correct the spherical aberration in sub-scanning planes that occurs in the second optical system. Therefore, according to the third aspect of the present invention, the spherical aberration in sub-scanning planes can be corrected without increasing the number of lenses in a scanning optical system. Furthermore, it is not expensive to effect the correction since it is accomplished by the small-sized first optical system. Moreover, with the arrangement in which the paraxial radius of curvature of the surface of the plastic layer is arranged to be substantially the same as that of the cylindrical surface of the glass lens, a deviation of the focal point due to the variation of temperature and/or humidity can be prevented from occurring while employing an easily-moldable plastic material.

[Fifth Embodiment]

FIGS. 31 and 32 show the configuration of the scanning optical system according to a fifth embodiment to which the fourth aspect of the present invention is applied.

The scanning lens system 320 in the fifth embodiment consists of two lenses, i.e., a plastic lens 321 and a hybrid lens 322 in respective order from the polygonal mirror 12.

Regarding the plastic lens 321, the first surface 321a facing in the direction of the polygonal mirror 12 and the second surface 321b facing in the direction of the scanning surface 16 are each formed as a toric surface which has a rotational axis extending in the main scanning direction Y and is formed as a main-scanning-plane aspherical surface. The plastic lens 321 corrects the curvature of field and fθ characteristic in the main scanning direction Y among the aberrations caused by the hybrid lens 322.

Figure 33:
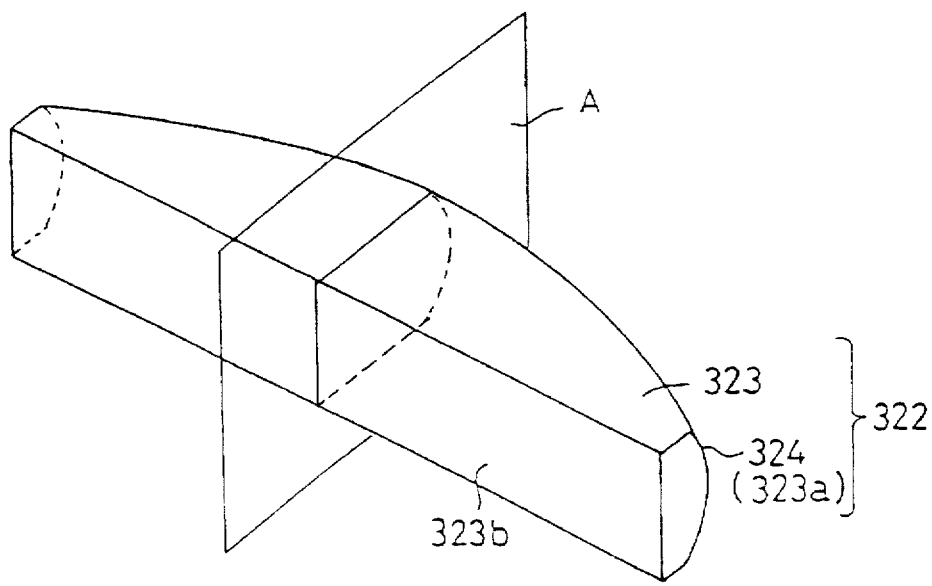
FIG. 33 is a perspective view of a hybrid lens illustrating about a lens surface having the cross-sectional shape of a non-circular arc in any sub-scanning plane, the lens surface being formed on the hybrid lens in accordance with the present invention.
Figure 34:
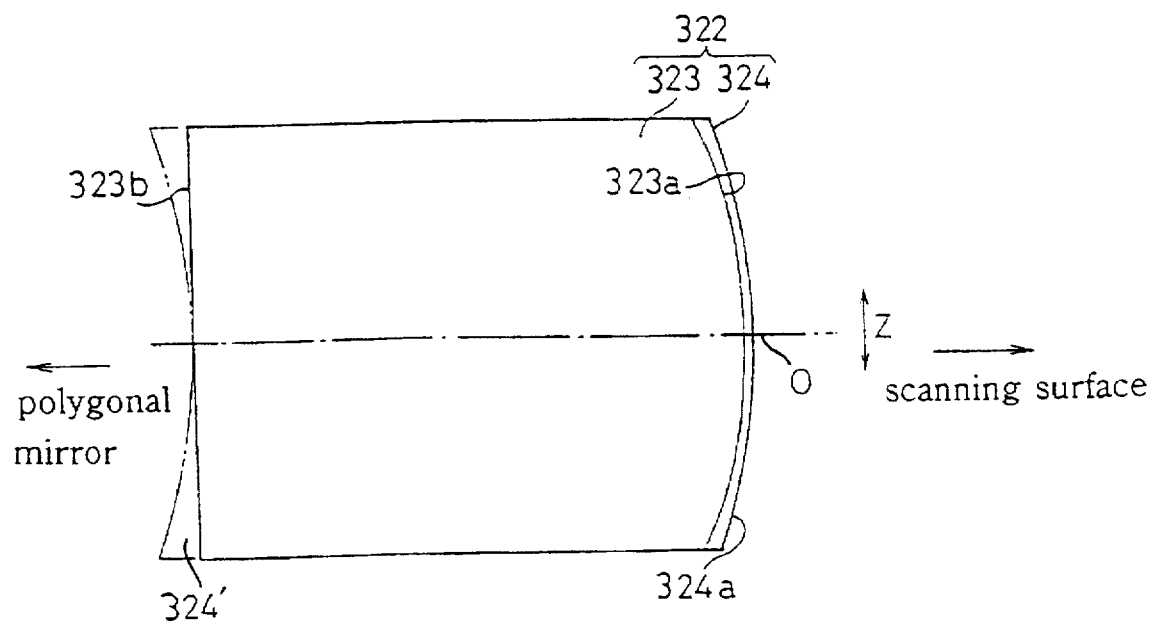
FIG. 34 is a cross-sectional view of the hybrid lens shown in FIG. 33, showing the relationship between a plastic layer including a lens surface having the cross-sectional shape of a non-circular arc in any sub-scanning plane and a glass lens along a cross section A shown in FIG. 33.

FIGS. 33 and 34 show the hybrid lens 322 constructed in accordance with the fourth aspect of the present invention. The hybrid lens 322 consists of glass toric lens 323 and a plastic layer 324 attached to the surface (i.e., a reference surface) 323a of the glass toric lens 323 which faces in the direction of the scanning surface 16. The surface 323a is formed as a toric surface which has a rotational axis extending in the sub-scanning direction Z. The surface 323b of the glass toric lens 323 that faces in the direction of the polygonal mirror 12 is formed as a cylindrical surface having a curvature in the sub-scanning direction Z. The surface 323a has a spherical shape (i.e., a circular arc shape) in a sub-scanning plane, and the surface of the hybrid lens 322 which faces in the direction of the scanning surface 16 is formed as a sub-scanning-plane aspherical surface 324a by the plastic layer 324 attached to the surface 323a of the glass toric lens 323. The plastic layer 324 has a thickness in the direction of the optical axis O that increases in a direction away from the optical axis O so as to form the sub-scanning-plane aspherical surface 324a. Forming such a surface as the sub-scanning-plane aspherical surface makes it possible to correct the spherical aberration in sub-scanning planes.

In FIG. 34, the increment of the thickness of the plastic layer 324 in the optical axis O towards the scanning surface 16 is exaggerated as compared with the actual increment for the purpose of illustration.

The paraxial radius of curvature of the sub-scanning-plane aspherical surface 324a of the plastic layer 324 is arranged to be substantially the same as that of the surface 323a of the glass toric lens 323. The plastic layer 324 has no magnification in the immediate vicinity of the optical axis O. The plastic layer 324 is hardly subject to the variation of temperature and/or humidity with the above arrangement in which the plastic layer 324 has no magnification in the immediate vicinity of the optical axis O.

In other words, the sub-scanning-plane aspherical surface 324a of the plastic layer 324 is formed so as to correct the spherical aberration occurring in the scanning lens system 320. The surface 323a of the glass toric lens 323 supports the plastic layer 324.

In the above embodiment, the plastic layer 324 is attached to the surface 323a for forming the sub-scanning-plane aspherical surface 324a. Additionally, a plastic layer 324' may be attached to the cylindrical surface 323b of the glass toric lens 323 so as to form a sub-scanning-plane aspherical surface on the side of the cylindrical surface 323b, as shown by the phantom lines in FIG. 34. In this case, since the center of curvature in a main scanning plane is at an infinite point, different aspherical amounts must be given to the surface of the plastic layer 324' which faces towards the polygonal mirror 12 at different points in the main scanning direction Y.

As shown in FIG. 31, the hybrid lens 322 is offset towards the semiconductor laser 13 in the main scanning direction Y from the optical axis O by a distance "e". This arrangement prevents the image plane in the sub-scanning direction Z from being asymmetrical with respect to the center of the image plane along the main scanning direction Y. In other words, the arrangement prevents the image plane in the sub-scanning direction Z from inclining towards the main scanning direction Y. The degree of the asymmetry becomes specifically large when an angle α made by an incident laser beam upon the reflection surface 12R and a laser beam reflected on the reflection surface 12R exceeds a specific angle.

Figure 35:
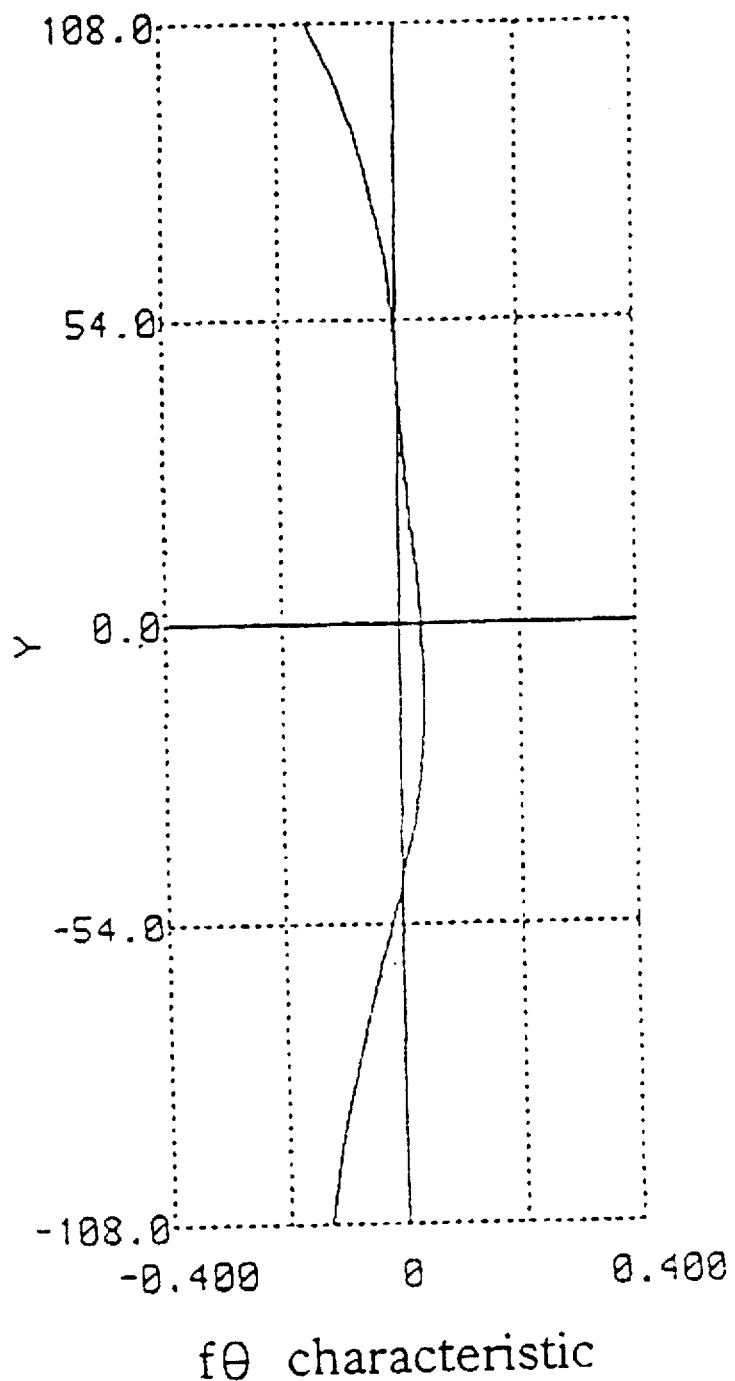
FIG. 35 is a graph showing the fθ characteristic of the scanning optical system illustrated in FIGS. 31 and 32.
Figure 36:
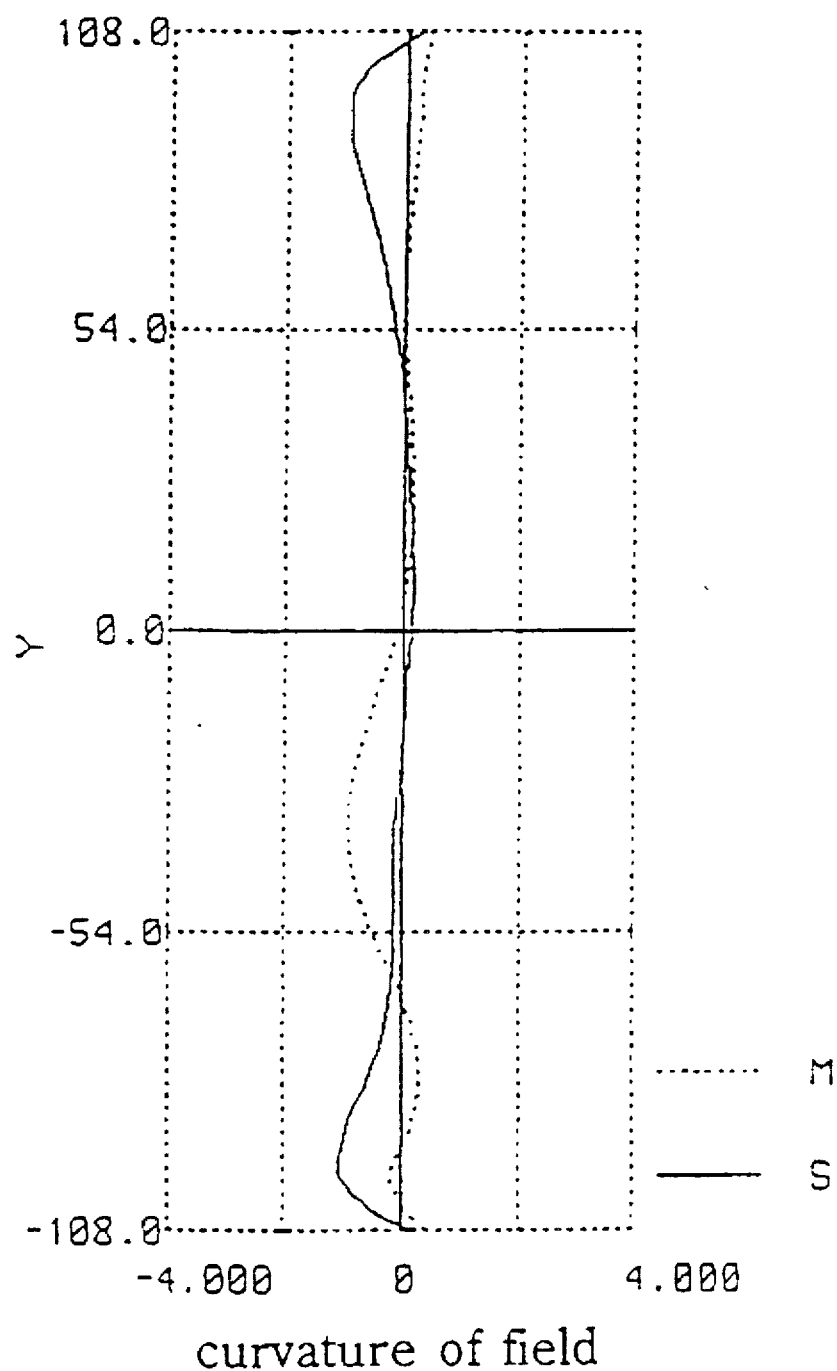
FIG. 36 is a graph showing the curvature of field in the scanning optical system illustrated in FIGS. 31 and 32.

FIG. 35 is a graph showing the results of measuring the fθ characteristic of the scanning optical system 320 of the fifth embodiment having the specific numerical values shown in Table 5. FIG. 36 is a graph showing the result of measuring the curvature of field in the scanning optical system 320 in the meridional section M (i.e., main-scanning direction) and in the sagittal section S (i.e., sub-scanning direction). In FIGS. 35 and 36, the vertical line Y designates the position in the main-scanning direction. In FIG. 35, the horizontal line designates the displacement of the image height with respect to the ideal image height (mm). In FIG. 36, the horizontal line designates the displacement of the image plane with respect to the ideal image plane (mm).

TABLE 5

| | f = 135.39 scanning coefficient = 135.5 | | | |
|---|---|---|---|---|
| Surface No. | R | Rz | D | N |
| cylindrical 1 | ∞ | 17.88 | 4.00 | 1.51072(glass) |
| lens 2 | ∞ | R.S. | 33.50 | |
| polygonal mirror | | | 31.50 | |
| 1* | 536.10 | −50.00 | 5.46 | 1.48617(plastic) |
| 2* | −385.76 | 180.60 | 2.00 | |
| 3 | ∞ | −70.00 | 14.40 | 1.51072(glass) |
| 4 | −94.90 | −13.56 | 0.10 | 1.51350(plastic) |
| 5** | −95.00 | −13.56 | 131.54 | |

*indicates a main-scanning-plane aspherical surface.
**indicates a sub-scanning-plane aspherical surface.
"R.S." indicates the same value as "R" (i.e., the radius of curvature along a main scanning plane) since the surface is rotationally symmetrical about the optical axis.

The offset amount "e" of the glass lens 322 (in the main scanning direction): −1.36
The deviation of the image plane (see FIG. 36): −1.00
The first surface 321a has the coefficients:

$K = 5.20$ $A4 = -4.540 \times 10^{-6}$ $A6 = 1.882 \times 10^{-9}$ $A8 = -2.910 \times 10^{-13}$ as defined with regard to equation 2 above.
The second surface 321b has the coefficients:

$K = 22.00$ $A4 = -3.250 \times 10^{-6}$ $A6 = 7.220 \times 10^{-10}$ as defined with regard to equation 2 above.

In the fifth embodiment, the fifth surface of the scanning lens system 320, i.e. the surface 324a of the plastic layer 324, is the sub-scanning-plane aspherical surface, and the aspherical amount of the sub-scanning-plane aspherical surface 324a is given by equation 3 above under the following condition:

$B4=4.0\times10^{-5}$

Figure 37D:
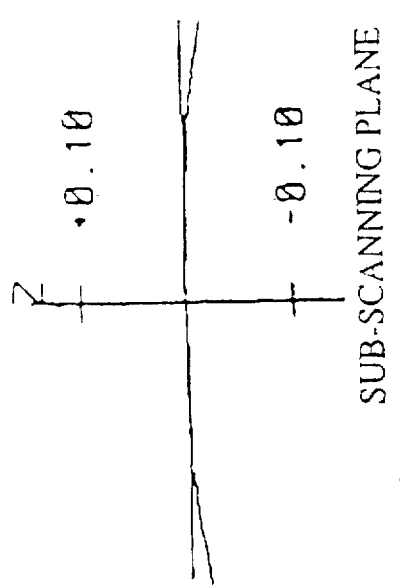
FIGS. 37A–37N are graphs showing the spherical aberration (i.e., wavefront aberration) in main and sub-scanning planes of the scanning optical system illustrated in FIGS. 31 and 32, in the case where the hybrid lens shown in FIGS. 33 and 34 is used.
Figure 37K:
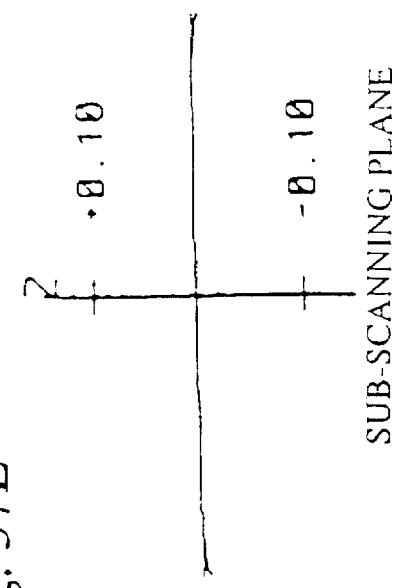
Figure 37E:
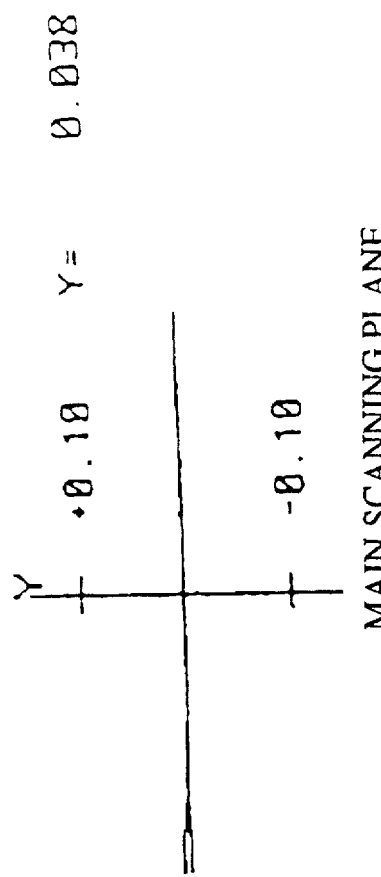
Figure 37L:
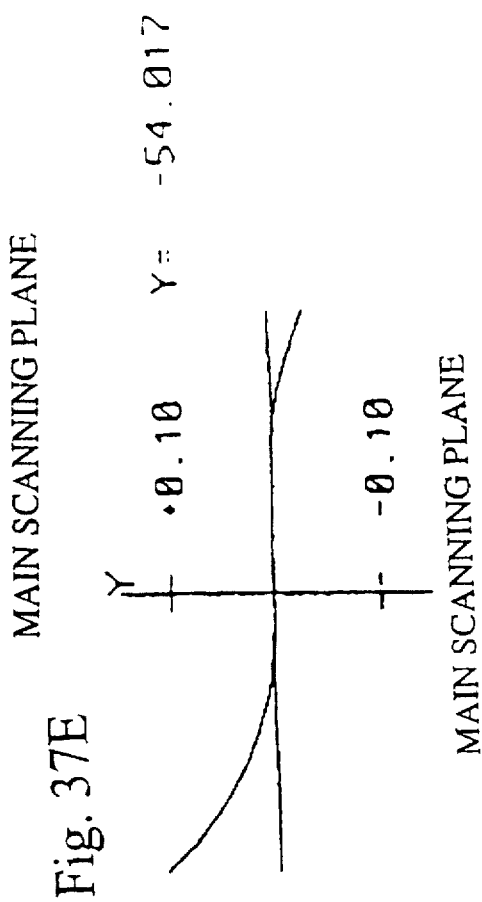
Figure 37F:
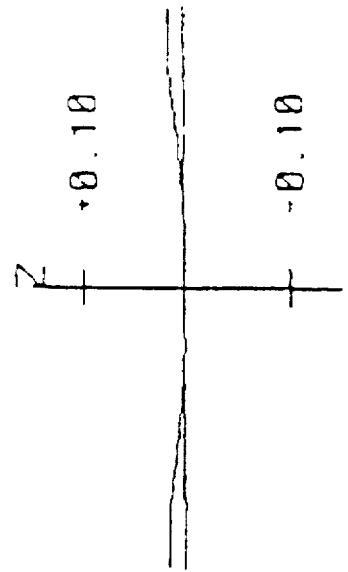
Figure 37M:
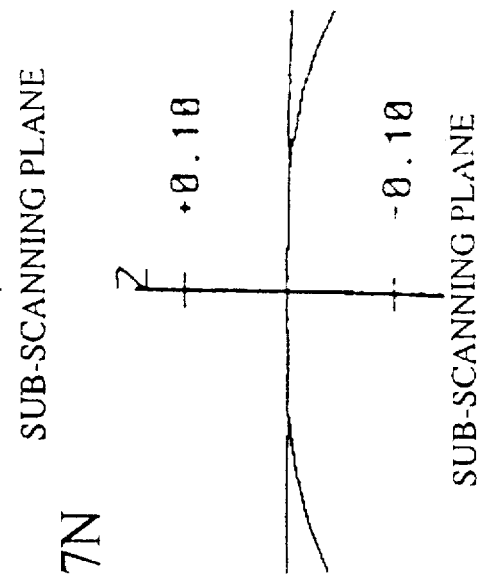
Figure 37G:
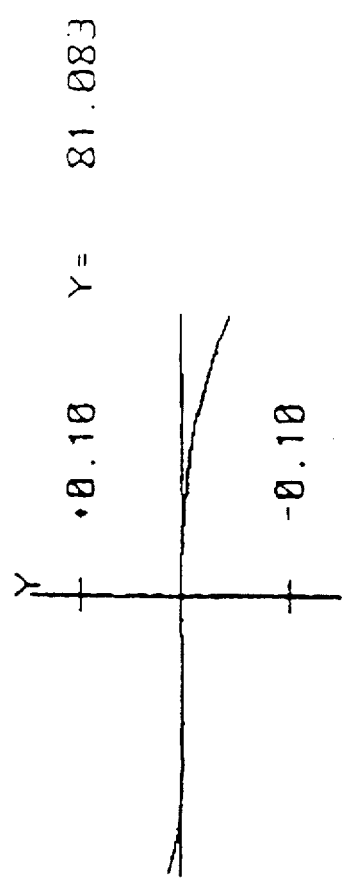
Figure 37N:
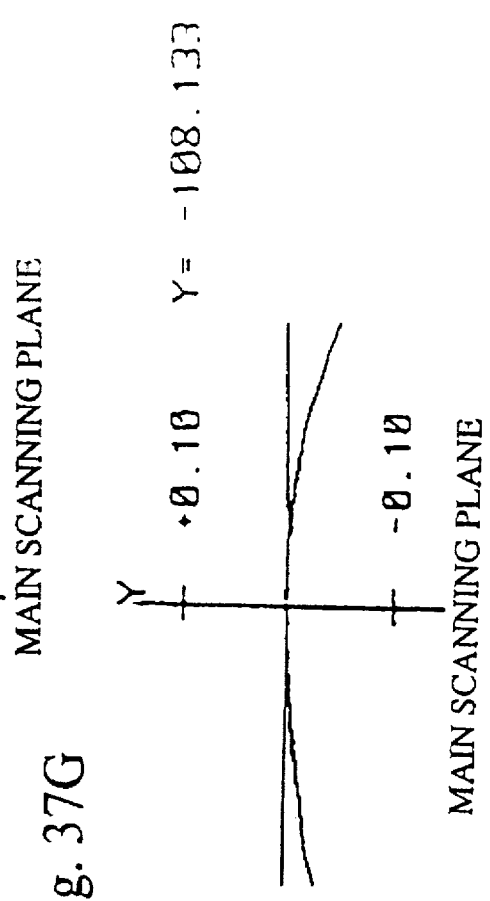

FIGS. 37A–37N show the spherical aberration (i.e. wavefront aberration) of the scanning lens system 220 of the fourth embodiment in main and sub-scanning planes in the case where the fifth surface is formed as the sub-scanning-plane aspherical surface 324a by attaching the plastic layer 324 to the toric surface 323a of the glass toric lens 323. It can be understood that each spherical aberration of the system 320 in sub-scanning planes is adequately corrected by forming the fifth surface as the sub-scanning-plane aspherical surface 324a.

In the fifth embodiment, the present invention is applied to the particular case where the scanning lens system 320 consists of two lenses, i.e., the plastic lens 321 and the hybrid lens 322. The present invention is not limited to only this particular case but may also be applied to a case where the scanning lens system 320 consists of more than two lenses. Furthermore, the above-discussed arrangement of lenses of the scanning lens system 320 is only an example and may be any other arrangement.

In the fourth aspect of the present invention, the spherical aberration in sub-scanning planes of a scanning optical system is corrected by a hybrid lens which has a plastic layer forming a sub-scanning-plane aspherical surface without increasing the number of lenses in a scanning optical system. Furthermore, with the arrangement in which the paraxial radius of curvature of the surface of the plastic layer is arranged to be substantially the same as that of the cylindrical surface of the glass toric lens, a deviation of the focal point due to the variation of temperature and/or humidity can be prevented from occurring while employing an easily-moldable plastic material.

[Sixth Embodiment]

Figure 38:
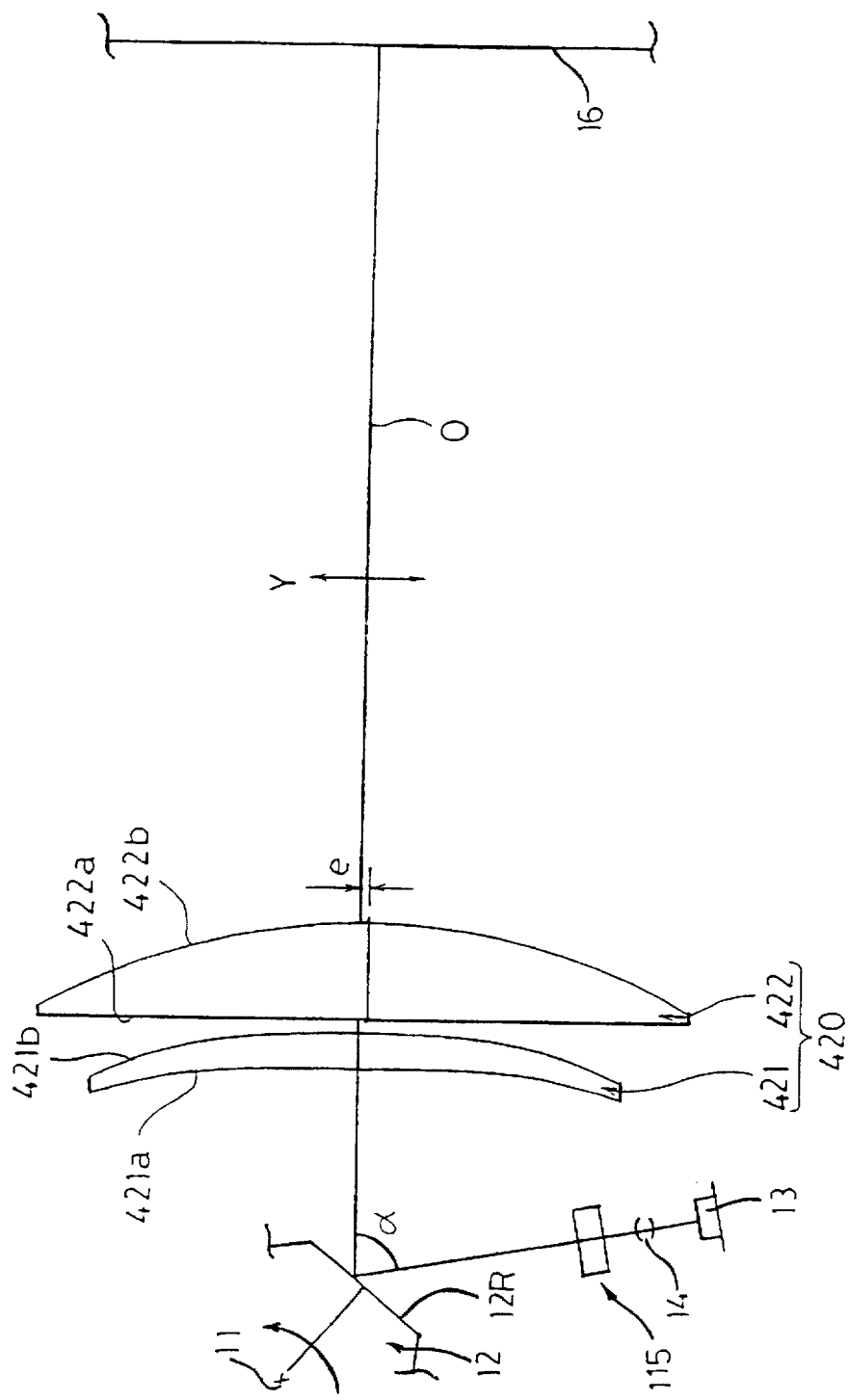
FIG. 38 is a plan view of a scanning optical system according to the sixth embodiment of the present invention.
Figure 39:
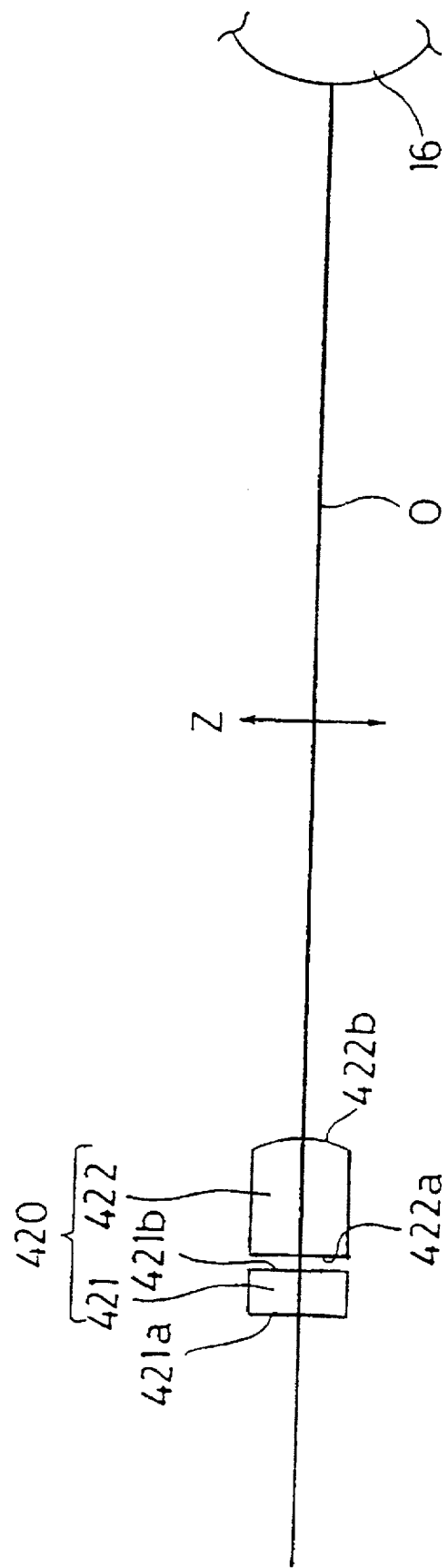
FIG. 39 is a front view of the scanning optical system shown in FIG. 38.

FIGS. 38 and 39 show the configuration of the scanning optical system according to a sixth embodiment to which the fifth aspect of the present invention is applied.

In this embodiment, the laser beam emitted from the semiconductor laser 13 is collimated by the collimator lens 14. Subsequently, the collimated laser beam is incident on a beam-shape changing lens 115 which is unique to the present invention. The beam-shape changing lens 115 changes a cross-sectional shape of the collimated laser beam passing therethrough into an oblong shape extending along the main scanning direction Y. The laser beam subsequently is incident upon the polygonal mirror 12. The laser beam is deflected by each reflection surface 12R. Thereafter, the laser beam passes through a scanning lens system (i.e., fθ lens system) 420 to scan the scanning surface 16. The scanning lens system 420 is comprised of a plastic lens 421 and a glass toric lens 422 in respective order from the polygonal mirror 12. The combination of the beam-shape changing lens 115 together with the collimator lens 14 constitute a first optical system.

Figure 47:
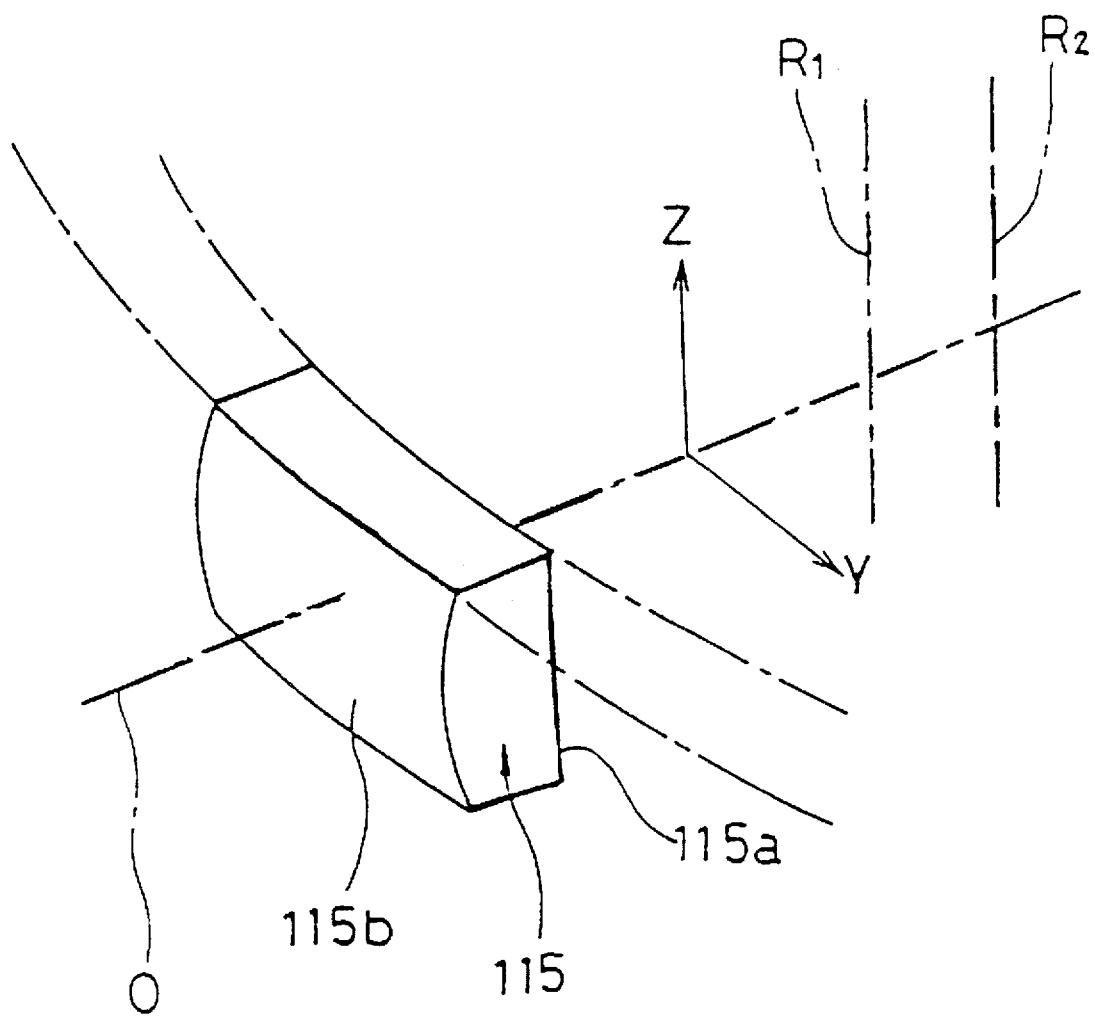
Figure 46D:
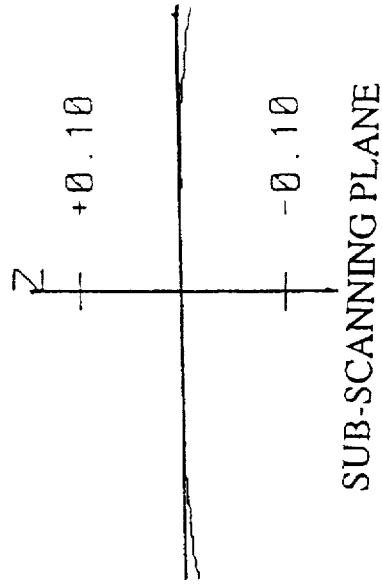
Figure 46E:
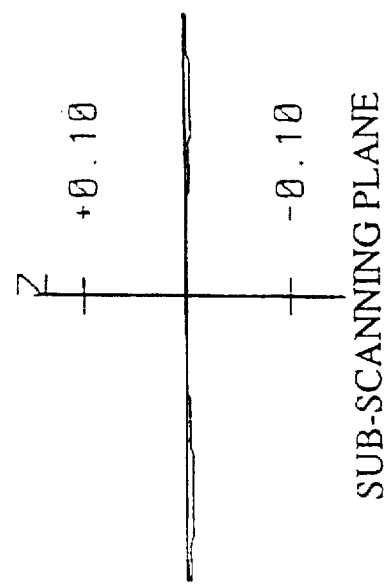
Figure 46I:
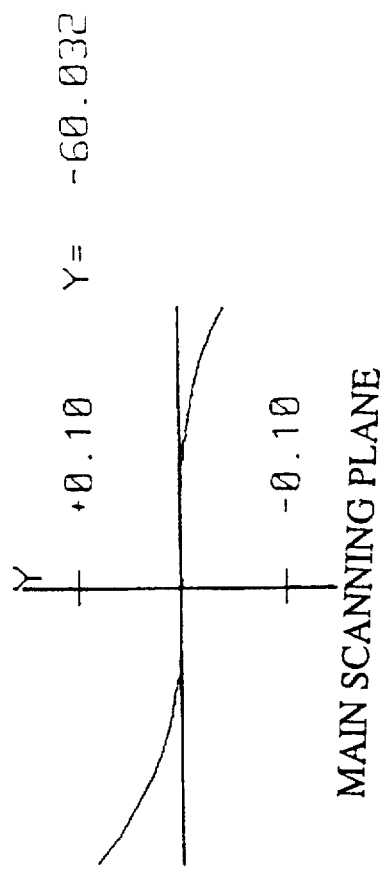
Figure 46J:
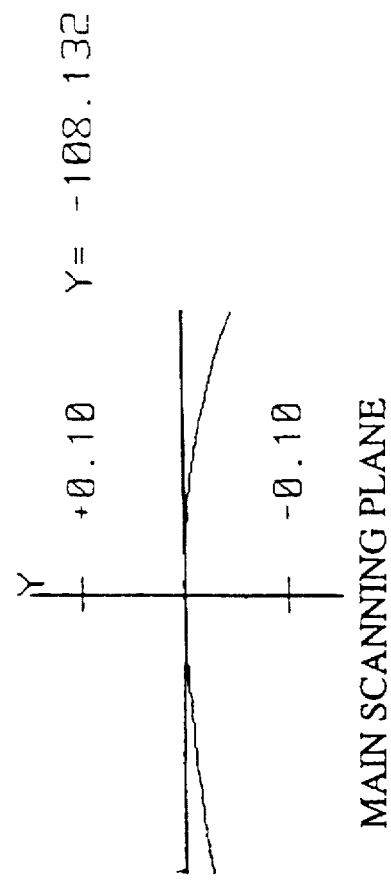
Figure 48:
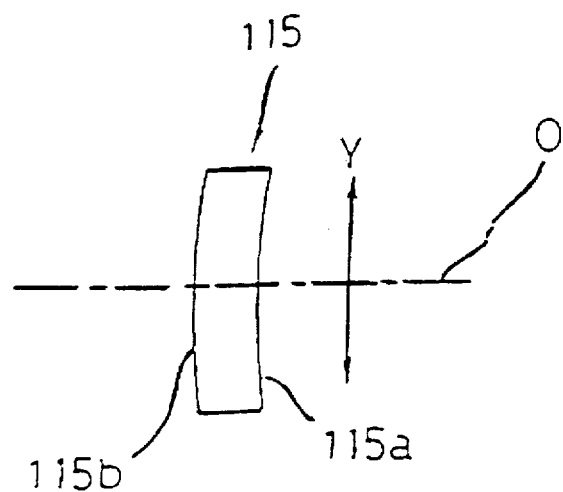
FIG. 48 is a cross-sectional view of the beam-shape changing shown in FIG. 47 in a main scanning plane; and, FIG. 49 is a cross-sectional view of the beam-shape changing lens shown in FIG. 47 in a sub-scanning plane.
Figure 49:
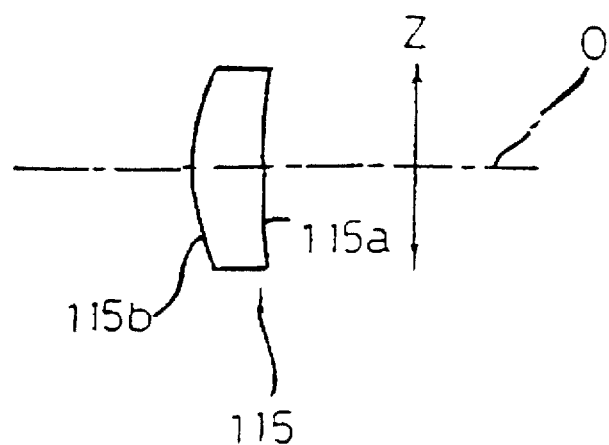

FIGS. 47 through 49 are presented to illustrate a general shape of the beam-shape changing lens 115 of the present invention. The surface 115a facing in the direction of the polygonal mirror 12 is formed as a curved surface which has a rotational axis R1 intersecting the optical axis O and extending in the sub-scanning direction Z. Therefore, the curved surface 115a has at least a curvature in the main scanning direction Y. The shape of the curved surface 115a in a sub-scanning plane may be the shape of either a straight line or a curved line. In the case of the shape of a straight line in a sub-scanning plane, the curved surface 115a is a cylindrical surface having no magnification in the sub-scanning direction Z. In the case of the shape of a curved line in a sub-scanning plane, the curved surface 115a has a magnification in the sub-scanning direction Z and may be formed as a spherical surface or a toric surface.

The other surface 115b of the beam-shape changing lens 115 that faces in the direction of the semiconductor laser 13 is formed as a toric surface having different curvatures in the main and sub-scanning directions Y and Z. The toric surface 115b has a magnification mainly for forming an oblong image extending along the main scanning direction Y in the vicinity of the polygonal mirror 12. The toric surface 115b also has a rotational axis R2 intersecting the optical axis O and extending in the sub-scanning direction Z. It is preferable that the shapes of the surfaces 115a and 115b be formed in such a manner that the focal points thereof in the main scanning direction Y are coincident with each other so as to have no magnification in the main scanning direction Y.

In the fifth aspect of the present invention, in order to correct the spherical aberration in the sub-scanning direction Z that is caused by the second optical system, at least one of the surfaces 115a and 115b of the beam-shape changing lens 115 is formed as a sub-scanning-plane aspherical surface in such a manner that the surface has a rotational axis (R1 or R2) intersecting the optical axis O and extending in the sub-scanning direction Z. The main feature of the fifth aspect of the present invention consists in this arrangement.

In the case where such an arrangement is adopted in which the sub-scanning-plane aspherical surface(s) of the surface 115a and/or the surface 115b are/is formed so as to have a rotational axis intersecting the optical axis O and extending in the sub-scanning direction Z, the beam-shape changing lens can be ground by a grindstone having a rotational axis R1 or R2 so as to form a sub-scanning-plane aspherical surface on the lens 115 when the lens 115 is made of glass.

In the case where the beam-shape changing lens 115 is a plastic lens or a hybrid lens, the lens 115 is easily mass-produced since a mold for the lens 115 can be made with a grindstone or grindblade having a rotational axis R1 or R2.

Figure 40:
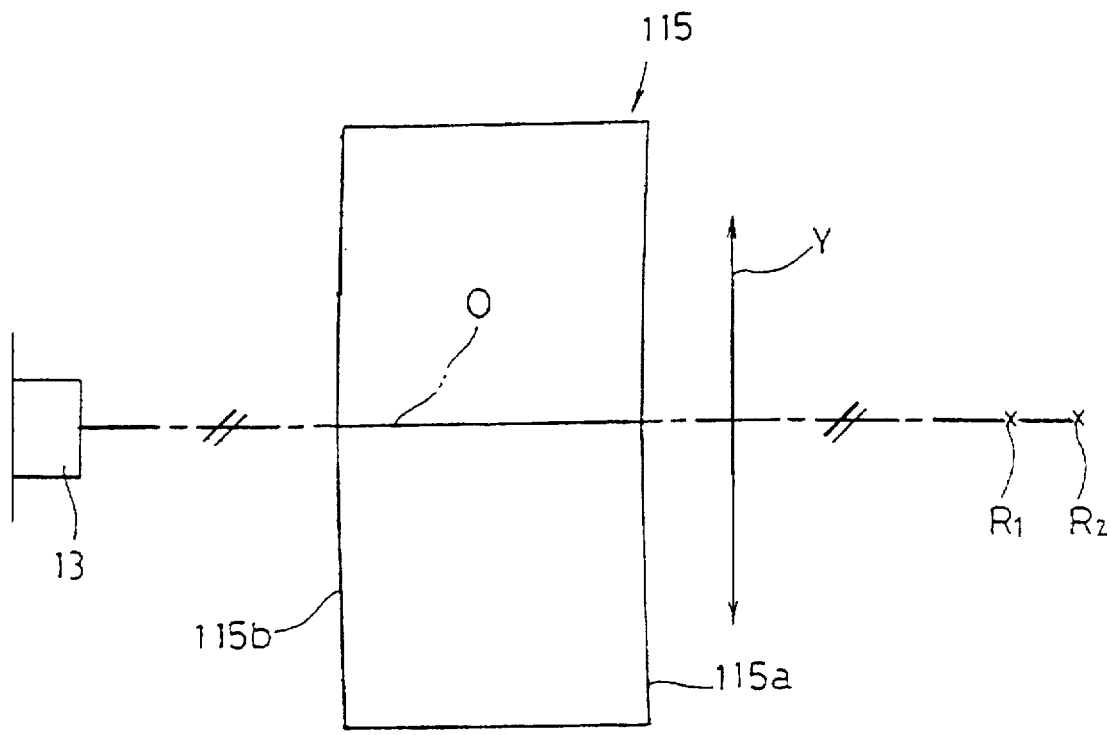
FIG. 40 is a cross-sectional view of a beam-shape changing lens in a main scanning plane, the beam-shape changing lens being provided in the scanning optical system shown in FIGS. 38 and 39, according the sixth embodiment of the present invention.
Figure 41:
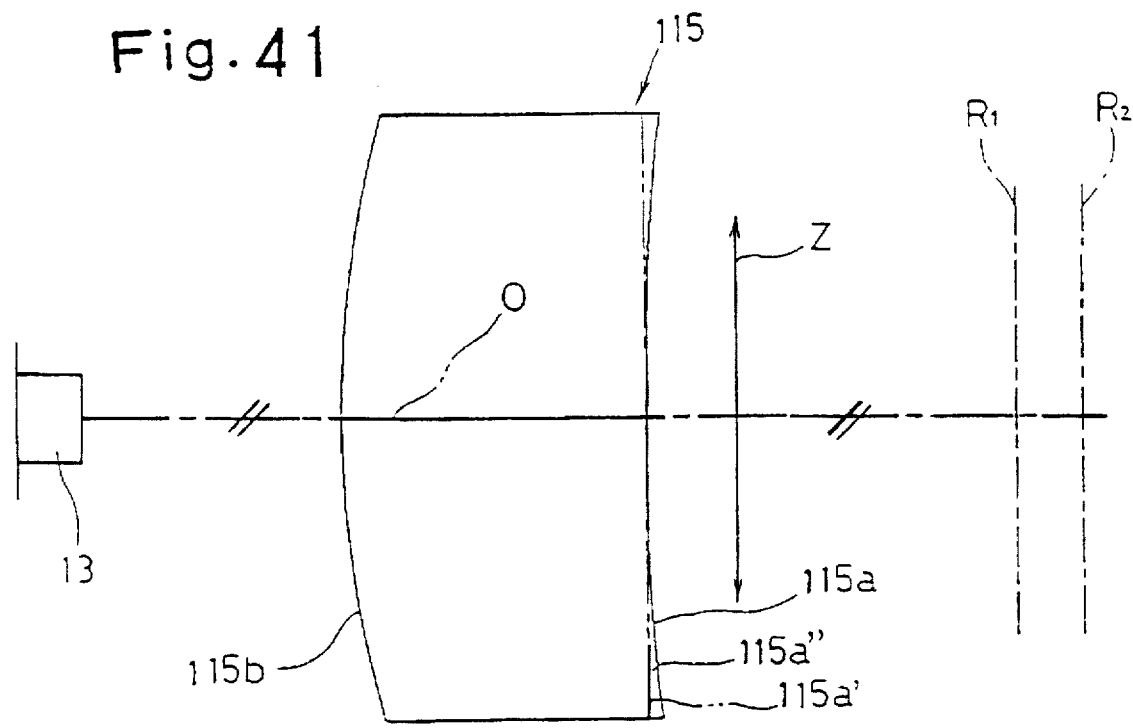
FIG. 41 is a cross-sectional view of the beam-shape changing lens shown in FIG. 40 in a sub-scanning plane.

FIGS. 40 and 41 show enlarged sectional views of the beam-shape changing lens 115 in the scanning optical system shown in FIGS. 38 and 39 in main and sub-scanning planes, respectively. The beam-shape changing lens 115 is made of glass. The surface 115a facing in the direction of the polygonal mirror 12 is formed as a sub-scanning-plane aspherical surface (i.e., a curved surface) which has a rotational axis R1 extending in the sub-scanning direction Z and which has a magnification in both the main and sub-scanning directions Y and Z. The surface 115b facing in the direction of the semiconductor laser 13 is formed as a toric surface which has a rotational axis R2 extending in the sub-scanning direction Z and which has a different value of magnification in the main and sub-scanning directions Y and Z. The shape of the toric surface 115b is designed so as to form an oblong image extending along the main scanning direction Y. In FIG. 41, the phantom line 115a' represents an imaginary reference surface or circular-arc surface for the purpose of comparison with the surface 115a. As can be seen from FIG. 41, the surface 115a is formed in such a manner so as to attach a layer 115a" to the reference surface 115a'. The thickness of the layer 115a" in the direction of the optical axis O increases from the reference surface 115a' in a direction away from the optical axis O in a sub-scanning plane. The focal points of the surfaces 115a and 115b in the main scanning direction Y are coincident with each other and have no magnification in the main scanning direction Y.

Referring again to FIGS. 39 and 39, the and surfaces 421a and 421b of the plastic lens 421 are each formed as a toric surface which includes a sub-scanning-plane aspherical surface and has a rotational axis extending in the main scanning direction Y. The surface 442a of the glass toric lens 442 which faces in the direction of the polygonal mirror 12 is formed as a cylindrical surface having a curvature in the sub-scanning direction Z. The surface 442b of the glass toric lens 442 which faces in the direction of the scanning surface 16 is formed as a toric surface having a rotational axis extending in the sub-scanning direction Z.

The glass toric lens 422 produces most of the magnification of the scanning lens system 420 both in the main and sub-scanning directions Y and Z. The plastic lens 421 functions so as to correct the curvature of field and fθ characteristic in the main scanning direction Y among the aberrations occurring due to the glass toric lens 422.

As shown in FIG. 38, the glass toric lens 422 is offset towards the semiconductor laser 13 from the optical axis O by a distance "e". This arrangement prevents the image plane in the sub-scanning direction Z from being asymmetrical with respect to the center of the image plane along the main scanning direction Y. In other words, the arrangement prevents the image plane in the sub-scanning direction Z from inclining towards the main scanning direction Y. The degree of the asymmetry becomes specifically large when an angle α made by an incident laser beam upon the reflection surface 12R and a laser beam reflected on the reflection surface 12R exceeds a specific angle. Table 6 below shows the concrete data of the scanning optical system according to the sixth embodiment of the present invention.

TABLE 6 f = 135.39
scanning coefficient = 135.5

| Surface No. | R | Rz | D | N |
|---|---|---|---|---|
| attenuating lens 115 | | | | |
| 1 | 100.0 | 15.52 | 4.00 | 1.51072(glass) |
| 2** | 98.65 | 98.65 | 33.50 | |
| polygonal mirror | | | 31.50 | |
| 1* | 536.10 | −50.00 | 5.46 | 1.48617(plastic) |
| 2* | −385.76 | 180.60 | 2.00 | |
| 3 | ∞ | −70.00 | 14.40 | 1.51072(glass) |
| 4 | −95.00 | −13.56 | 131.54 | |

*indicates a main-scanning-plane aspherical surface.
**indicates a sub-scanning-plane aspherical surface.

The offset amount "e" of the glass lens 422 (in the main scanning direction): −1.36
The deviation of the image plane (see FIG. 45): −1.00
The first surface 421a has the coefficients:

$K=5.20$ $A4=-4.540 \times 10^{-6}$ $A6=1.882 \times 10^{-9}$ $A8=-2.910 \times 10^{-13}$ as defined with regard to equation 2 above.
The second surface 421b has the coefficients:

$K=22.00$ $A4=-3.250 \times 10^{-6}$ $A6=7.220 \times 10^{-10}$ as defined with regard to equation 2 above.

In the sixth embodiment, the second surface 115a of the beam-shape changing lens 115 is the sub-scanning-plane aspherical surface, and the aspherical amount of the surface 115a is given by equation 3 above under the following condition:

$B4=4.2 \times 10^{-4}$

[Seventh Embodiment]

Figure 42:
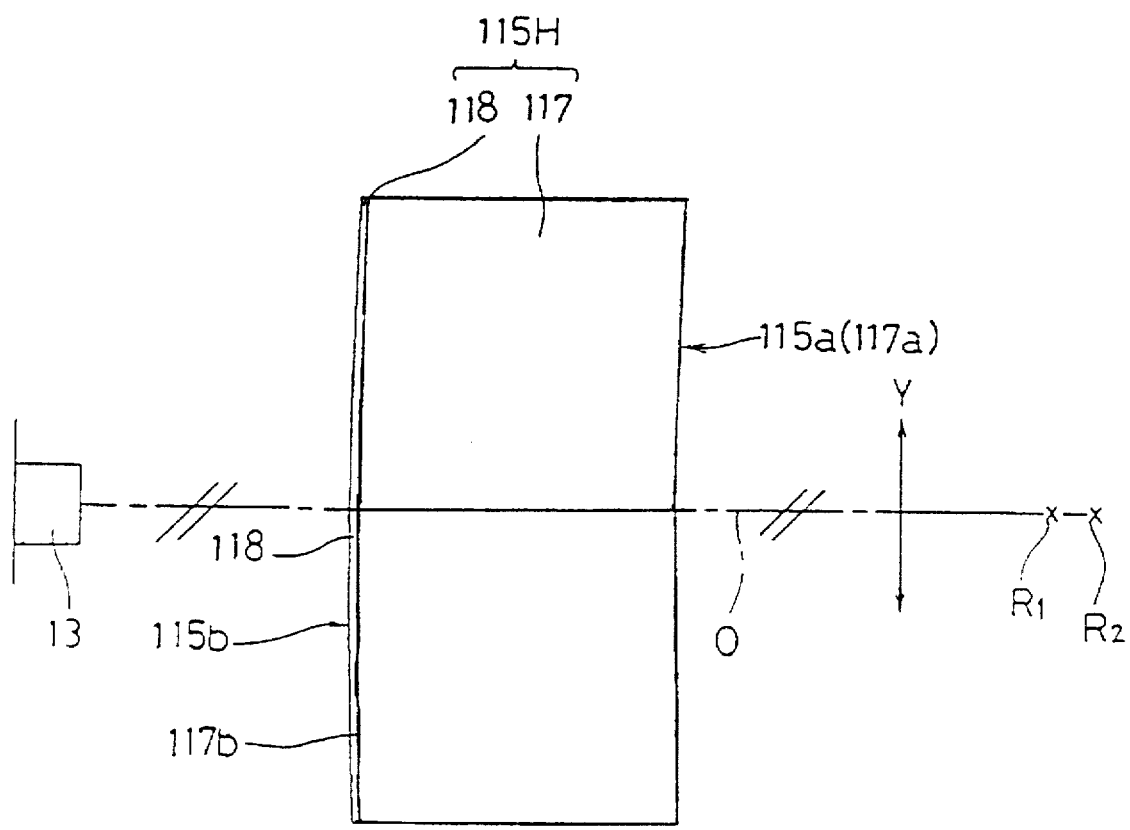
FIG. 42 is a cross-sectional view of an another beam-shape changing lens in a main scanning plane, the beam-shape changing lens being provided in the scanning optical system shown in FIGS. 38 and 39, according to the seventh embodiment of the present invention.
Figure 43:
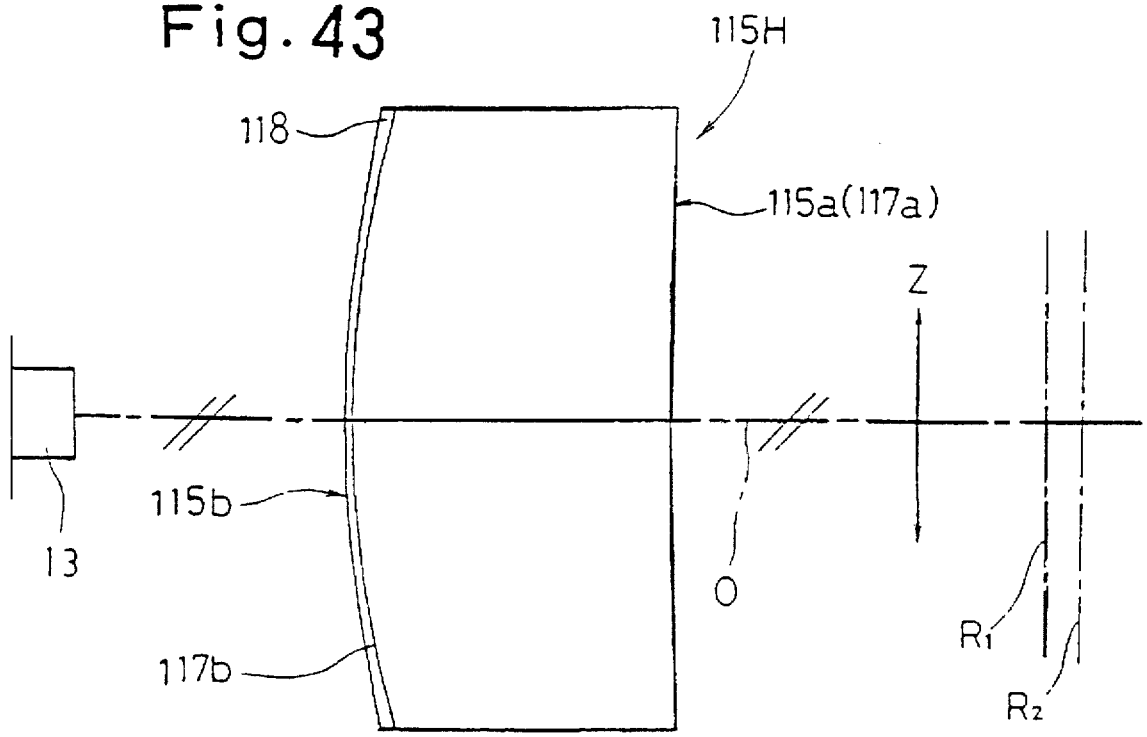
FIG. 43 is a cross-sectional view of the beam-shape changing lens shown in FIG. 42 in a sub-scanning plane.

FIGS. 42 and 43 show enlarged sectional views of a hybrid beam-shape changing lens 115H according to a seventh embodiment in main and sub-scanning planes, respectively, to which the fifth aspect of the present invention is applied. In the seventh embodiment, the beam-shape changing lens 115 of the sixth embodiment is replaced with the hybrid beam-shape changing lens 115H which is comprised of a glass lens 117 and a plastic layer 118 attached to the glass lens 117. Hence, the scanning optical system of the seventh embodiment is the same as that of the sixth embodiment except for the arrangement in which the beam-shape changing lenses 115 and 115H are used in the sixth and seventh embodiments, respectively.

The beam-shape changing lens 115H is a hybrid lens consisting of the glass lens 117 and the plastic layer 118. The surface 117a of the glass lens 117 which faces in the direction of the polygonal mirror 12 is formed as a spherical surface (i.e., curved surface). The spherical surface 117a has a rotational axis R1 extending in the sub-scanning direction Z and has a magnification in both the main and sub-scanning directions Y and Z. The surface 117b of the glass lens 117 which faces in the direction of the semiconductor laser 13 is formed as a toric surface. The toric surface 117b has a different value of magnification in the main and sub-scanning directions Y and Z and has a rotational axis R2 extending in the sub-scanning direction Z. The shape of the toric surface 117b is defined so as to form an oblong image extending along the main scanning direction Y. The plastic layer 118 is attached to the toric surface 117b so as to form an sub-scanning-plane aspherical surface 115b. The thickness of the plastic layer 118 in the direction of the optical axis O increases from the toric surface 117b (i.e., a reference curved surface) in a direction away from the optical axis O in a sub-scanning plane. The focal points of the spherical surfaces 117a and 117b in the main scanning direction Y are coincident with each other and have no magnification in the main scanning direction Y.

In the case where such a hybrid lens as the hybrid lens 115H is used as the first optical system, the hybrid lens is hardly subject to the variation of temperature and/or humidity since the glass lens 117 assumes most magnification of the hybrid lens. Furthermore, the first optical system can be easily constructed as a whole since the portion of the hybrid lens 115H which forms a sub-scanning-plane aspherical surface is the plastic layer 118 that is easily moldable.

Table 7 below shows the concrete data of the scanning optical system according to the seventh embodiment of the present invention. The data in Table 7 is the same as that in Table 6 except for the data of the beam-shape changing lens.

TABLE 7 f = 135.39
scanning coefficient = 135.5

| Surface No. | R | Rz | D | N |
|---|---|---|---|---|
| lens 115H | | | | |
| 1** | 100.10 | 15.555 | 0.10 | 1.51350(plastic) |
| 2 | 100.00 | 15.50 | 4.00 | 1.51072(glass) |
| 3 | 98.715 | R.S. | 33.50 | |
| polygonal mirror | | | 31.50 | |
| 1* | 536.10 | −50.00 | 5.46 | 1.48617(plastic) |
| 2* | −385.76 | 180.60 | 2.00 | |
| 3 | ∞ | −70.00 | 14.50 | 1.51072(glass) |
| 4 | −95.00 | −13.56 | 131.54 | |

*indicates a main-scanning-plane aspherical surface.
**indicates a sub-scanning-plane aspherical surface.
"R.S." indicates the same value as "R" (i.e., the radius of curvature along a main scanning plane) since the surface is rotationally symmetrical about the optical axis.

In the sixth embodiment, the first surface 115b of the beam-shape changing lens 115 is a sub-scanning-plane aspherical surface that is formed by the plastic layer 118 attached to the toric surface 117b. The aspherical amount of the sub-scanning-plane aspherical surface 115b is given by equation 3 above under the following condition:

$$B4 = -3.0 \times 10^{-4}$$

Figure 45:
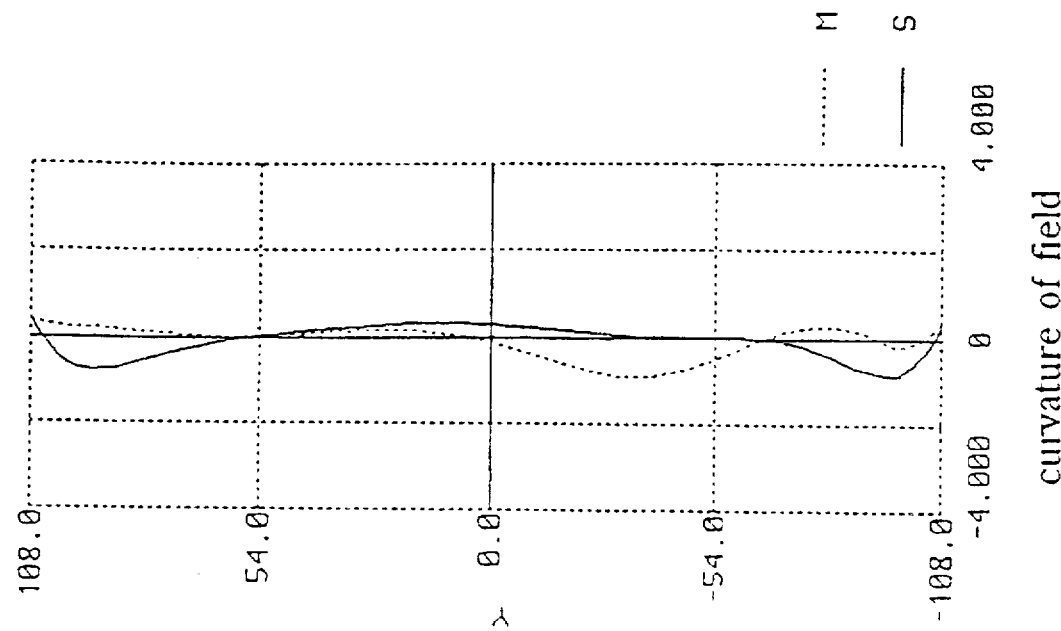
FIG. 45 is a graph showing the curvature of field in the scanning optical system illustrated in FIGS. 38 and 39.
Figure 44:
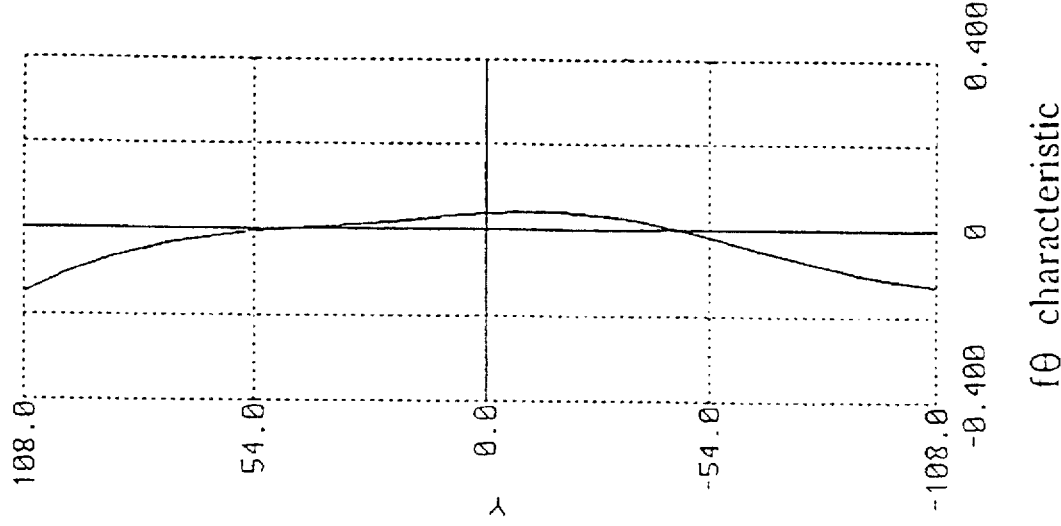
FIG. 44 is a graph showing the fθ characteristic of the scanning optical system illustrated in FIGS. 38 and 39.

FIG. 44 is a graph showing the results of measuring the fθ characteristic of the scanning optical system 420 of the sixth embodiment having the specific numerical values shown in Table 6. FIG. 45 is a graph showing the result of measuring the curvature of field in the scanning optical system 420 in the meridional section M (i.e., main-scanning direction) and in the sagittal section S (i.e., sub-scanning direction). In FIGS. 44 and 45, the vertical line Y designates the position in the main-scanning direction. In FIG. 44, the horizontal line designates the displacement of the image height with respect to the ideal image height (mm). In FIG. 45, the horizontal line designates the displacement of the image plane with respect to the ideal image plane (mm).

FIGS. 46A–46J show the spherical aberration (i.e., wave-front aberration) of the scanning lens system 420 of the sixth embodiment in main and sub-scanning planes in the case where the second surface of the beam-shape changing lens 115 is formed as the sub-scanning-plane aspherical surface 115a. It can be understood that each spherical aberration of the system 420 in sub-scanning planes is adequately corrected.

FIGS. 44 through 46 show the results of the sixth embodiment as noted above. Regarding the seventh embodiment, substantially the same results as those in the sixth embodiment shown in FIGS. 44 through 46 were obtained.

In the sixth or seventh embodiment of the present invention to which the fifth aspect of the present invention is applied, the first optical system is comprised of the collimator lens 14 and the beam-shape changing lens 115 (or the hybrid beam-shape changing lens 115H). However, the present invention may also be applied to the case where the first optical system consists of more than two lenses. The above-discussed arrangement of the scanning lens system 420 is only an example and may be any other arrangement.

In the fifth aspect of the present invention, the spherical aberration in sub-scanning planes that is caused by the second optical system provided between a light deflector (i.e., polygonal mirror) and a scanning surface is corrected by the first optical system provided between a light source and the light deflector. This correction is achieved by the arrangement of the fifth aspect of the present invention in which the first optical system is constructed in such a manner so as to include a lens which has a toric surface on one surface having a rotational axis extending in the sub-scanning direction and a curved surface on the other surface having a rotational axis extending in the sub-scanning direction and a curvature at least in the main scanning direction. Therefore, according to the fifth aspect of the present invention, the scanning optical system can be produced at a low cost since the correction is achieved by the small-sized first optical system without increasing the number of lenses. Moreover, the beam-shape changing lens of the present invention can be easily mass-produced in either case where the lens is made of a single glass or a hybrid lens since one and the other surfaces of the lens 115 or 115H each have a rotational axis extending in the sub-scanning direction Z.

As can be seen from the foregoing, according to the present invention, the spherical aberration in sub-scanning planes of a scanning optical system can be corrected without increasing the number of lenses.

I claim:

1. A scanning optical system, comprising:
   a light source for emitting a beam of light;
   a light deflector for deflecting said beam of light in a main scanning direction; and
   a scanning lens system which receives said beam of light deflected by said light deflector for focusing said deflected beam of light onto a scanning surface,
   wherein at least one surface of a lens in said scanning lens system is formed as a sub-scanning-plane aspherical surface having a cross-sectional shape of a non-circular arc to correct a spherical aberration in a sub-scanning plane extending in a sub-scanning direction perpendicular to said main scanning direction.

2. The scanning optical system of claim 1, wherein said lens in said scanning lens system is a plastic lens.

3. The scanning optical system of claim 1, wherein said at least one surface has a center of curvature in a main scanning plane extending in said main scanning direction, said center of curvature being located on the side of said light deflector.

4. The scanning optical system of claim 1, wherein a thickness of said lens increases, as a distance between said sub-scanning-plane aspherical surface and a reference surface, spaced from said sub-scanning-plane aspherical surface in a first direction parallel to an optical axis of said lens increases in a second direction away from said optical axis in said sub-scanning plane.

5. The scanning optical system of claim 1, wherein said at least one surface has a rotational axis which is substantially parallel to said sub-scanning direction.

6. The scanning optical system of claim 1, said scanning lens system consisting of a first plastic lens, a glass toric lens, and a second plastic lens, in respective order from said light deflector, and wherein said sub-scanning-plane aspherical surface is formed on said second plastic lens.

7. The scanning optical system of claim 6, wherein one surface of said glass toric lens which faces in the direction of said scanning surface is formed as a convex toric surface, said convex toric surface having a rotational axis substantially parallel to said sub-scanning direction, and further wherein the other surface of said glass toric lens which faces in the direction of said light deflector is formed as a flat surface.

8. The scanning optical system of claim 6, wherein at least one surface of said first plastic lens is formed as a rotationally-symmetrical aspherical surface which has an axis parallel to an optical axis of said scanning lens system as a rotational center.

9. The scanning optical system of claim 6, wherein one surface of said second plastic lens which faces in the direction of said light deflector is formed as a toric surface having a rotational axis substantially parallel to said main scanning direction, and further wherein the other surface of said second plastic lens which faces in the direction of said scanning surface is formed as said sub-scanning-plane aspherical surface.

10. The scanning optical system of claim 9, wherein said sub-scanning-plane aspherical surface is formed as a non-circular arc surface which has a rotational axis extending in a direction substantially parallel to said sub-scanning direction.

11. The scanning optical system of claim 6, wherein said second plastic lens is offset from an optical axis of said scanning lens system by a predetermined distance.

12. The scanning optical system of claim 1, said scanning lens system consisting of a plastic lens and a glass toric lens, in respective order from said light deflector, wherein said sub-scanning-plane aspherical surface is formed on said glass toric lens.

13. The scanning optical system of claim 12, wherein one surface of said plastic lens which faces in the direction of said light deflector and the other surface of said plastic lens which faces in the direction of said scanning surface are each formed as a toric surface which has a rotational axis extending in said main scanning direction and is formed as a main-scanning-plane aspherical surface.

14. The scanning optical system of claim 12, wherein one surface of said glass toric lens which faces in the direction of said light deflector is formed as a cylindrical surface having a curvature in said sub-scanning direction, and further wherein the other surface of said glass toric lens which faces in the direction of said scanning surface is formed as said sub-scanning-plane aspherical surface.

15. The scanning optical system of claim 1, wherein said lens in said scanning lens system is a hybrid lens which comprises a glass lens and a plastic layer attached to said glass lens, and wherein said sub-scanning-plane aspherical surface is formed on a surface of said plastic layer.

16. The scanning optical system of claim 15, said scanning lens system consisting of a plastic lens and said hybrid lens, in respective order from said light deflector.

17. The scanning optical system of claim 15, wherein said hybrid lens is offset from an optical axis of said scanning lens system by a predetermined distance.

18. The scanning optical system of claim 15, wherein said glass lens has a toric surface facing in the direction of said light source and a cylindrical surface facing in the direction of said scanning surface, said plastic layer being attached to said toric surface.

19. The scanning optical system of claim 15, wherein said surface of said plastic layer and said surface of said glass lens each have a center of curvature in a main scanning plane extending in said main scanning direction, said center of curvature being located on the side of said light deflector.

20. The scanning optical system of claim 15, wherein a thickness of said plastic layer in a direction of an optical axis of said hybrid lens increases in a direction away from said optical axis in said sub-scanning plane.

21. The scanning optical system of claim 15, wherein said sub-scanning-plane aspherical surface has a rotational axis which is substantially parallel to said sub-scanning direction.

22. The scanning optical system of claim 15, wherein said surface of said glass lens is a toric surface which has a rotational axis extending in said sub-scanning direction.

23. The scanning optical system of claim 22, wherein said a paraxial radius of curvature of said sub-scanning-plane aspherical surface of said hybrid lens is arranged to be substantially the same as a radius of curvature of said toric surface.

* * * * *